(12) United States Patent
Tsutsumi et al.

(10) Patent No.: US 7,676,819 B2
(45) Date of Patent: Mar. 9, 2010

(54) DISK CONVEYING APPARATUS

(75) Inventors: Hideaki Tsutsumi, Tokyo (JP); Kiyoshi Omori, Tokyo (JP); Shigeru Tamura, Tokyo (JP); Manabu Obata, Kanagawa (JP); Yoichiro Mitsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 608 days.

(21) Appl. No.: 11/591,729

(22) Filed: Nov. 2, 2006

(65) Prior Publication Data
US 2007/0107001 A1    May 10, 2007

(30) Foreign Application Priority Data

Nov. 9, 2005 (JP) ............................... 2005-325360
Dec. 5, 2005 (JP) ............................... 2005-351341

(51) Int. Cl.
G11B 17/04 (2006.01)
G11B 17/03 (2006.01)

(52) U.S. Cl. ....................................... 720/623; 720/636

(58) Field of Classification Search ......... 720/617–626, 720/636–639, 645, 652; 360/99.02–99.03, 360/99.06–99.07
See application file for complete search history.

(56) References Cited

U.S. PATENT DOCUMENTS

| 5,386,406 | A  | * | 1/1995 | Ikuma et al. | ............. | 360/99.06 |
| 6,618,341 | B1 | * | 9/2003 | Yamashita et al. | .......... | 720/621 |
| 6,839,898 | B2 | * | 1/2005 | Saji et al. | ..................... | 720/619 |
| 2005/0039200 | A1 | * | 2/2005 | Fujimura | ..................... | 720/622 |

* cited by examiner

Primary Examiner—Andrea L Wellington
Assistant Examiner—Nathan Danielsen
(74) Attorney, Agent, or Firm—Wolf, Greenfield & Sacks, P.C.

(57) ABSTRACT

A recording medium driving device which records information in or reproduces information from the recording medium, includes a device body in which a recording medium is inserted and from which the recording medium is removed, a conveying mechanism that conveys the recording medium in a loading direction and an eject direction, a mounting section on which the recording medium is mounted, a conveyance arm that moves according to movement of the recording medium in the loading direction and the eject direction and conveys the recording medium, and a driving mechanism that has a driving source for imparting a driving force for moving the conveyance arm. The conveyance arm includes a contact section that brought into contact with the recording medium and an urging member that urges the contact section in the eject direction of the recording medium.

6 Claims, 36 Drawing Sheets

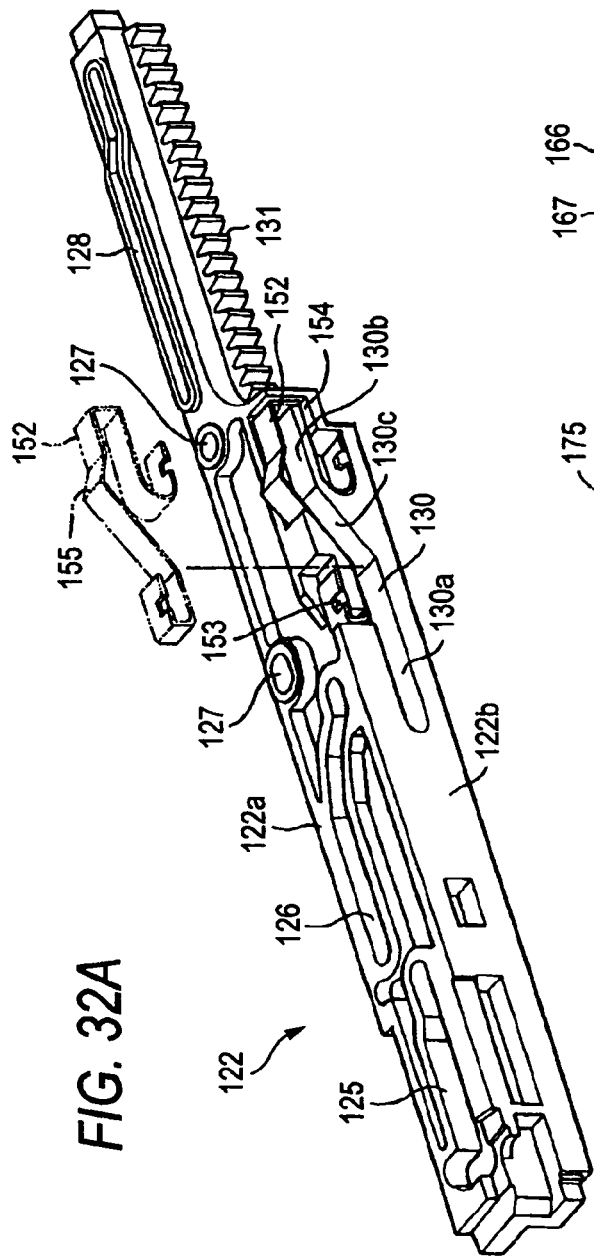
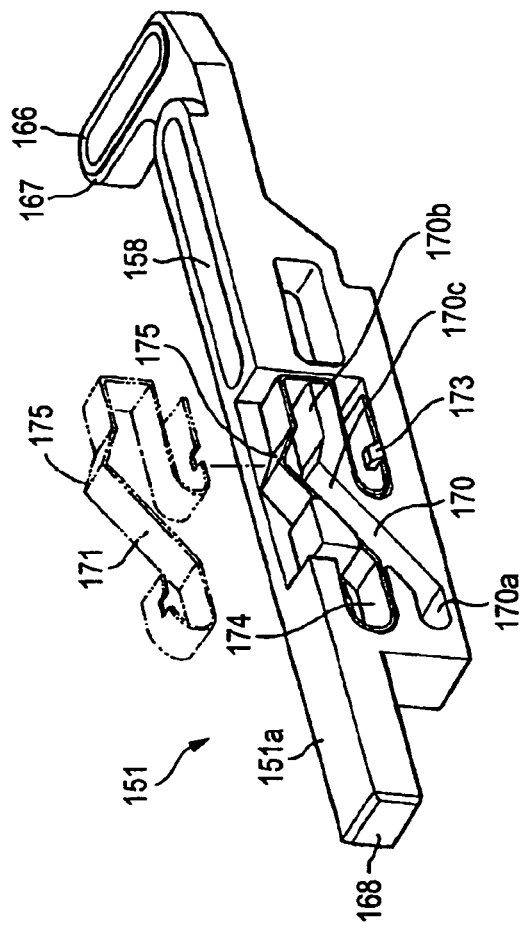
FIG. 32A
FIG. 32B

DISK CONVEYING APPARATUS

CROSS-REFERENCES TO RELATED APPLICATIONS

The present invention contains subject matter related to Japanese Patent Applications JP 2005-325360 and JP 2005-351341 filed in the Japanese Patent Office on Nov. 9, 2005 and Dec. 5, 2005, respectively, the entire contents of which being incorporated herein by reference.

BACKGROUND OF THE INVENTION

1. Field of the Invention

The present invention relates to a disk drive device that records information signal in an optical disk and/or reproduces information signal from the optical disk, and, more particularly to a disk drive device of a so-called slot-in type that directly inserts an optical disk into a device body.

2. Description of the Related Art

As optical disks, optical disks such as a CD (Compact Disk), a DVD (Digital Versatile Disk), and a BD (Blue-ray Disk) and optical magnetic disks such as an MO (Magneto optical disk) and an MD (Mini Disk) have been widely known. Various disk drive devices corresponding to these disks, disk cartridges, and the like have appeared in the market.

As types of the disk drive devices, for example, there are a type for opening a lid and a door provided in a housing and directly mounting a disk on a turntable seen from the lid or the door opened, a type for placing a disk on a disk tray, which is push into and pulled out of a housing in a horizontal direction, to automatically mount the disk on a turntable in the inside of the housing when the disk tray is pulled into the housing, and a type for directly mounting a disk on a turntable provided on a disk tray. However, in all the types, an operator needs to perform operation for opening and closing the lid or the door, pushing the disk tray into and pulling the disk tray out of the housing, and mounting the disk on the turntable.

On the other hand, there is a disk drive device of a so-called slot-in type in which an optical disk is automatically mounted on a turntable simply by inserting the optical disk from a disk inserting and ejecting opening provided on a front surface of a housing. The disk drive device of the slot-in type includes a pair of guide rollers opposed to each other that nip the optical disk inserted from the disk inserting and ejecting opening. The disk drive device performs, by rotating the pair of guide rollers in opposite directions, respectively, a loading operation for pulling the optical disk inserted from the disk inserting and ejecting opening into the inside of the housing and an eject operation for ejecting the optical disk to the outside of the housing from the disk inserting and ejecting opening.

In a mobile device such as a notebook-type personal computer mounted with a disk drive device, a further reduction in size, weight, and thickness is demanded. Therefore, there is also an increasing demand for a reduction in size, weight, and thickness of the disk drive device. In such circumstances, as the disk drive device of the slot-in type, there is proposed a disk drive device in which a contact section brought into contact with an outer periphery of an optical disk inserted from a disk inserting and ejecting opening of a front panel is provided at a front end of the disk drive device and plural rotational arms, base ends of which are rotatably supported, are arranged. The disk drive device performs, while rotating these rotational arms in a plane parallel to the optical disk, a loading operation for pulling the optical disk into the inside of a housing and an eject operation for ejecting the optical disk to the outside of the housing from the disk inserting and ejecting opening (see, for example, JP-A-2002-117604 and JP-A-2005-100595). Among disk drive devices that are reduced in thickness, for an ultra-thin disk drive device mounted on a notebook-type personal computer and the like, thickness of 12.7 mm is set as a standard size. Moreover, a disk drive device with thickness reduced to 9.5 mm, which is equivalent to thickness of a hard disk drive (HDD) unit, is also proposed.

In such a disk drive device, in performing the disk loading operation and the eject operation while rotating the plural rotational arms in the plane parallel to the optical disk, it is necessary to prevent the rotational arms from colliding against a turntable of a disk mounting section that rotatably holds the optical disk and an engaging projection provided in the turntable and inserted through and engaged with a center hole of the optical disk.

However, in the disk drive device reduced in thickness, it is difficult to set an area of rotation of the rotational arms high because thickness of the housing is increased. Thus, it is necessary to rotate the rotational arms at minimum height for preventing the rotational arms from colliding against the disk mounting section. In a disk drive device mounted on a portable electronic apparatus, rotational arms are driven even in a state in which the electronic apparatus is not placed in a stable place. Thus, it is likely that the rotational arms are swung to collide against a disk mounting section.

Further, in the disk drive device described above that has the plural rotational arms arranged therein and performs the disk loading operation and the eject operation while rotating the rotational arms in the plane parallel to the disk, the disk drive device ejects the optical disk by rotating the rotational arms with an urging member such as a torsion coil spring that urges rotation in an ejecting direction of the optical disk. In ejecting the optical disk to the outside of the device body, it is necessary that an opening formed in the center of the optical disk should be exposed to the outside and the optical disk should be set stationary in a position where the optical disk is prevented from dropping because of an own weight of the optical disk. The optical disk is set stationary in such a position because a user can grip the opening and the sides of the optical disk and handle the optical disk without touching a signal recording surface.

However, in the disk drive device, since a driving force for ejection of the optical disk is only a force of spring elasticity, variation tends to occur in the stationary position of the optical disk ejected to the outside of the apparatus. Variation in the stationary position of the optical disk may be caused by a change in an elastic force due to an aged deterioration in the urging member. Moreover, in the disk inserting/removing hole through which the optical disk is inserted or ejected, a panel curtain made of non-woven fabric may be provided in order to stabilize the stationary position of the optical disk and remove dust and the like adhering to the signal recording surface of the optical disk. However, when there is variation in a quality of the panel curtain, it is difficult to stabilize the stationary position of the optical disk.

There is also proposed a disk drive device that includes a motor and a link mechanism for transmitting a driving force of the motor to rotational arms in order to stabilize a stationary position of an optical disk and stabilizes the stationary position of the optical disk by controlling rotation of the rotational arms at the time of ejection using the motor and the link mechanism. However, in such a disk drive device, when the optical disk is ejected to the outside of a device body, a force in a direction opposite to a driving direction of the motor and the link mechanism may act on the optical disk. This is because there is an obstacle such as a book or a part of a body of a user on a conveyance area of the optical disk or the optical disk is pushed back in an insertion direction by the user who suddenly decides to stop ejection of the optical disk. In such a case, excessive loads are applied to the rotational arms, the motor, and the link mechanism. Besides, it is likely that the optical disk is broken by conflicting forces, that is, a driving force in an ejection direction by the rotational arms and a force acting in an opposite direction.

SUMMARY OF THE INVENTION

Therefore, it is desirable to provide a disk drive device with thickness reduced that can prevent collision of rotational arms and a disk mounting section.

It is also desirable to provide a disk conveyance mechanism and a disk drive device that, even when the force in the opposite direction described above acts on an optical disk, does not impose excessive loads on rotational arms, a motor, and a link mechanism and can prevent breakage of the optical disk.

According to an embodiment of the invention, there is provided a recording medium driving device which records information in or reproduces information from the recording medium. The recording medium driving device includes: a device body in which a recording medium is inserted and from which the recording medium is removed; a conveying mechanism that conveys the recording medium in a loading direction and an eject direction; a mounting section on which the recording medium is mounted; a conveyance arm that moves according to movement of the recording medium in the loading direction and the eject direction and conveys the recording medium; and a driving mechanism that has a driving source for imparting a driving force for moving the conveyance arm, wherein the conveyance arm includes: a contact section that brought into contact with the recording medium; and an urging member that urges the contact section in the eject direction of the recording medium.

According to another embodiment of the invention, there is provided an electronic device including an instructing unit that issues instructions for inserting and ejecting operations for a recording medium to a recording medium driving device which records information in or reproduces information from the recording medium, wherein the recording medium driving device includes: a device body in which a recording medium is inserted and from which the recording medium is removed; a conveying mechanism that conveys the recording medium in a loading direction and an eject direction; a mounting section on which the recording medium is mounted, a conveyance arm that moves according to movement of the recording medium in the loading direction and the eject direction and conveys the recording medium; and a driving mechanism that has a driving source for imparting a driving force for moving the conveyance arm, and the conveyance arm includes: a contact section that brought into contact with the recording medium; and an urging member that urges the contact section in the eject direction of the recording medium.

BRIEF DESCRIPTION OF THE DRAWINGS

In the accompanying drawings:

FIGS. 32A and 32B are perspective views showing a slider and a sub-slider;

DESCRIPTION OF THE PREFERRED EMBODIMENTS

Figure 1:
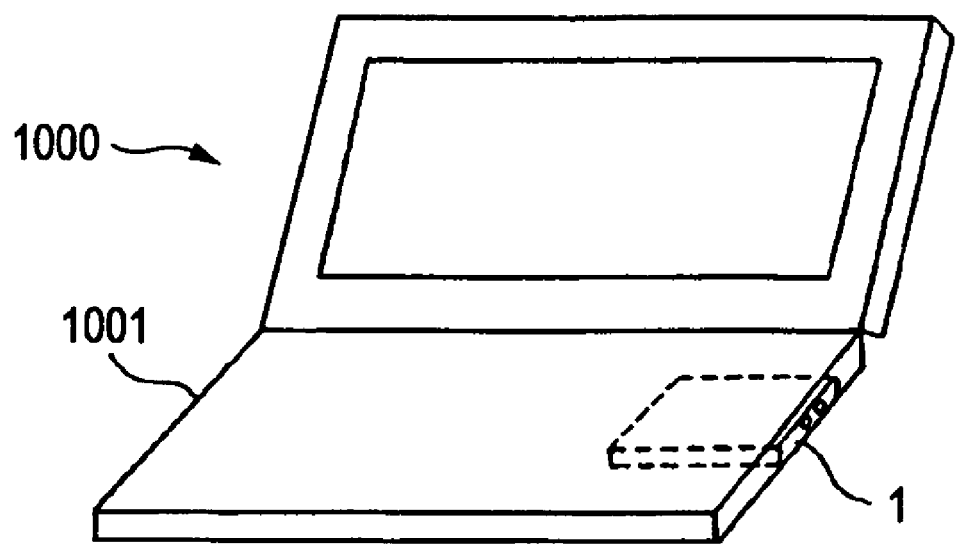
FIG. 1 is an external perspective view showing an electronic apparatus mounted with a disk drive device to which the invention is applied.
Figure 2:
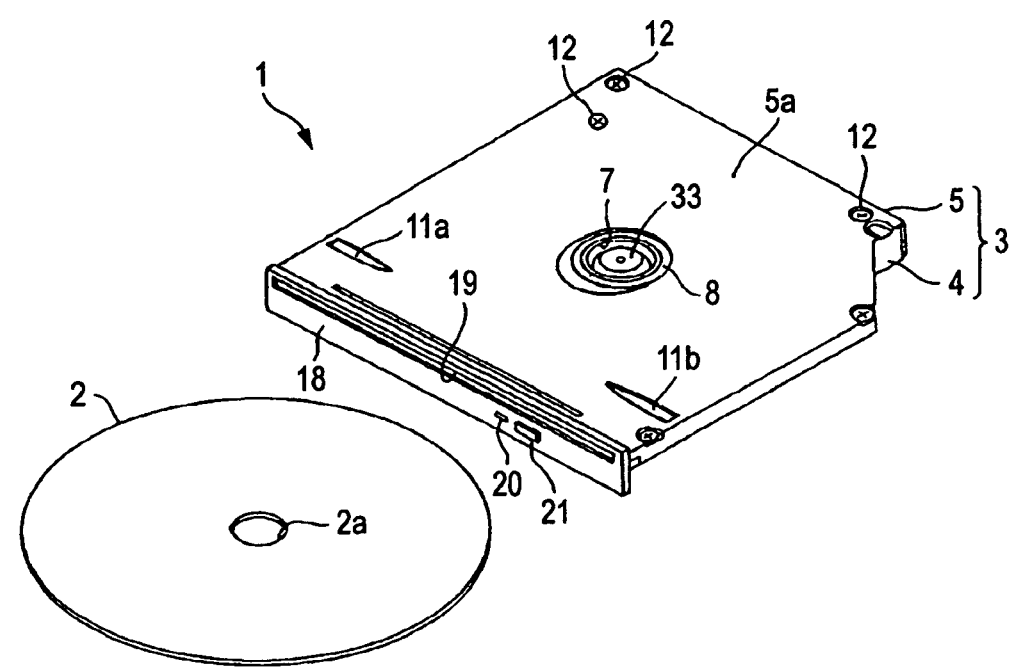
FIG. 2 is an external perspective view showing the disk drive device to which the invention is applied.

A disk drive device to which the invention is applied will be hereinafter explained in detail with reference to the accompanying drawings. A disk drive device 1 is, for example, as shown in FIG. 1, a disk drive device 1 of a slot-in type mounted on an apparatus body 1001 of a notebook-type personal computer 1000. The disk drive device 1 has, as shown in FIG. 2, a structure in which the entire device is reduced in thickness to, for example, about 12.7 mm. The disk drive device 1 is capable of applying record and reproduction of information signals to an optical disk 2 such as a CD (Compact Disk), a DVD (Digital Versatile Disk), or a BD (Blue-ray™ Disc).

First, a specific structure of the disk drive device 1 will be explained. The disk drive device 1 includes, as shown in FIGS. 3 to 6, a housing 3 serving as a casing of a device body. The housing 3 includes a bottom case 4 of a substantial flat-box shape serving as a lower housing and a top cover 5 serving as a top plate that covers an upper opening of the bottom case 4. In the housing 3, a driving mechanism 120 that is exposed to the upper side on a base unit 22 described later and provides a driving force for disk conveyance and a main chassis 6 that covers a disk conveying mechanism 50 to which the driving force of the driving mechanism 120 is transmitted are attached.

Figure 5:
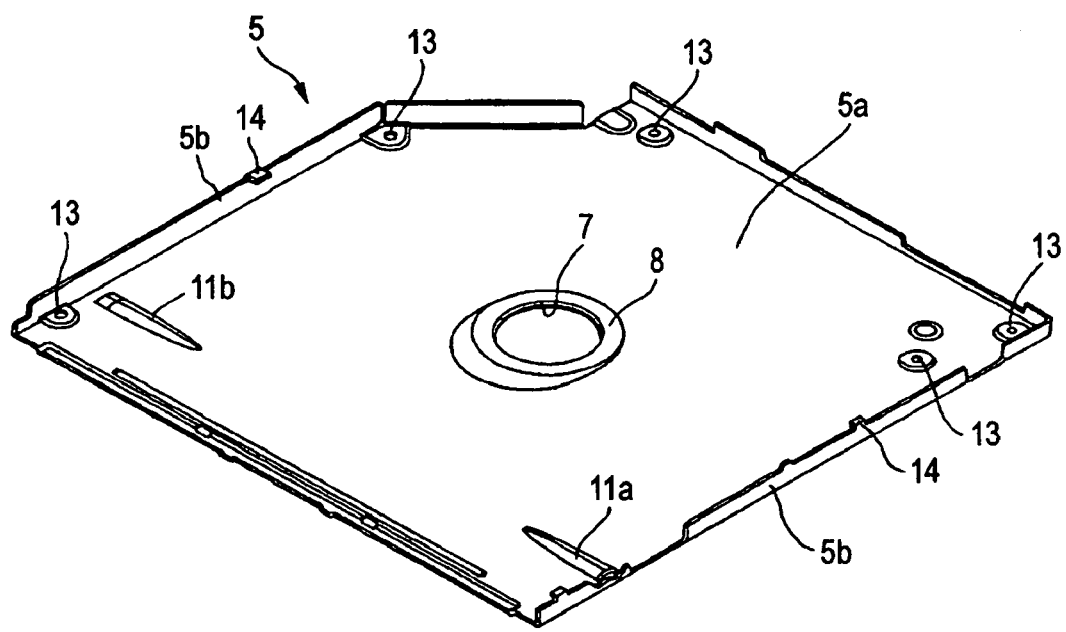
FIG. 5 is an external perspective view showing a top cover.

The top cover 5 includes, as shown in FIGS. 2 and 5, a top plate section 5a that closes the upper opening of the bottom case 4 and a pair of side plate sections 5b formed by slightly bending the periphery of the top plate section 5a along both sides of the bottom case 4. An opening 7 of a substantial circular shape is formed in substantially the center of the top plate section 5a. The opening 7 is an opening through which an engaging projection 33a of a turntable 23a engaged with a center hole 2a of the optical disk 2 is exposed to the outside at the time of a chucking operation described later. The periphery of the opening 7 of the top plate section 5a forms a contact projection 8 that slightly projects toward the inner side of the housing 3 to be brought into contact with the periphery of the center hole 2a of the optical disk 2 held on the turntable 23a.

On a front surface side of the top plate section 5a, a pair of guide projections 11a and 11b that guide the optical disk 2, which is inserted from a disk inserting and ejecting opening 19 described later, while regulating the optical disk 2 in a height direction are formed to swell toward the inside of the housing 3. The pair of guide projections 11a and 11b have, in a position substantially symmetrical across a center line along an inserting direction of the optical disk 2 passing through the opening 7, a substantial partial conical shape elevated to draw an arc in the inserting direction of the optical disk 2 and elevated such that the arc is continuously reduced in diameter from the outer side toward the inner side over a direction substantially orthogonal to the inserting direction of the optical disk 2. The pair of guide projections 11a and 11b have a shape obtained by dividing a cone along an axial direction and peaks thereof are exposed to the inner side of the top plate section 5a. The guide projections 11a and 11b continuously become low and thin from the outer side to the inner side.

Since the pair of guide projections 11a and 11b have such a shape, the guide projections 11a and 11b can smoothly guide the optical disk 2 inserted from the disk inserting and ejecting opening 19 to the inside of the housing 3 while correcting deviation in a width direction of the optical disk 2. Since the guide projections 11a and 11b of such a shape is provided in the top cover 5, it is possible to improve rigidity of the top plate section 5a. A main surface on the inner side of the top plate section 5a is machined to reduce a frictional resistance against the optical disk 2.

The bottom case 4 is made of a sheet metal formed in a substantial flat-box shape. A bottom surface thereof is a substantial rectangular shape. A deck section 4a set higher than the bottom surface and extending outward is provided in one side of the bottom case 4. A loading arm 51 described later that pulls the optical disk 2 into the housing 3 is supported in the deck section 4a to freely rotate.

On the bottom surface of the bottom case 4, a circuit board 59 on which electronic components such as an IC chip constituting a drive control circuit, a connector for realizing electrical connection of respective units, a detection switch for detecting operations of the respective units, and the like are arranged is attached by screwing or the like. A connector opening 4b through which the connector mounted on the circuit board 59 is exposed to the outside is provided in a part of an outer peripheral wall of the bottom case 4.

Figure 3:
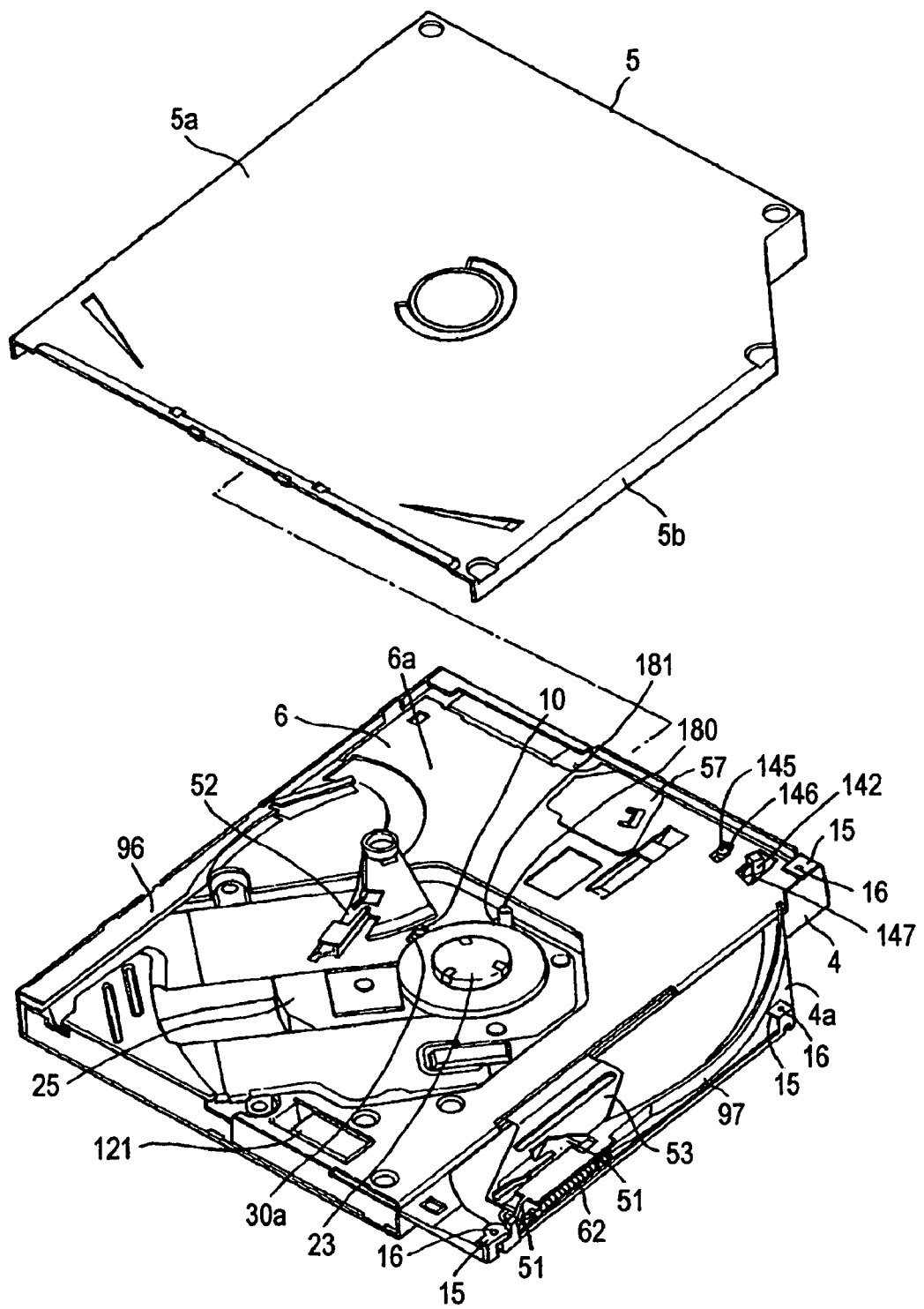
FIG. 3 is a perspective view showing the inside of the disk drive device to which the invention is applied.

The top cover 5 is attached to the bottom case 4 by screwing. Specifically, as shown in FIG. 5, plural through holes 13 through which screws 12 are pierced are formed at an outer peripheral edge of the top plate section 5a of the top cover 5. Plural guide pieces 14 bent inward at substantially a right angle are provided in the side plate sections 5b on both the sides. On the other hand, as shown in FIG. 3, plural fixing pieces 15 bent inward at substantially a right angle are provided at an outer peripheral edge of the bottom case 4. Screw holes 16 corresponding to the through holes 13 of the top cover 5 are formed in the fixing pieces 15. Plural guide slits, details of which are not shown, for preventing the plural guide pieces 14 of the top cover 5 from coming off are formed on both sides of the bottom case 4.

In attaching the top cover 5 to the bottom case 4, in a state in which the plural guide pieces 14 of the top cover 5 are engaged with the plural guide slits of the bottom case 4, the top cover 5 is slid from the front side to the rear side. Consequently, the top plate section 5a of the top cover 5 closes the upper opening of the bottom case 4. In this state, the screws 12 are screwed in the screw holes 16 of the bottom case 4 through the plural through holes 13 of the top cover 5. In this way, the housing 3 shown in FIG. 2 is constituted.

As shown in FIG. 2, a front panel 18 of a substantial rectangular flat shape is attached on a front surface of the housing 3. The disk inserting and ejecting opening 19 in which the optical disk 2 is inserted and from which the optical disk 2 is removed in the horizontal direction is provided in the front panel 18. In other words, it is possible to insert the optical disk 2 into the inside of the hosing 3 from the disk inserting and ejecting opening 19 and ejects the optical disk 2 to the outside of the housing 3 from the disk inserting and ejecting opening 19. On the disk inserting and ejecting opening 19, not-shown panel curtains are formed on both side portions in a direction orthogonal to a longitudinal direction. The panel curtains are made of non-woven fabric or the like cut in a long shape and bonded to a rear surface side of the front panel 18 by an adhesive or the like. Consequently, the panel curtains can prevent dust and the like from entering the housing 3. Further, since the panel curtains come into sliding contact with a disk surface when the optical disk 2 is inserted and removed, the panel curtains can remove dust and the like adhering to the optical disk 2.

A display unit 20 that displays a state of access to the optical disk 2 by lighting and an eject button 21 that is pressed when the optical disk 2 is ejected are provided on a front surface of the front panel 18.

Figure 10:
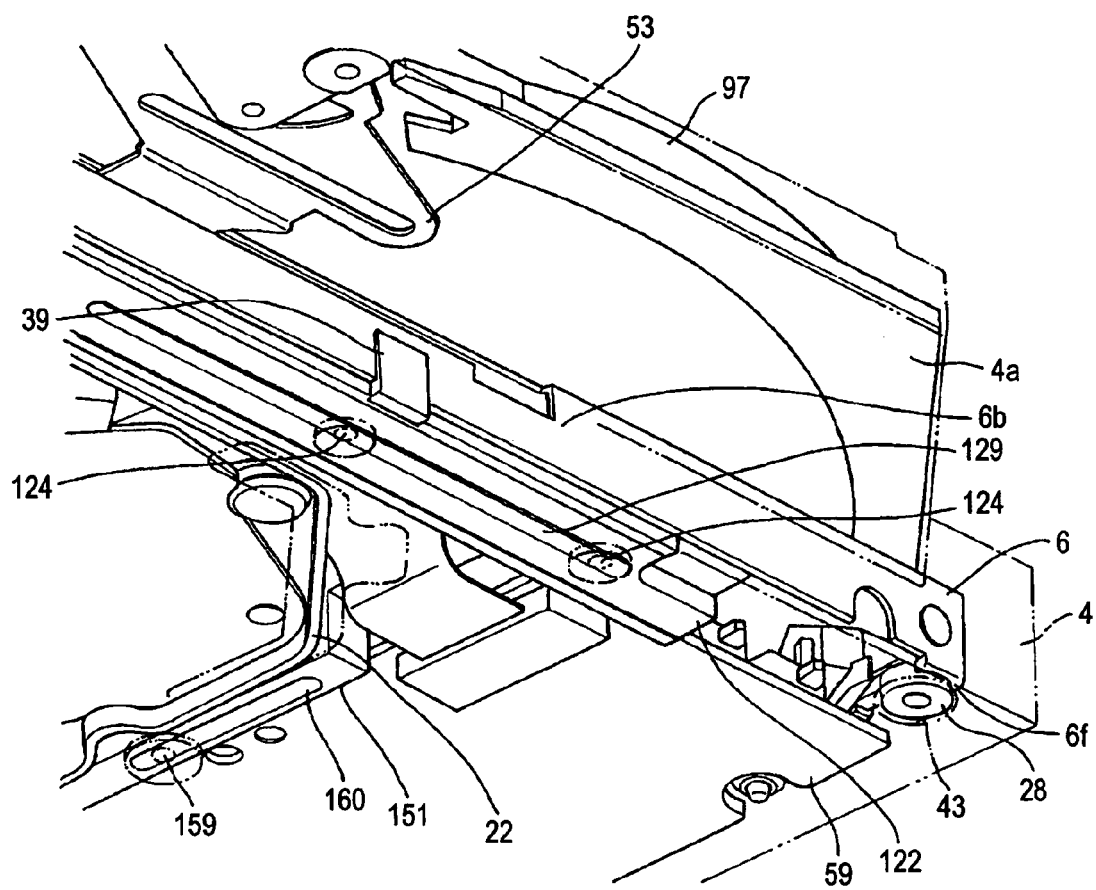
FIG. 10 is a perspective view showing another example of the disk drive device.

Near one side on which the deck section 4a of the bottom case 4 is provided, a pair of guide projections 124 that slide a slider 122 described later of the driving mechanism 120 along the one side are protrudingly provided along the one side to be spaced apart from each other (see FIG. 10).

Figure 4:
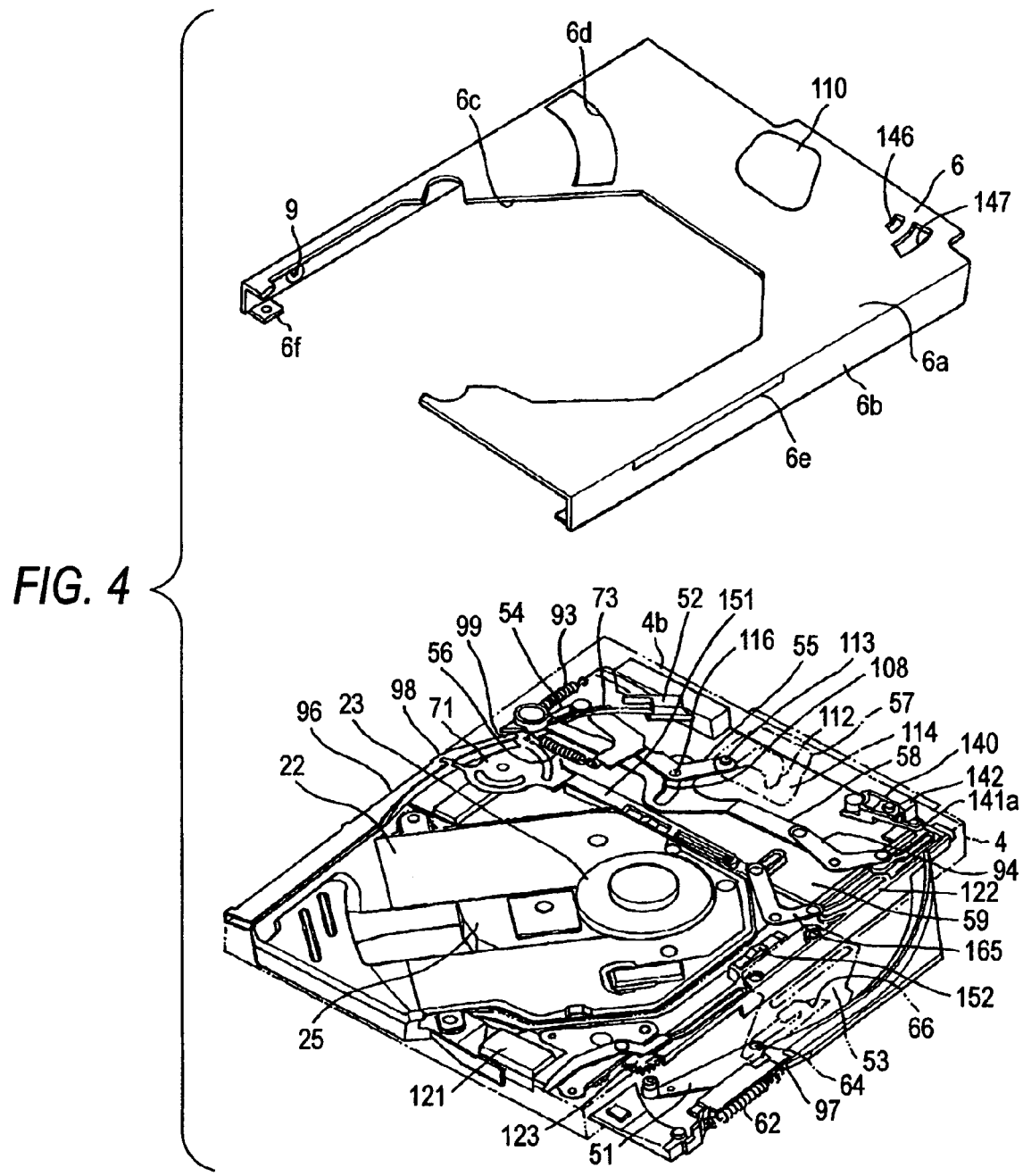
FIG. 4 is a perspective view showing the disk drive device from which a main chassis is removed.

As shown in FIGS. 3 and 4, the main chassis 6 is attached to the bottom surface of the bottom case 4 by screwing. The main chassis 6 is arranged above the circuit board 59 to partition the inside of the bottom case 4 into upper and lower parts at height substantially equivalent to the deck section 4a. Consequently, in the housing 3, an area further on the top cover 4 side than the main chassis 6 is a disk conveyance area on which the loading arm 51 and an eject arm 52 are exposed to rotate freely. An area further on the bottom case 4 side than the main chassis 6 is an area in which first and second link arms 54 and 55, an operation arm 58, and a loop cam 57 of the disk conveying mechanism 50 that transmits driving forces of the driving mechanism 120 including a driving motor 121 and the slider 122 to the eject arm 52 are disposed.

The main chassis 6 is made of a sheet metal of a substantial flat plate shape and has an upper surface 6a that covers the bottom case 4 from the rear surface side of the bottom case 4 to one side on which the deck section 4a is formed and a pair of side plate sections 6b obtained by bending the periphery of the upper surface 6a along both the sides of the bottom case 4. In the main chassis 6, an opening for base 6c and an opening for eject arm 6d through which the base unit 22 and the eject arm 52 of the disk conveying mechanism 50 are exposed on the conveyance area of the optical disk 2, respectively, are formed in the upper surface 6a. A side plate opening 6e through which a loading cam plate 53 coupled to the slider 122 slid by the driving motor 121 is inserted is formed in the side plate section 6b on the side where the deck section 4a is provided. On the upper surface 6a of the main chassis 6, on the bottom case 4 side, the eject arm 52 of the disk conveying mechanism 50 that conveys the optical disk 2 over the inside and the outside of the housing 3, the operation arm 58 that transmits a driving force of the driving mechanism 120 and operates the eject arm 52, and the loop cam 57 that guides movement of the second link arm 55 are locked.

In the main chassis 6, in the side plate sections 6b on both the sides, plural guide pieces 6f bent inward at substantially a right angle are provided and a through hole 6h for fixing the main chassis 6 to the bottom case 4 is provided. On the other hand, in the bottom case 4, a screw hole 4c is formed in a position corresponding to the through hole 6h. The main chassis 6 is fixed by screwing a screw in the screw hole 4c and the through hole 6h.

Figure 7:
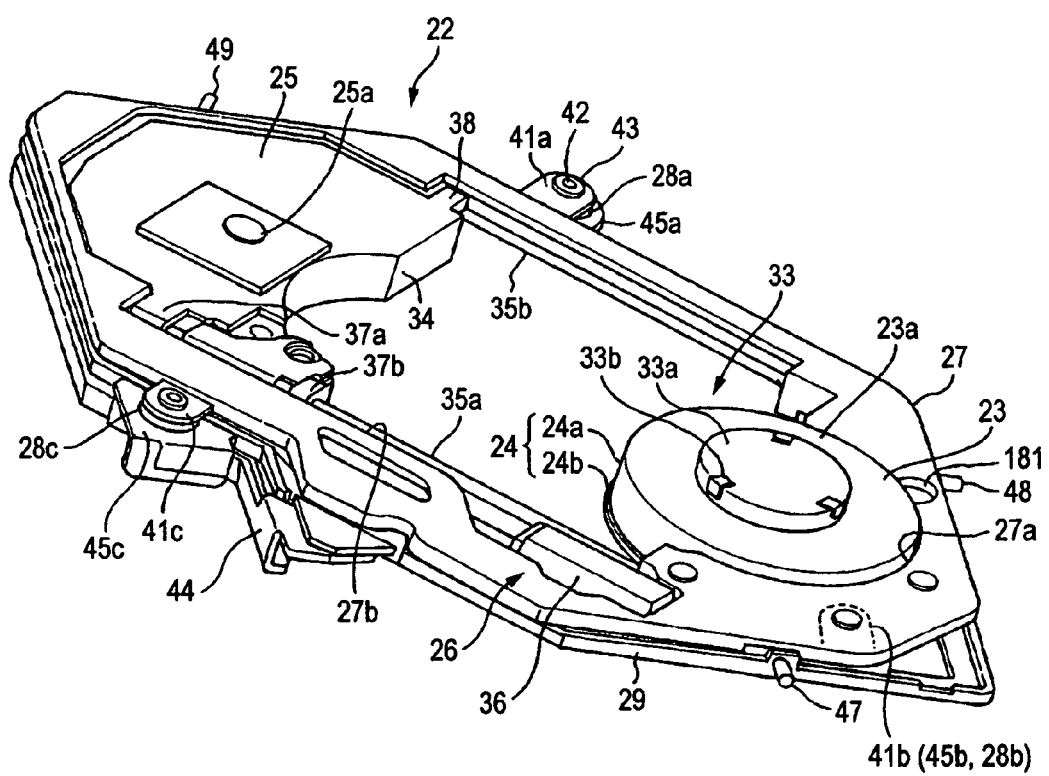
FIG. 7 is a perspective view showing a base unit.

The disk drive device 1 includes the base unit 22 that constitutes a drive main body on the bottom surface of the bottom case 4. The base unit 22 has, as shown in FIG. 7, a base chassis 27 formed of a frame body of a substantial rectangular shape. The base chassis 27 is supported by a sub-chassis 29 via plural dampers 28a to 28c. The base chassis 27 is disposed in the bottom case 4 via the sub-chassis 29, whereby one end side in the longitudinal direction of the base unit 22 is located substantially in the center of the hosing 3. In the base unit 22, on one end side in the longitudinal direction, a disk mounting section 23 on which the optical disk 2 inserted into the inside of the housing 3 from the disk inserting and ejecting opening 19 and a disk rotation driving mechanism 24 that drives to rotate the optical disk 2 mounted on the disk mounting section 23 are provided. The base unit 22 has an optical pickup 25 that writes a signal in and reads out a signal from the optical disk 2 driven to rotate by the disk rotation driving mechanism 24 and a pickup feeding mechanism 26 that conveys the optical pickup 25 over the longitudinal direction to thereby feed the optical pickup 25 in a radial direction of the optical disk 2. The optical pickup 25 and the pickup feeding mechanism 26 are integrally provided in the base chassis 27. Since the base chassis 27 is supported by the sub-chassis 29, the base unit 22 is operated to rise and fall with respect to the optical disk 2 by a base elevating mechanism 150 described later together with the sub-chassis 29.

The base unit 22 is exposed on the disk conveyance area through the opening for base 6c of the main chassis 6 such that the disk mounting section 23 is located substantially in the center on the bottom surface of the bottom case 4. The base unit 22 is allowed to rise and fall by the base elevating mechanism 150. In an initial state, the base unit 22 is located below the optical disk 2 inserted into the inside of the housing 3 from the disk inserting and ejecting opening 19. According to loading operation for the optical disk 2, the base unit 22 is lifted and rotatably engages with the optical disk 2. After recording and reproduction operations, the base unit 22 is lowered by the base elevating mechanism 150, released from the engagement with the optical disk 2, and retracted from the conveyance area of the optical disk 2.

Figure 6:
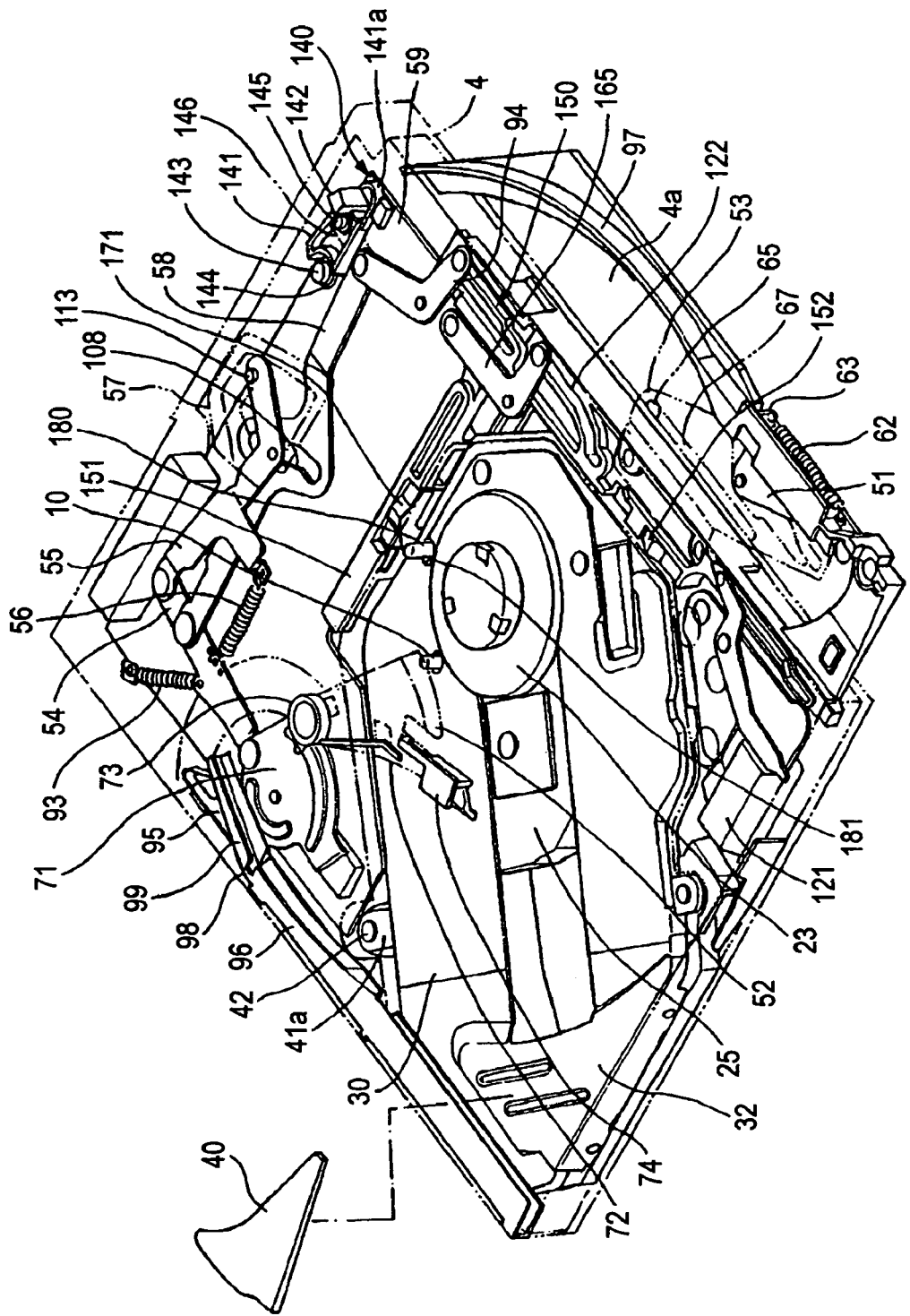
FIG. 6 is a perspective view showing the inside of the disk drive device to which the invention is applied.

The base chassis 27 is formed by punching a sheet metal in a predetermined shape and slightly bending the periphery of the sheet metal downward. In a main surface of the base chassis 27, an opening for table 27a of a substantial semicircular shape through which the turntable 23a of the disk mounting section 23 described later is exposed upward and an opening for pickup 276 of a substantial rectangular shape through which an object lens 25a of the optical pickup 25 described later is exposed upward are continuously formed. As shown in FIG. 6, a decorative laminate 30 in which openings corresponding to the openings 27a and 27b are formed is attached to an upper surface of the base chassis 27.

In the base chassis 27, a guide plate 32 that prevents contact of the optical disk 2 and the base chassis 27 and guides the optical disk 2 to a contact member 74 of the eject arm 52 is formed at an end on the opposite side of the disk mounting section 23. A fiber sheet 40 is stuck to the guide plate 32. Thus, even when the optical disk 2 is brought into sliding contact with the guide plate 32, it is possible to prevent the signal recording surface of the optical disk 2 from being scratched.

In the base chassis 27, coupling pieces 41a and 41b coupled to the sub-chassis 29 via the dampers 28a and 28b are protrudingly provided on both the sides in the longitudinal direction. Inserting holes 43 that are coupled to coupling pieces 45a and 45b formed in the sub-chassis 29 and through which stepped screws 42 are inserted are drilled in the respective coupling pieces 41a and 41b.

The disk mounting section 23 has the turntable 23a that is driven to rotate by the disk rotation driving mechanism 24. A chucking mechanism 33 for mounting the optical disk 2 is provided in the center of the turntable 23a. The chucking mechanism 33 has an engaging projection 33a engaged in the center hole 2a of the optical disk 2 and plural engaging pawls 33b that lock the periphery of the center hole 2a of the optical disk 2 engaged with the engaging projection 33a. The chucking mechanism 33 holds the optical disk 2 on the turntable 23a.

The disk rotation driving mechanism 24 has a spindle motor 24a of a flat shape that drives to rotate the optical disk 2 integrally with the turntable 23a. The spindle motor 24a is attached to a lower surface of the base chassis 27 via a support plate 24b by screwing such that the turntable 23a provided on the upper surface slightly projects from the opening for table 27a of the base chassis 27.

The optical pickup 25 has an optical block that condenses a light beam emitted from a semiconductor laser serving as a light source using the object lens 25a and irradiates the light beam on the signal recording surface of the optical disk 2 and detects a return light beam reflected by the signal recording surface of the optical disk 2 using a photodetector made of a light receiving element and the like. The optical pickup 25 writes a signal in and reads out a signal from the optical disk 2.

The optical pickup 25 has an object lens driving mechanism such as a biaxial actuator that drives to displace the object lens 25a in an optical axis direction (a focusing direction) and a direction orthogonal to a recording track of the optical disk 2 (a tracking direction). The optical pickup 25 performs, on the basis of a detection signal from the optical disk 2 detected by the photodetector, driving control such as focus servo for focusing the object lens 25a on the signal recording surface of the optical disk 2 and tracking servo for causing a spot of a light beam condensed by the object lens 25a to follow a recording track while displacing the object lens 25a in the focusing direction and the tracking direction using the biaxial actuator. As the object lens driving mechanism, a triaxial actuator that, in addition to the focusing control and the tracking control, makes it possible to adjust inclination (skew) of the object lens 25a with respect to the signal recording surface of the optical disk 2 such that the light beam condensed by the object lens 25a is vertically irradiated on the signal recording surface of the optical disk 2 may be used.

The pickup feeding mechanism 26 has a pickup base 34 mounted with the optical pickup 25, a pair of guide shafts 35a and 35b that support the pickup base 34 slidably in the radial direction of the optical disk 2, and a displacement driving mechanism 36 that drives to displace the pickup base 34 supported by the pair of guide shafts 35a and 35b in the radial direction of the optical disk 2.

In the pickup base 34, a pair of guide pieces 37a and 37b in which guide holes, through which one guide shaft 35a of the pair of guide shafts 35a and 35b is inserted, are formed and a guide piece 38 in which a guide groove that nips the other guide shaft 35b is formed are formed to project from sides opposed to each other. Consequently, the pickup base 34 is slidably supported by the pair of guide shafts 35a and 35b.

The pair of guide shafts 35a and 35b are arranged on a lower surface of the base chassis 27 to be parallel to the radial direction of the optical disk 2. The pair of guide shafts 35a and 35b guide the pickup base 34, on which the optical pickup 25 is exposed through the opening for pickup 27b of the base chassis 27, over the inner and outer periphery of the optical disk 2.

The displacement driving mechanism 36 converts rotation driving of a driving motor 31 attached to the base chassis 27 into linear driving via a gear and a rack (not shown) and drives to displace the pickup base 34 in a direction along the pair of guide shafts 35a and 35b, that is, the radial direction of the optical disk 2. For example, a stepping motor including a lead screw is used as the displacement driving mechanism 36.

The sub-chassis 29 that supports such a base chassis 27 via the dampers 28 will be explained. The sub-chassis 29 is operated to rise and fall according to conveyance of the optical disk 2 by the base elevating mechanism 150 described later to thereby bring the base chassis 27 closer to the optical disk 2 or separating the base chassis 27 from the optical disk 2. The sub-chassis 29 has a shape substantially identical with an external shape of the base chassis 27 and is made of a frame body of a substantial rectangular shape slightly larger than the base chassis 27. The sub-chassis 29 is coupled to the base chassis 27 to constitute the base unit 22 together with the base chassis 27. The sub-chassis 29 is provided along a side on which the guide shaft 35a is provided. A reinforcing chassis 44 that reinforces the sub-chassis 29 is integrally attached to the sub-chassis 29. In the sub-chassis 29, coupling pieces 45a and 45b to which the dampers 28a and 28b are attached and that are coupled to the base chassis 27 are formed. The coupling piece 45a is provided on one side in the longitudinal direction and in a position corresponding to the coupling piece 41a of the base chassis 27. The coupling piece 45b is protrudingly provided on the other side in the longitudinal direction and at an end on the disk mounting section 23 side corresponding to the coupling piece 41b of the base chassis 27.

Figure 8:
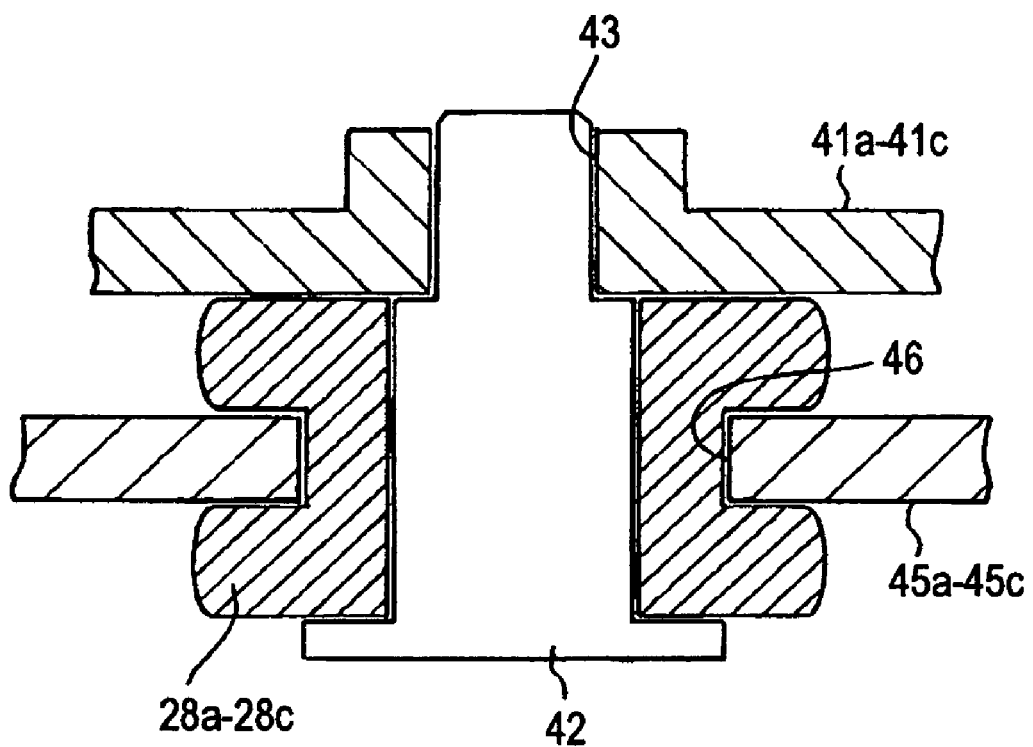
FIG. 8 is a sectional view showing a coupling section of a base chassis and a sub-chassis.

At an end on the opposite side of the disk mounting section 23 of the other side in the longitudinal direction, a coupling piece is not provided in the sub-chassis 29 and a coupling piece 45c is provided in the reinforcing chassis 44 fixed to the sub-chassis 29 in association with a coupling piece 41c of the base chassis 27. In the respective coupling pieces 45a to 45c, as shown in FIG. 8, inserting holes 46 continued to the respective inserting holes 43 of the respective coupling pieces 41a to 41c of the base chassis 27 are drilled. The dampers 28a to 28c are attached to the coupling pieces 45a to 45c, respectively. The coupling pieces 45a to 45c are coupled to the coupling pieces 41a to 41c of the base chassis 27 via the dampers 28a to 28c. The stepped screws 42 are inserted through the respective inserting holes 43 and 46.

The sub-chassis 29 has, as shown in FIG. 7, a first supporting shaft 47 located on the disk mounting section 23 side of the side opposed to the slider 122 described later and engaged with a first cam slit 130 of the slider 122 to be supported, a second supporting shaft 48 located on the disk mounting section 23 side of the side opposed to a sub-slider 151 and engaged with a second cam slit 170 of the sub-slider 151 to be supported, and a third supporting shaft 49 located on the front surface side of the side on the opposite side of the side opposed to the slider 122 and rotatably supported in a shaft hole 9 provided in the side plate section 6b of the main chassis 6.

Therefore, in the sub-chassis 29, the first supporting shaft 47 slides in the first cam slit 130 and the second supporting shaft 48 slides in the second cam slit 170 in association with slide of the slider 122 and the sub-slider 151. Consequently, the disk mounting section 23 side is rotated with the third supporting shaft 49 as a fulcrum to allow the base chassis 27 to rise and fall.

On the bottom surface of the bottom case 4, as shown in FIG. 3, a push-up pin 10 serving as chucking releasing means for disengaging the optical disk 2 mounted on the turntable 23a of the disk mounting section 23 from the turntable 23a when the base elevating mechanism 150 lowers the sub-chassis 29 and the base chassis 27 is provided. The push-up pin 10 is located near the disk mounting section 23 of the base unit 22, projected upward from the bottom surface of the bottom case 4, and inserted through an inserting hole 30c drilled in the decorative laminate 30 to be exposed on the disk conveyance area.

Figure 9:
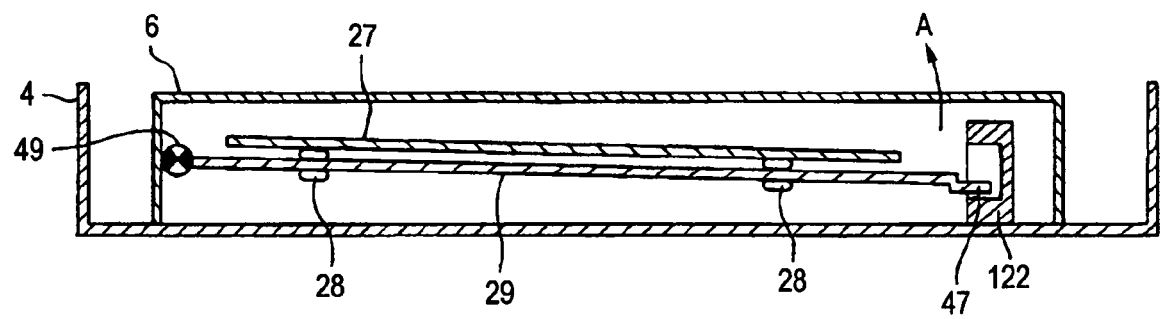
FIG. 9 is a diagram for explaining a support structure by a damper between the base chassis and the sub-chassis in the base unit.

The base unit 22 having such a structure is, as shown in a schematic diagram in FIG. 9, lifted and lowered in an arrow A direction and a counter-arrow A direction. In this case, the base chassis 27 is supported only by the sub-chassis 29 via the respective dampers 28 and all paths through which vibration from the outside is transmitted pass through the sub-chassis 29 attached with the dampers 28. Thus, resistance against impact is improved. An excess weight including the respective dampers 28 is not applied to the base chassis 27. In other words, a total weight of the base chassis 27 serving as an object through which impact is transmitted is light because the dampers are not provided. Thus, impact resistance is further improved.

When the main chassis 6 is fixed to the bottom case 4, the main chassis 6 may be fixed via the dampers. Specifically, as shown in FIG. 10, the dampers 28 are provided between the respective guide pieces 6f and the screw holes 4c of the bottom case 4 to fix the main chassis 6 with stepped screws.

Figure 11:
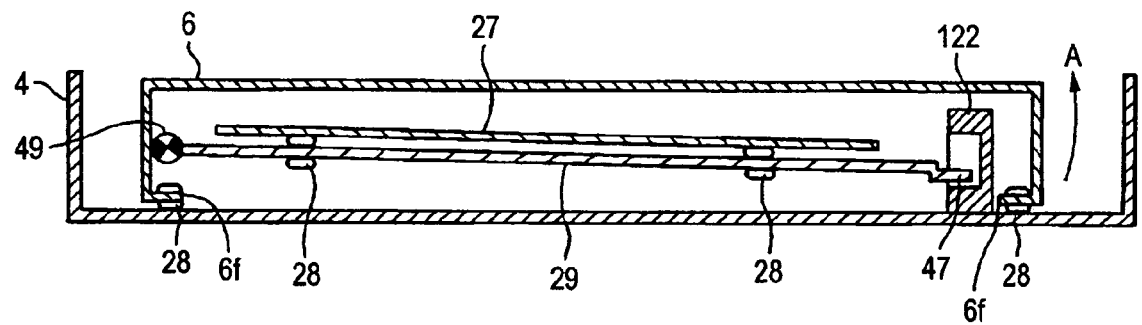
FIG. 11 is a sectional view showing another example of the disk drive device.

In the base unit 22 fixed in this way, as shown in a schematic diagram in FIG. 11, the sub-chassis 29 is supported by the main chassis 6 and the main chassis 6 is fixed to the bottom case 4 via the dampers 28. In this case, the base chassis 27 is supported only by the sub-chassis 29 via the dampers 28a to 28c and the sub-chassis 29 is supported by the main chassis 6. The main chassis 6 is fixed to the bottom case 4 via the damper 28. Paths through which vibration from the outside is transmitted pass through the main chassis 6 attached with the dampers 28 and the sub-chassis 29 attached with the dampers 28a to 28c. Since the vibration is transmitted via the dampers arranged at two stages, resistance against impact is further improved.

A buffer material 39 may be further provided between substantially the middle of the side plate section 6b of the main chassis 6 and the bottom case 4. The buffer material 39 is formed of an elastic member such as a thin rubber piece in order to block paths through which impact is transmitted when the side plate section 6b and the bottom case 4 are brought into direct contact with each other by amplitude of vibration due to impact. An adhesive layer is formed on one side of the buffer material 39. The adhesive layer is stuck to the side plate section 6b of the main chassis 6.

Consequently, even when a clearance between the bottom case 4 and the main chassis 6 is reduced and the main chassis 6 is connected to the inside of the bottom case 4 via the dampers 28, it is possible to prevent a situation in which the side plate section 6b of the main chassis 6 comes into contact with the bottom case 4 and disturbance is transmitted to the main chassis 6 and the base chassis 22 via the contact section.

The disk drive device 1 includes, as shown in FIGS. 12 to 19, the disk conveying mechanism 50 that performs conveyance of the optical disk 2 between a disk inserting and removing position where the optical disk 2 is inserted in and removed from the disk inserting and ejecting opening 19 and a disk mounting position where the optical disk 2 is mounted on the turntable 23a of the disk mounting section 23.

The disk conveying mechanism 50 has the loading arm 51 and the eject arm 52 that are allowed to swing in the plane parallel to the main surface of the optical disk 2 as support members operated to move between the upper surface 6a of the main chassis 6 and the main surface opposed to the disk mounting section 23 of the top plate section 5a, the loading cam plate 53 that transmits a driving force from the driving mechanism 120 described later to the loading arm 51, the first link arm 54 that rotates the eject arm 52 in an ejecting direction of the optical disk 2, the second link arm 55 coupled to the first link arm 54, a helical tension spring 56 suspended between the first and the second link arms 54 and 55, a loop cam 57 that is engaged with a guide projection 113 of the second link arm 55 and guides the second link arm 55, and an operation arm 58 that is coupled to the driving mechanism 120 to thereby operate the first link arm 54 to move in a direction in which the eject arm 52 inserts or ejects the optical disk 2.

In the disk conveying mechanism 50, while the eject arm 52 is rotated to a predetermined position by the insertion of the optical disk 2, the first link arm 54 is rotated in one direction by the eject arm 52 and the second link arm 55 is moved in a direction different from the rotating direction of the first link arm 54 since the guide projection 113 formed at the tip thereof is guided by the loop cam 57. Thus, the eject arm 52 is rotated in the inserting direction while being urged in the ejecting direction by the helical tension spring 56. On the other hand, when the optical disk 2 is ejected, the guide projection 113 of the second link arm 55 is guided by the loop cam 57 and the first and the second link arms 54 and 55 are brought into close contact with each other. Thus, the helical tension spring 56 is not extended and, in a state in which an urging force in the ejecting direction does not work, the eject arm 52 is rotated by the operation arm 58 via the first link arm 54 to eject the optical disk 2.

Consequently, when the optical disk 2 is inserted, it is possible to apply the urging force in the ejecting direction by the helical tension spring 56 in a process in which the optical disk 2 is inserted to the predetermined position by the user. Thus, it is possible to prevent the optical disk 2 from being left in a state in which the optical disk 2 is not completely inserted into the housing 3 because of suspension of the insertion of the optical disk 2 by the user. When the optical disk 2 is ejected, the urging force in the ejecting direction by the helical tension spring 56 given to the eject arm 52 does not work. Thus, the eject arm 52 is rotated according to operation of the operation arm 58 subjected to the driving force of the driving mechanism 120. It is possible to stably eject, without relying on an elastic force, the optical disk 2 to a predetermined stop position where the center hole 2a of the optical disk 2 is ejected to the outside of the housing 3.

The respective components of the disk conveying mechanism 50 will be hereinafter explained in detail.

The loading arm 51 conveys the optical disk 2 onto the disk mounting section 23. A base end of the loading arm 51 is rotatably supported on the deck section 4a of the bottom case 4 and further on the disk inserting and ejecting opening 19 side than the disk mounting section 23 and a tip thereof is set rotatable in an arrow a1 direction and an arrow a2 direction in FIG. 12. Specifically, the loading arm 51 is made of a sheet metal of a flat shape. An inserting section 60 is protrudingly provided at one end thereof. The inserting section 60 is engaged with the deck section 4a, whereby the loading arm 51 is supported to be rotatable in the arrow a1 direction and the arrow a2 direction in FIG. 12 on the deck section 4a.

In the loading arm 51, a contact section 61, which is brought into contact with the outer periphery of the optical disk 2 inserted from the disk inserting and ejecting opening 19, is provided to project upward at the tip thereof. A small-diameter rotary roller 61a is rotatably attached to the contact section 61. The contact section 61 is made of resin softer than the optical disk 2. A center portion of the contact section 61, which is brought into contact with the outer periphery of the optical disk 2 inserted from the disk inserting and ejecting opening 19, curves inward. Both ends thereof regulate movement in a height direction of the optical disk 2 as a flange section having an enlarged diameter. In this way, the contact section 61 has a substantial drum-like shape.

In the loading arm 51, a locking piece 63 is formed to rise near the inserting section 60. An end of a coil spring 62 is locked to a right guide wall 97. The other end of the coil spring 62 is locked to the locking piece 63 (see FIG. 6). Consequently, the loading arm 51 is typically urged to rotate, with the inserting section 60 as a fulcrum, in the arrow a1 direction in FIG. 12 in which the optical disk 2 is urged from the disk inserting and ejecting opening 19 side to the disk mounting section 23 side.

Moreover, in the loading arm 51, an engaging projection 64, which is inserted through and engaged with a first cam groove 66 of a loading cam plate 53 described later, is protrudingly provided. The loading arm 51 is rotated while regulating an urging force of the coil spring 62 since the engaging projection 64 moves along the first cam groove 66 of the loading cam plate 52.

Figure 21:
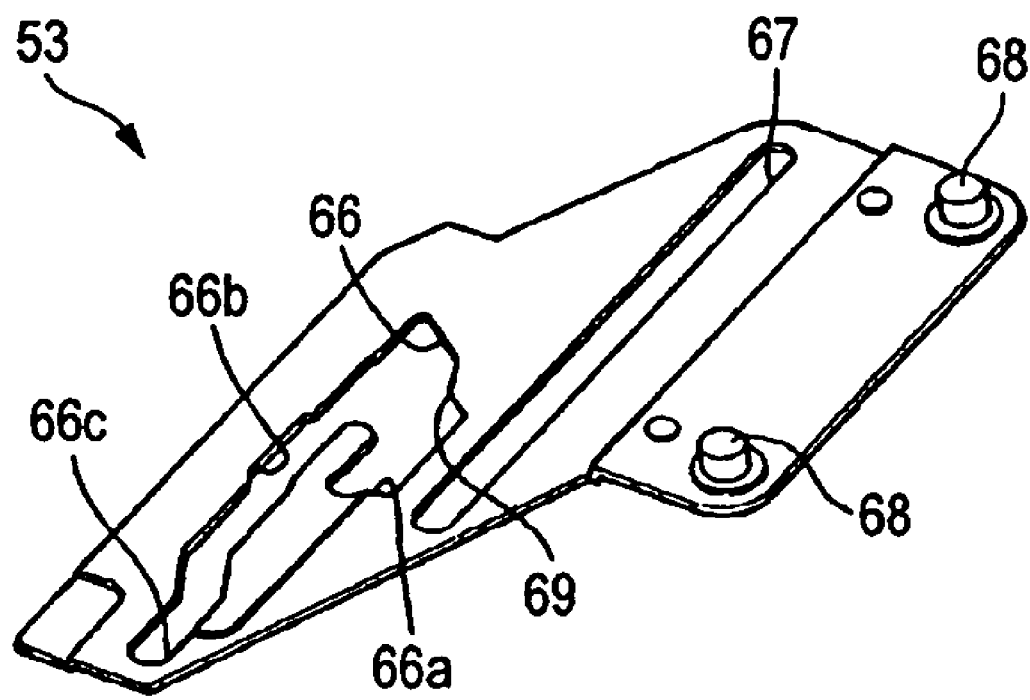
FIG. 21 is a perspective view showing a loading cam plate.

The loading cam plate 53, which rotates the loading arm 51, is made of a sheet metal of a flat shape. The loading cam plate 53 is engaged with the slider 122 of the driving mechanism 120 described later to move to the front and the rear on the deck section 4a following movement of the slider 122. The loading cam plate 53 is superimposed on the loading arm 51 supported on the deck section 4a and the engaging projection 64 is inserted through the loading cam plate 53. Consequently, the loading cam plate 53 regulates the rotation of the loading arm 51. In the loading cam plate 53, as shown in FIG. 21, the first cam groove 66 through which the engaging projection 64 protrudingly provided in the loading arm 51 is inserted, a second cam groove 67 through which a guide projection 65 protrudingly provided in the deck section 4a is inserted, and a pair of engaging protrusions 68 that engage with the slider 122 are formed.

The first cam groove 66 regulates the rotation of the loading arm 51 urged in the loading direction of the optical disk 2 by the coil spring 62 when the engaging projection 64 is slid. The first cam groove 66 includes a first guide section 66a that regulates the engaging projection 64 to regulate the loading arm 51 from rotating in the arrow a1 direction in FIG. 12, which is the loading direction of the optical disk 2, a second guide section 66b that is formed adjacent to and continuously from the first guide section 66a and rotates the loading arm 51 in the loading direction of the optical disk 2, and a third guide section 66c that is formed continuously from the second guide section 66b and guides the engaging projection 64 such that the loading arm 51 rotates in the arrow a2 direction in FIG. 16 in which the loading arm 51 is separated from the outer periphery of the optical disk 2 mounted on the disk mounting section 23.

When the loading cam plate 53 is moved backward in the housing 3, the engaging projection 64 moves along the second guide section 66b. Thus, the loading arm 51 subjected to the urging force of the coil spring 62 is rotated in the arrow a1 direction in FIG. 12, which is the loading direction of the optical disk 2, to press the optical disk 2 to the disk mounting section 23 side. When the optical disk 2 is mounted on the disk mounting section 23, the engaging projection 64 is moved along the third guide section 66c. Thus, the loading arm 51 is rotated in the arrow a2 direction in FIG. 16 against the urging force of the coil spring 62 and the contact section 61 of the loading arm 51 separates from the outer periphery of the optical disk 2 to allow the optical disk 2 to rotate.

When the optical disk 2 is ejected, the loading cam plate 53 is moved backward since the slider 122 is moved forward. Thus, the engaging projection 64 moves from the second guide section 66b to the first guide section 66a and the loading arm 51 is rotated in the arrow a1 direction in FIGS. 18 and 19 to be brought into contact with the optical disk 2. In this case, the optical disk 2 is ejected while being pressed in the ejecting direction by the eject arm 52, which is subjected to the driving force of the driving mechanism 120, and urged in the inserting direction by the loading arm 51, which is urged by the coil spring 62. Consequently, when the optical disk 2 is ejected, the disk conveying mechanism 50 pushes out the optical disk 2 to a predetermined ejection position while nipping the optical disk 2 with the loading arm 51 and the eject arm 52. The loading arm 51 can prevent sudden ejection of the optical disk 2.

When the ejection of the optical disk 2 ends, the engaging projection 64 is locked by a projection 69 formed in the first cam groove 66 of the loading cam plate 53. Thus, the rotation in the a1 direction of the loading arm 51 is regulated and the loading arm 51 held in a position retracted from the disk conveyance area to wait for insertion of the optical disk 2.

The second cam groove 67 is inserted through the guide projection 65 protrudingly provided in the deck section 4a to guide movement of the loading cam plate 53. The second cam groove 67 is a linear cam groove parallel to a moving direction of the slider 122. Since the guide projection 65 slides following the movement of the slider 122, the second cam groove 67 guides the loading cam plate 53 in the moving direction of the slider 122.

The pair of protrusions 68 engaging with the slider 122 are formed on one side of the loading cam late 53 to be spaced apart from each other. The engaging protrusions 68 are protrudingly provided downward and extended to the bottom surface side of the bottom case 4 to be engaged with engaging recesses 127 of the slider 122 disposed along sides of the bottom case 4. Consequently, the loading cam plate 53 and the slider 122 are integrated and the loading cam plate 53 is slid according to the movement of the slider 122.

The other side on the opposite side of the side on which such engaging protrusions 68 are formed is slidingly inserted through a clearance provided between the right guide wall 57 and the deck section 4a. Thus, the loading cam plate 53 is prevented from rising from the deck section 4a.

Figure 22:
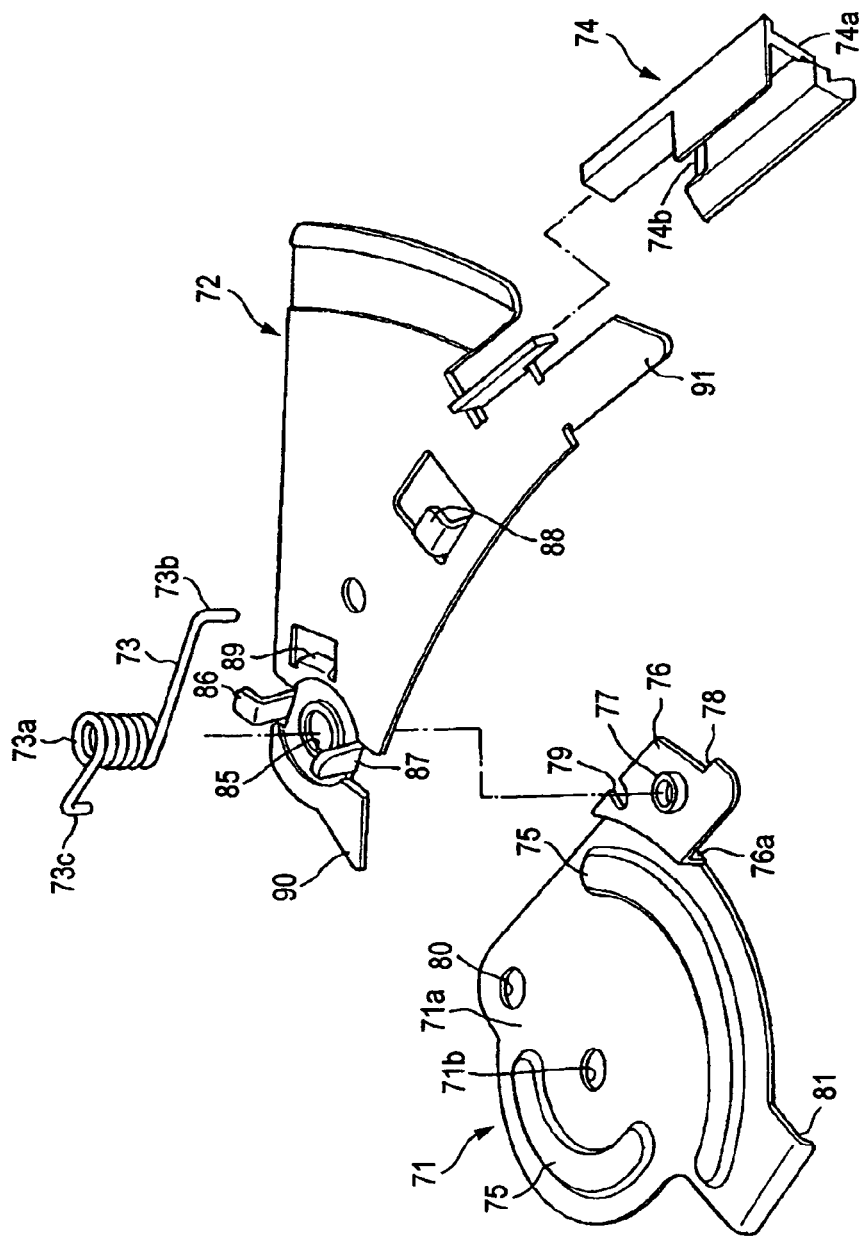
FIG. 22 is a disassembled perspective view showing the eject arm.

The eject arm 52 that ejects the optical disk 2 from the disk mounting section 23 to the outside of the disk inserting and ejecting opening 19 is disposed on the side on the opposite side of the side on which the loading arm 51 is formed and further on the rear surface side of the housing 3 than the disk mounting section 23. The eject arm 52 is rotated, while being operated by the first and the second link arms 54 and 55 and the operation arm 58 described later, in an arrow b1 direction in FIG. 12 in which the optical disk 2 is conveyed to the disk mounting section 23 side and an arrow b2 direction in FIG. 12 in which the optical disk 2 is ejected to the disk inserting and ejecting opening 19 side. The eject arm 52 includes, as shown in FIG. 22, a rotation support member 71 rotatably supported by the main chassis 6, a push-out arm 72 that is rotatably engaged with the rotation support member 71 and pushes out the optical disk 2, a coil spring 73 that urges the push-out arm 72 in the ejecting direction of the optical disk 2, and a contact member 74 attached to the tip of the push-out arm 72 and brought into contact with the side of the optical disk 2.

The rotation support member 71 is made of a sheet metal of a substantial circular shape and rotatably attached on the opposite side of the disk conveyance area of the upper surface 6a of the main chassis 6. An attachment opening 71b for attaching the rotation support member 71 to the main chassis 6 is drilled in substantially the center of a main surface 71a of the rotation support member 71. In the rotation support member 71, a slide contact section 75 of a projected shape that is brought into sliding contact with the main chassis 6 is formed to swell in the main surface 71a. Since the slide contact section 75 comes into sliding contact with the main chassis 6, the rotation support member 71 is rotated smoothly.

An engaging piece 76 with which the push-out arm 72 and the coil spring 73 are engaged is formed in the rotation support member 71. The engaging piece 76 is bent from the tip of a vertical wall 76a, which is vertically provided from the main surface 71a, to be provided above the main surface 71a and projected to the upper surface 6a side from the opening for eject arm 6d of the main chassis 6. In the engaging piece 76, an engaging section 77 of a cylindrical shape that is inserted through an opening 85 of the push-out arm 72 and through which the coil spring 73 is inserted, a rotation regulating section 78 that is engaged with a locking piece 89 protrudingly provided from the push-out arm 72 to regulate the rotation of the push-out arm 72, and a locking recess 79 that locks one arm 73c of the coil spring 73 are formed.

In the rotation support member 71, an engaging hole 80 with which the first link arm 54 described later is rotatably engaged is formed in the main surface 71a. In the rotation support member 71, a bent piece 81 is formed from one side section of the main surface 71a. The bent piece 81 is bent downward from the main surface 71a to form an abutment piece that is brought into abutment against the sub-slider 151 of the base elevating mechanism 150 described later. When the bent piece 81 is rotated in the arrow b1 direction in FIG. 12, in which the optical disk 2 is conveyed to the disk mounting section 23 side, according to the insertion of the optical disk 2, the bent piece 81 turns on a first switch SW1 mounted on the circuit board 59. Consequently, the disk drive device 1 can detect that the eject arm 52 pressed by the optical disk 2 is rotated to the rear surface side of the housing 2 and can take timing for driving the driving mechanism 120.

The push-out arm 72 rotatably engaged with the engaging piece 76 is made of a sheet metal of a flat shape. The push-out arm 72 has the opening 85 that is formed at one end thereof and through which the engaging section 77 of the engaging piece 76 is inserted and engaged, first to third locking projected pieces 86 to 88 that lock the coil spring 73, the locking piece 89 locked by the rotation regulating section 78 of the rotation support member 71, a pressing piece 90 that presses the left guide wall 96, which guides centering of the optical disk 2, and separates the left guide wall 96 from the optical disk 2, and an attaching section 91 that is formed at the other end and to which the contact member 74 is attached. The engaging section 77 of the rotation support member 71 is inserted through the opening 85, whereby the push-out arm 72 rotatably engages with the rotation support member 71. The first and the second locking projected pieces 86 and 87 vertically provided around the opening 85 are inserted through a cylindrical section 73a of the coil spring 73 to hold the coil spring 73. One arm 73b of the coil spring 73 is locked to the third locking projected piece 88. The other arm 73c of the coil spring 73 is locked to the locking recess 79 of the rotation support member 71. Consequently, the push-out arm 72 is urged to rotate to the disk inserting and ejecting opening 19 side by a predetermined spring force with the engaging section 77 of the rotation support member 71 as a fulcrum.

The locking piece 89 is bent downward from the vicinity of the opening 85. Since the push-out arm 72 rotates, the locking piece 89 comes into contact with the rotation regulating section 78 of the rotation support member 71 to regulate rotation of the push-out arm 72 urged to the disk inserting and ejecting opening 19 side. The pressing piece 90 is urged to the conveyance area of the optical disk 2 and presses the left guide wall 96, which guides centering of the optical disk 2, to retract the left guide wall 96 from the optical disk 2 to make the left guide wall 96 rotatable at the time of recording and/or reproduction.

The contact member 74 attached to the attaching section 91 of the push-out arm 72 is made of a resin molded product softer than the optical disk 2. The contact member 74 has a disk receiving section 74a of a concave shape that is brought into contact with the outer periphery of the optical disk 2, an inserting hole 74b through which the attaching section 91 of the push-out arm 72 is inserted, and a regulating section 74c that regulates insertion of a small-diameter disk into the housing 3 when the small-diameter disk is inserted by mistake. The attaching section 91 is inserted through the inserting hole 74b, whereby the contact member 74 is integrated with the push-out arm 72. A stopper 100 that prevents miss-insertion of a small-diameter optical disk 101 may be formed in the contact member 74. The stopper 100 will be described in detail later.

In such an eject arm 52, the rotation support member 71 and the push-out arm 72 are rotatably engaged with each other and the push-out arm 72 is urged to rotate to the disk inserting and ejecting opening 19 side by a predetermined spring force of the coil spring 73. Therefore, the eject arm 52 is operated to rotate in the arrow b2 direction in FIG. 19, in which the optical disk 2 is ejected to the outside of the housing 3, by the first link arm 54 and the operation arm 58 subjected to the driving force of the driving mechanism 120 described later, even if a force in the arrow b1 direction acts on the eject arm 52 because, for example, an obstacle is present on the conveyance area of the optical disk 2, the push-out arm 72 subjected to a force in a direction opposite to the ejecting direction of the optical disk 2 is rotated in the arrow b1 direction against the urging force of the coil spring 73 with the engaging section 77 of the rotation support member 71 as a fulcrum. Consequently, the driving force that rotates the eject arm 52 in the b2 direction and the force working in the direction opposite to the direction of the driving force are prevented from being opposed to each other. Therefore, excessive loads are not applied to a motor and the like of the driving mechanism 120 that drives the first link arm 54 and the operation arm 58 to rotate the eject arm 52 in the arrow b2 direction in FIG. 19. The optical disk 2 is nipped by the urging force in the ejecting direction by the eject arm 52 and the force working in the opposite direction. Thus, it is possible to prevent the optical disk 2 from being broken.

The first link arm 54 rotatably engaged with the rotation support member 71 of the eject arm 52 is operated by the operation arm 58 described later to rotate the eject arm 52 in the inserting direction of the optical disk 2 or the arrow b1 direction or the arrow b2 direction in FIG. 12, which is the ejecting direction. The first link arm 54 is made of a metal plate formed in a substantial rectangular shape. One end in the longitudinal direction thereof is rotatably engaged with the engaging hole 80 of the rotation support member 71 and the other end in the longitudinal direction is rotatably engaged with the second link arm 55. The other end of an urging coil spring 93, the other end 58b of the operation arm 58, and one end of the helical tension spring 56 suspended between the first link arm 54 and the second link arm 55 are attached to substantially the center in the longitudinal direction.

One end of the urging coil spring 93 is locked to a locking section provided on the upper surface 6a of the main chassis 6. The other end of the urging coil spring 93 is attached to substantially the center of the first link arm 54. Consequently, the urging coil spring 93 lifts the first and the second link arms 54 and 55 in a p1 direction in FIG. 12 and rotates the guide projection 113 of the second link arm 55 to the loop cam 57.

The second link arm 55 rotatably engaged with the other end of the first link arm 54 is made of a long sheet metal. At one end of the link arm 55, the guide projection 113 is protrudingly provided. The guide projection 113 is protrudingly provided toward a guide groove 114 of the loop cam 57 and engaged with the guide groove 114 to be guided to a loading guide wall 112a and an eject guide wall 112b and control a distance between the first link arm 54 and the second link arm 55. A spring locking piece 55a is provided in the middle in the longitudinal direction of the second link arm 55. One end of the helical tension spring 56 suspended between the second link arm 55 and the first link arm 54 is locked to the spring locking piece 55a.

In the second link arm 55, an engaging projection 116 that is engaged with the cam groove 108 formed in the operation arm 58 described later is formed. In the disk conveying mechanism 50, since the engaging projection 116 is engaged with the cam groove 108, the second link arm 55 can rotate the eject arm 52 in association with the movement of the slider 122 and can stably eject the optical disk 2 to the predetermined ejection position.

During ejection of the optical disk 2, when the panel curtain provided in the disk inserting and ejecting opening 19 of the front panel 18 comes into sliding contact with the optical disk 2 to apply loads to the optical disk 2, the rotation support member 71 of the eject arm 52 and the first link arm 54 are urged in the b1 direction. If the second link arm 55 and the operation arm 58 are not engaged, even if the operation arm 58 is moved in a d2 direction following the slide in an f2 direction of the slider 122, the first link arm 54 simply rotates in the d2 direction with the engaging hole 80 as a fulcrum with respect to the rotation support member 71. It is difficult to rotate the eject arm 52 in the b2 direction. The second link arm 55 also simply rotates with respect to the first link arm 54.

On the other hand, when the second link arm 55 and the operation arm 58 are engaged, the engaging projection 116 is brought into contact with the sidewall of the cam groove 108 following the slide in the d2 direction of the operation arm 58. It is difficult for the second link arm 55 to freely rotate with respect to the first link arm 54. Since the engaging projection 116 of the second link arm 55 is brought into contact with the sidewall of the cam groove 108, the rotation in the d2 direction of the first link arm 54 is regulated. Therefore, during ejection of the optical disk 2, even when the eject arm 52 is urged in the b1 direction, when the operation arm 58 is moved in the d2 direction, the first link arm 54 is moved in the d2 direction against the urging force in the b1 direction and rotates the eject arm 52 in the b2 direction. Consequently, rotation in the b2 direction of the eject arm 52 corresponding to an amount of slide in the f2 direction of the slider 122 is realized and the eject arm 52 can surely eject the optical disk 2 to the predetermined ejection position.

As described above, the loop cam 57 that guides the movement of the guide projection 113 of the second link arm 55 is locked to the locking hole drilled in the upper surface 6a of the main chassis 6. A cam wall 112 of a substantial annular shape is vertically provided toward the bottom case 4 side. The guide projection 113 of the second link arm 55 rotates around the cam wall 112 from the loading to ejection of the optical disk 2. The loading guide wall 112a on which the guide projection 113 slides at the time of loading of the optical disk 2, the eject guide wall 112b on which the guide projection 113 slides at the time of ejection of the optical disk 2, and a protrusion 112c that prevents reverse movement of the guide projection 113 between the loading guide wall 112a and the eject guide wall 112b are formed in the cam wall 112. The guide groove 114 through which the guide projection 113 moves is formed by surrounding the guide walls 112a and 112b and the protrusion 112c with an outer peripheral section 112d.

The operation arm 58 that is coupled to the first link arm 54 and the driving mechanism 120 and operates the eject arm 52 is made of a long metal plate. The cam groove 108, through which the engaging projection 116 formed in the second link arm 55 is inserted is formed in the center in the longitudinal direction of the operation arm 58. One end 58a in the longitudinal direction of the operation arm 58 is engaged with a third link arm 94 coupled to the slider 122 of the driving mechanism 120. The other end 58b thereof is engaged with the first link arm 54.

As described above, the cam groove 108 is engaged with the engaging projection 116 of the second link arm 55 to rotate the eject arm 52 according to a slide operation of the slider 122. The cam groove 108 is formed in a long hole shape such that the engaging projection 116 is movable when the second link arm 55 rotates around the loop cam 57. The cam groove 108 is formed over a direction substantially orthogonal to an arrow d1 direction and an arrow d2 direction in FIG. 12, which are moving directions of the operation arm 58. Consequently, since the engaging projection 116 is brought into contact with the sidewall of the cam groove 108, the cam groove 108 can regulate the rotation of the second link arm 55 and regulate the rotation in the d2 direction of the first link arm 54.

Figure 12:
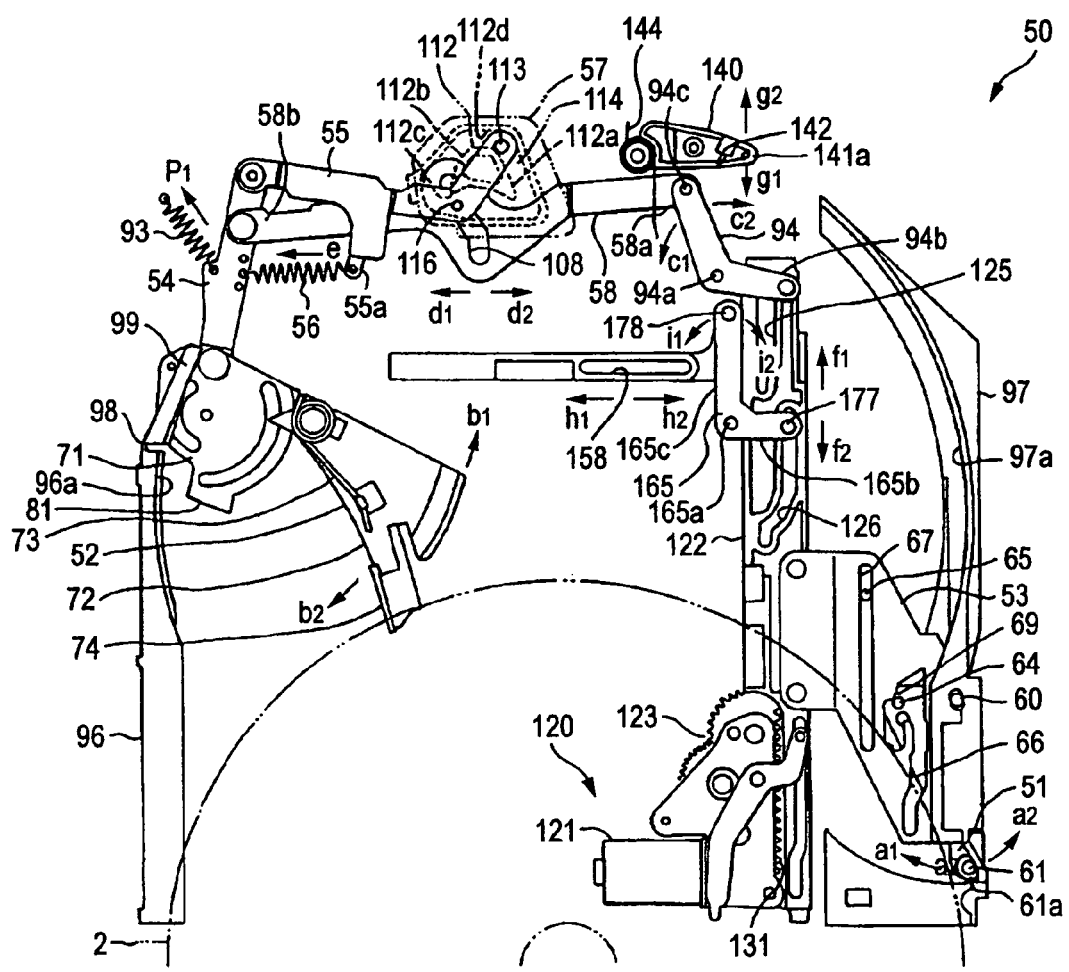
FIG. 12 is a plan view showing a process for conveying an optical disk and showing the start of insertion of the optical disk.

Since the slider 122 is operated to slide, the operation arm 58 is moved in the arrow d1 direction and the arrow d2 direction in FIG. 12, which are substantially left and right directions, via the third link arm 94 to operate to rotate the first link arm 54 and the eject arm 52. Specifically, when the operation arm 58 is moved in the arrow d1 direction in FIG. 12 by the third link arm 94, the operation arm 58 presses the first link arm 54 in the same direction to thereby rotate the eject arm 52 in the arrow b1 direction in FIG. 12, which is the inserting direction of the optical disk 2. When the operation arm 58 is moved in the arrow d2 direction in FIG. 12 by the third link arm 94, the operation arm 58 moves the first link arm 54 in the same direction to thereby rotate the eject arm 52 in the arrow b2 direction in FIG. 12, which is the ejecting direction of the optical disk 2.

The third link arm 94 rotatably engaged with the one end 58a of the operation arm 58 is made of a metal plate of a substantial L shape. Since a bent section 94a is rotatably attached to the main chassis 6, the third link arm 94 is supported to rotate freely in an arrow c1 direction and an arrow c2 direction in FIG. 12. An engaging projection 109 formed at one end 94b extended from the bent section 94a is engaged with the slider 122. The other end 94c is rotatably engaged with the operation arm 58. Consequently, when the slider 122 is subjected to the driving force of the driving motor 121 of the driving mechanism 120 and conveyed in an arrow f1 direction in FIG. 12, the third link arm 94 is guided by a first guide groove 125 formed in the slider 122 and rotated in the arrow c1 direction in FIG. 12 to move the operation arm 58 in the d1 direction in the figure. When the slider 122 is conveyed in the arrow f2 direction in FIG. 12, the third link arm 94 is guided by the first guide groove 125 and rotated in the arrow c2 direction in the figure to move the operation arm 58 in the arrow d2 direction in the figure.

The left and the right guide walls 96 and 97 disposed on both the left and the right sides of the disk conveyance area guide centering when the side of the optical disk 2 is slid. The guide walls 96 and 97 are formed of synthetic resin or the like softer than the optical disk 2. The right guide wall 97 is disposed on the deck section 4a and the left guide wall 96 is disposed on the main chassis 6. Both the guide walls 96 and 97 are fixed by screws, an adhesive tape, or the like.

In the left and the right guide walls 96 and 97, sidewalls 96a and 97a of an arcuate shape corresponding to a shape of the optical disk 2 are vertically provided. The sidewalls 96a and 97a are provided in positions a predetermined clearance apart from the side of the optical disk 2 conveyed to a centering position and do not come into contact with the optical disk 2 when the optical disk 2 is driven to rotate. A tip on the opposite side of the disk inserting and ejecting opening 19 of the sidewall 96a formed in the left guide wall 96 is set as a centering guide piece 99 swingably formed over the inside and the outside of the disk conveyance area via a hinge section 98. The centering guide piece 99 is urged by a leaf spring 95 (see FIG. 6) to be warped to the disk conveyance area side to allow the side of the optical disk 2 to come into contact with the centering guide piece 99. Consequently, the optical disk 2 is urged in the centering direction by the centering guide piece 99. When the optical disk 2 is inserted into the inner part of the housing and the eject arm 52 is rotated in the b1 direction, the centering guide piece 99 is pressed by the pressing piece 90 formed in the pressing arm 72 to be retracted from the disk conveyance area and held in a position spaced apart from the side of the optical disk 2 during recording and reproduction operations.

Figure 23:
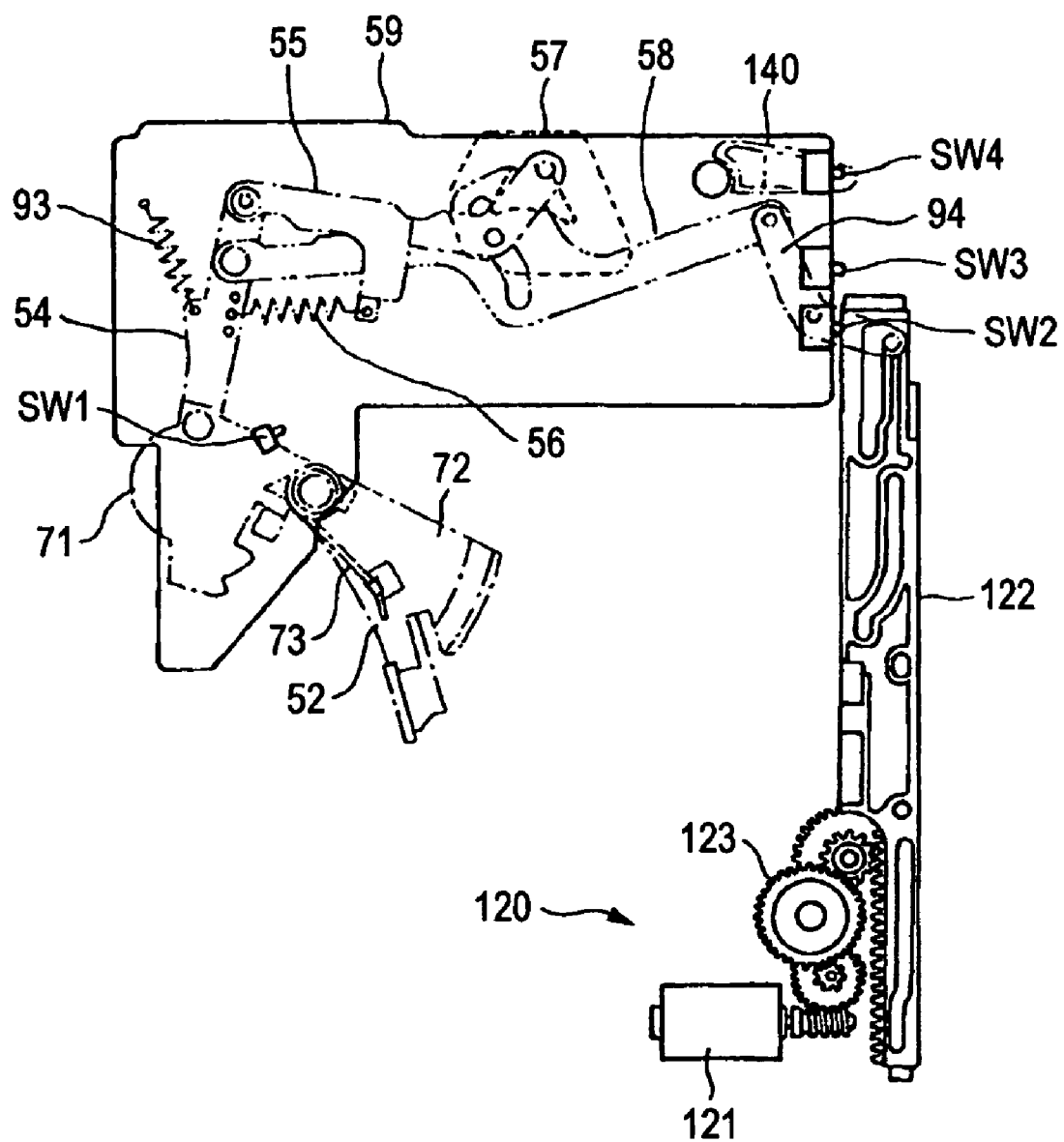
FIG. 23 is a plan view showing a circuit board on which first to fourth switches are mounted and a slider that depresses the switches.

Operations from insertion to ejection of the optical disk 2 by the disk conveying mechanism 50 constituted as described above will be explained. A conveyance state of the optical disk 2 is monitored by detecting depression states of first to fourth switches SW1 to SW4 mounted on the circuit board 59. As shown in FIG. 23, the first switch SW is disposed in a rotation area of the rotation support member 71 of the eject arm 52. Following the rotation of the eject arm 52, the first switch SW1 is switched to H or L as the first switch SW1 is released from or depressed by the rotation support member 71 (a state in which a switch is depressed is represented as L and a state in which a switch is not depressed is represented as H). As shown in FIG. 23, the second to the fourth switches SW2 to SW4 are arrayed on a moving area of the slider 122. the second to the fourth switches SW2 to SW4 are sequentially switched to H or L since the slider 122 is slid in the f1 direction or the f2 direction.

The disk drive device 1 monitors depression states and depression times of such first to fourth switches SW1 to SW4 to detect a conveyance state of the optical disk 2 and drive the driving motor 121, the spindle motor 24a, the displacement driving mechanism 36, the optical pickup 25, and the like. Specifically, the disk drive device 1 detects a conveyance state of the optical disk 2 and output timing of various motors and the like in accordance with timing charts shown in FIGS. 24 and 25.

Before inserting the optical disk 2, as shown in FIG. 12, the slider 122 is slid in the arrow f2 direction, which is the disk inserting and ejecting opening 19 side. Consequently, in the loading arm 51, the engaging projection 64 is locked to the projection 69 of the loading cam plate 53 and the contact section 61 is rotated and held in a position retracted from the conveyance area of the optical disk 2. The third link arm 94 engaged with the slider 122 is rotated in the arrow c2 direction in FIG. 12. Consequently, the eject arm 52 operated to rotate by the operation arm 58 and the first link arm 54 is urged to rotate in the arrow b2 direction in FIG. 12. Since the slider 122 is slid in the f2 direction, the sub-slider 151 is slid in an arrow h2 direction in the figure. Consequently, the sub-chassis 29 constituting the base unit 22 is lowered to the bottom case 4 side and retracted from the conveyance area of the optical disk 2.

Figure 13:
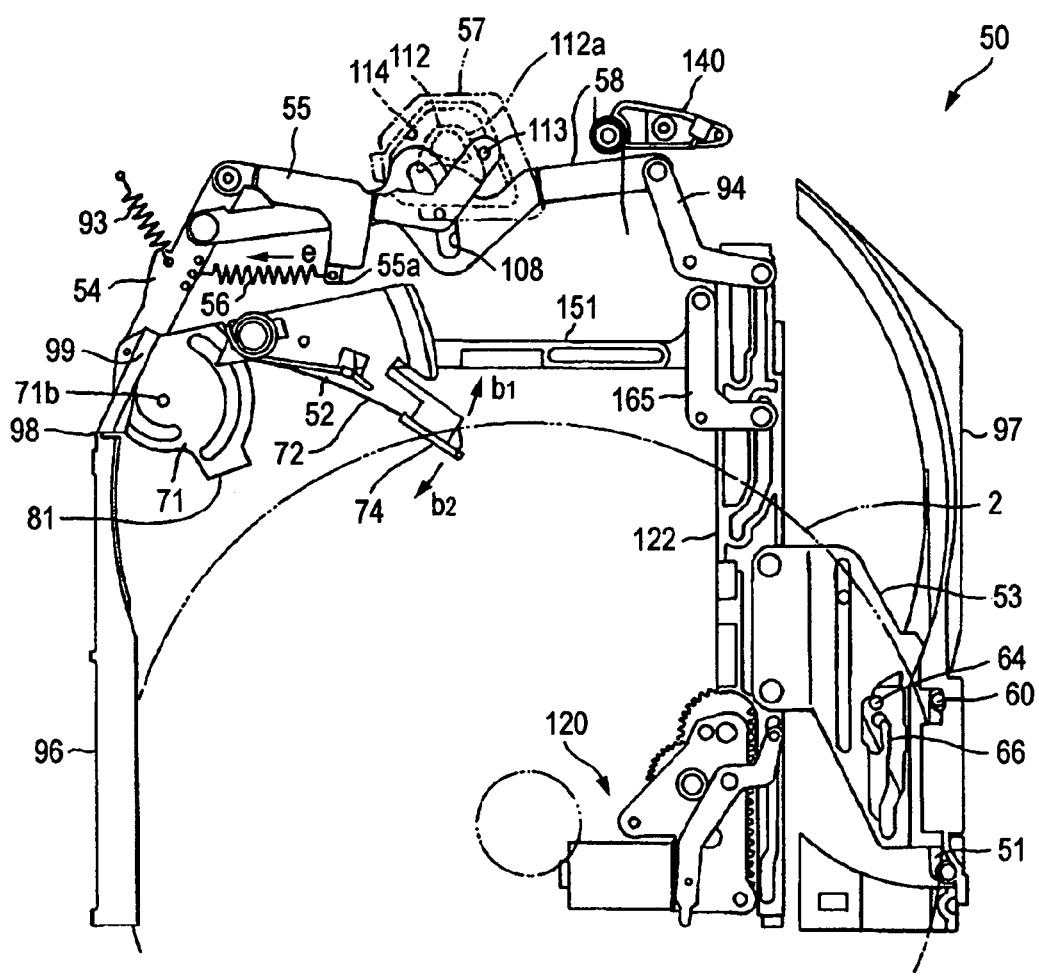
FIG. 13 is a plan view showing a process for inserting the optical disk and showing a state in which an eject arm is rotated by the optical disk.
Figure 14:
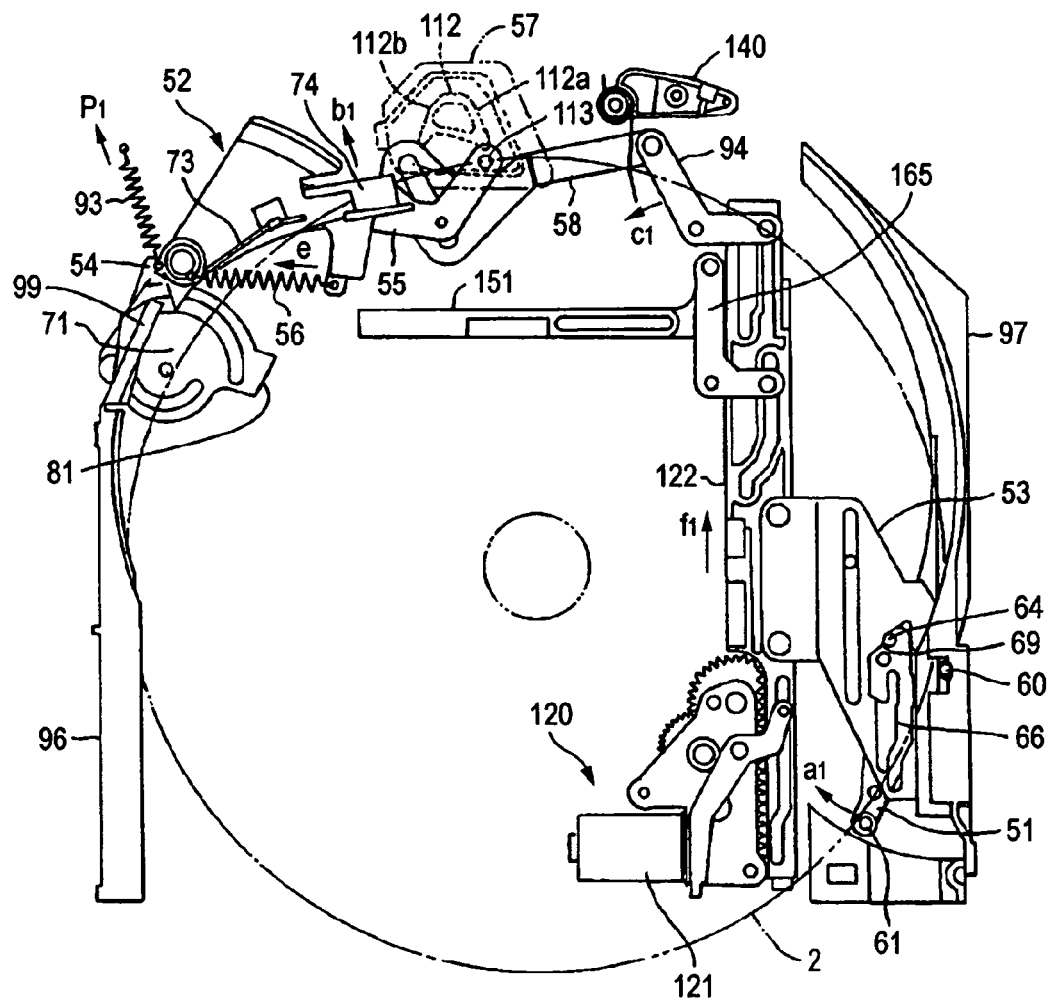
FIG. 14 is a plan view showing the process for inserting the optical disk and showing a state in which the eject arm and a loading arm are driven by a slider.

When the optical disk 2 is inserted from the disk inserting and ejecting opening 19, the contact section 61 of the eject arm 52 is pressed against an insertion end face of the optical disk 2 and, as shown in FIG. 13, the eject arm 52 is rotated in the arrow b1 direction in FIG. 13. In this case, since the rotation support member 71 is rotated in the b1 direction with the attachment opening 71b as a fulcrum, one end side of the first link arm 54 engaged with the rotation support member 71 is also moved to the left guide wall 96 side. On the other hand, in the second link arm 55 engaged with the first link arm 54, the guide projection 113 engaged with the guide groove 114 of the loop cam 57 is moved along the loading guide wall 112a. Since the loading guide wall 112a of the loop cam 57 is extended toward the right guide wall 97 side, the second link arm 55 is guided by the loading guide wall 112a to separate from the first link arm 54. Therefore, since the helical tension spring 56 suspended between the first link arm 54 and the second link arm 55 is extended, the first link arm 54 and the second link arm 55 are urged in directions in which the link arms come close to each other. Since the guide projection 113 is in contact with the loading guide wall 112a, a force applied to the spring locking piece 55a of the second link arm 55, that is, an urging force in a direction opposite to the rotating direction of the rotation support member 71 is applied on the first link arm 54. Therefore, eject arm 52 is urged in the arrow b2 direction in FIG. 13, which is the ejecting direction of the optical disk 2.

Therefore, the optical disk 2 is inserted while resisting the urging force in the ejecting direction applied to the eject arm 52. Thus, even when the insertion of the optical disk 2 is suspended by the user, since the optical disk 2 is ejected to the outside of the housing 3, it is possible to prevent the optical disk 2 from remaining in the housing 3 in an unfinished state.

When the optical disk 2 is inserted by the user while resisting such an urging force and the eject arm 52 is rotated to a predetermined angle, the first switch SW1 disposed on the circuit board 59 is pressed by the bent piece 81 of the rotation support member 71 and the driving mechanism 120 is started. In this case, depression states of the first to the fourth switches SW1 to SW4 are L, H, H, and H in this order and detected by a microcomputer of the disk drive device 1 (a state in which a switch is depressed is represented as L and a state in which a switch is not depressed is represented as H). In the driving mechanism 120, the slider 122 is subjected to the driving force of the driving motor 121 and slid in the arrow f1 direction in FIG. 14. Consequently, the loading cam plate 53 is also slid in the same direction together with the slider 122. Thus, the loading arm 51 regulated from rotating by the first cam groove 66 is urged by the coil spring 62 to rotate in the arrow a1 direction in FIG. 14 and the contact section 61 comes into contact with the side in the rear of the optical disk 2 to load the optical disk 2.

When the eject arm 52 is rotated to a staring position of the driving mechanism 120, the guide projection 113 of the second link arm 55 moves from the loading guide wall 112a of the loop cam 57 to the eject guide wall 112b. Thus, the first link arm 54 and the second link arm 55 are brought close to each other and the coil spring 56 contracts. Therefore, the urging force in the b2 direction applied to the eject arm 52 stops working. When the first link arm 54 is urged in the p1 direction by the third link arm 93, the second link arm 55 is moved in the same direction. Thus, the guide projection 113 is moved from the loading guide wall 112a to the eject guide wall 112b side and located near the protrusion 112c.

Figure 15:
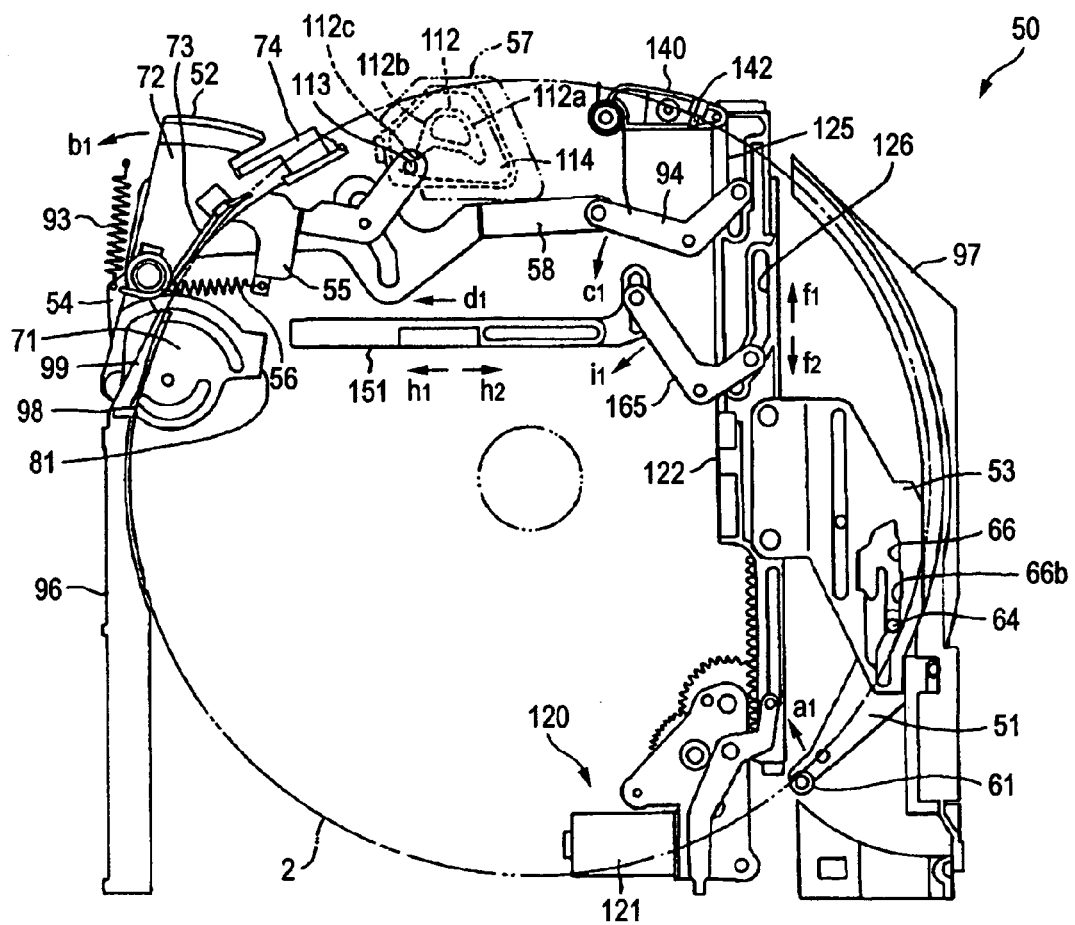
FIG. 15 is a plan view showing the process for inserting the optical disk and showing a state in which the optical disk is conveyed to a centering position.

When the slider 122 is further slid in the f1 direction, as shown in FIG. 15, the engaging projection 64 moves from the first guide section 66a to the second guide section 66b in the first cam groove 66 of the loading cam plate 53. According to the movement, the loading arm 51 is rotated in the arrow a1 direction in the figure. Thus, the optical disk 2 is conveyed onto the disk mounting section 23. In this case, since it is detected that depression states of the first to the fourth switches SW1 to SW4 are L, H, L, and H in this order, it is seen that the base unit 22 is lowered to a chucking release position. It is possible to safely convey the optical disk 2.

The optical disk 2 is loaded by the loading arm 51, guided by the left and the right guide walls 96 and 97, and brought into contact with a stop lever 140 described later to be centered on the disk mounting section 23.

The third link arm 94 is guided by the first guide groove 125 of the slider 122 and rotated in the arrow c1 direction in FIG. 15. The operation arm 58 engaged with such a third link arm 94 moves in the arrow d1 direction in the figure. Therefore, the first link arm 54 engaged with the other end 58b of the operation arm 58 is pressed by the operation arm 58 and moved further to the left guide wall 96 side. Since the first link arm 54 is moved by the operation arm 58, the rotation support member 71 is rotated in the arrow b1 direction in the figure. Thus, the push-out arm 72 is rotated in the same direction. In this case, the pressing piece 90 formed in the push-out arm 72 presses the centering guide piece 99 of the left guide wall 96 extending onto the disk conveyance area to separate the centering guide piece 99 from the side of the optical disk 2.

In this case, since an engaging arm 165 engaged with the slider 122 is rotated, the sub-slider 151 is slid in an arrow h1 direction in the figure and the base unit 22 is lifted to a chucking position. Consequently, the optical disk 2 conveyed to the centering position is chucked on the turntable 23a with the periphery of the center hole 2a nipped by the turntable 23a and the contact projection 8 formed around the opening 7 of the top plate section 5a.

In this way, since it is detected that depression states of the first to the fourth switches SW1 to SW4 are L, L, H, and H in this order, it is seen that the base unit 22 is lifted to the chucking position and the optical disk 2 is chucked on the turntable 23a. In a loading process for the optical disk 2 of the disk drive device 1, so-called double chucking is performed. In the double chucking, after the optical disk 2 is chucked on the turntable 23a, the spindle motor 24a is driven to rotate the optical disk 2 by half and the driving motor 121 is rotated reversely to lift the base unit 22 to the chucking position again (see FIG. 24). This makes it possible to prevent recording and reproduction from being performed while the optical disk 2 is incompletely engaged with the turntable 23a.

Figure 16:
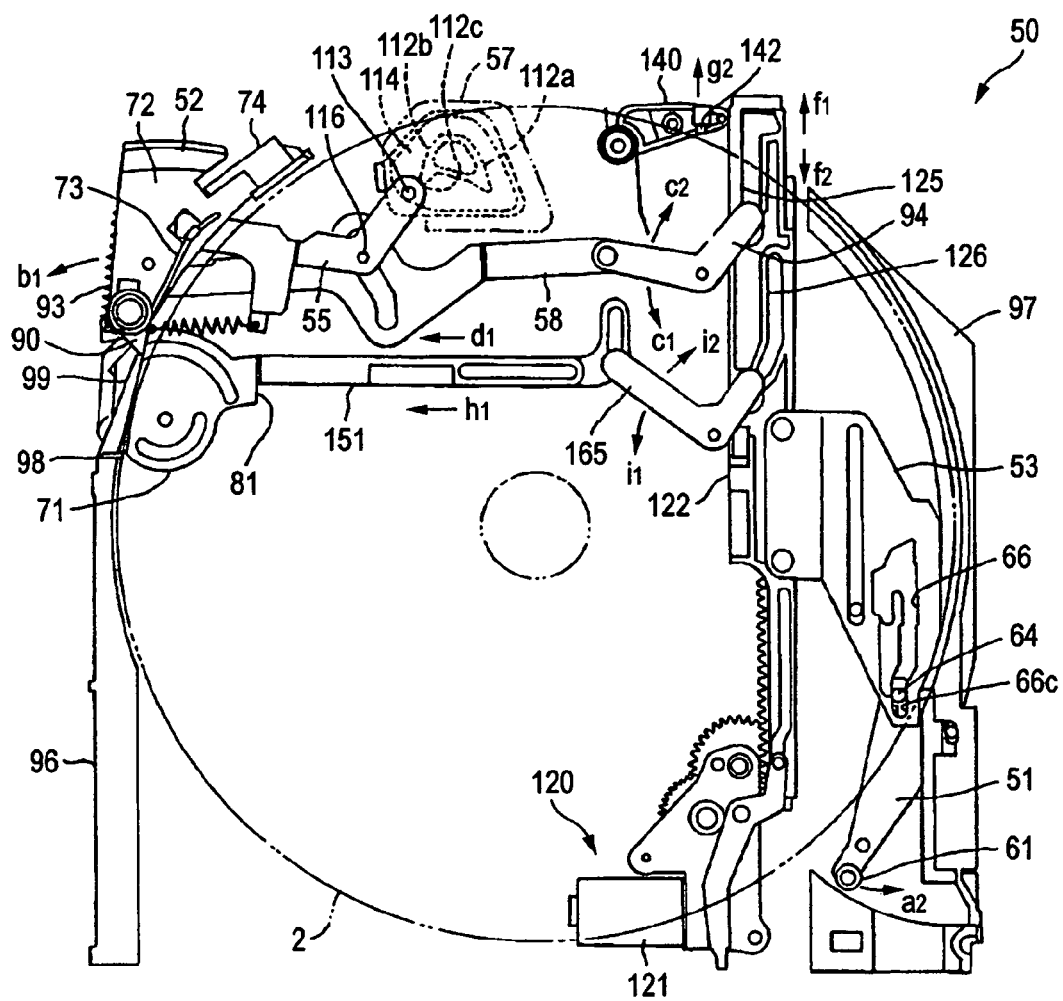
FIG. 16 is a plan view showing the processing for inserting the optical disk and showing a state in which the optical disk is released from the respective arms and allowed to rotate freely.

When the slider 122 is further slid in the f1 direction, since the engaging projection 64 is moved from the second guide section 66b to the third guide section 65c of the loading cam plate 53, the loading arm 51 is rotated in the arrow a2 direction in FIG. 16 and the contact section 61 is separated from the side of the optical disk 2.

When the slider 122 further moves in the f1 direction and the sub-slider 151 is further slid in the h1 direction, the base unit 22 is lowered from the chucking position to the recording and reproduction position and waits for operation of recording or reproduction by the user. As shown in FIG. 16, the tip of the sub-slider 151 is brought into abutment against the bent piece 81 of the rotation support member 71. Consequently, the rotation support member 71 is further rotated in the arrow b1 direction in the figure while extending the urging coil spring 93. Thus, the contact member 74 of the eject arm 52 and the centered optical disk 2 are separated from each other. Since the first link arm 54 is moved together with the rotation support member 71 and urged in the p1 direction by the urging coil spring 93, in the second link arm 55 engaged with the first link arm 54, the guide projection 113 climbs over the protrusion 112c, which prevents backward movement to the loading guide wall 112a side, to move to the eject guide wall 112b.

As shown in FIG. 16, the slider 122 presses the stop lever 140, which centers the optical disk 2, to separate the stop lever 140 from the side of the optical disk 2. Consequently, optical disk 2 separates from the loading arm 51, the eject arm 52, the stop lever 140, and the centering guide piece 99 of the left guide wall 96, which center the optical disk 2, to be able to be driven to rotate by the disk rotation driving mechanism 24 held on the turntable 23a in a free state.

In this case, since it is detected that depression states of the first to the fourth switches SW1 to SW4 are L, L, L, and H in this order, it is seen that the base unit 22 is lowered to the recording and reproduction position and it is seen that it is possible to drive to rotate the optical disk 2.

Figure 17:
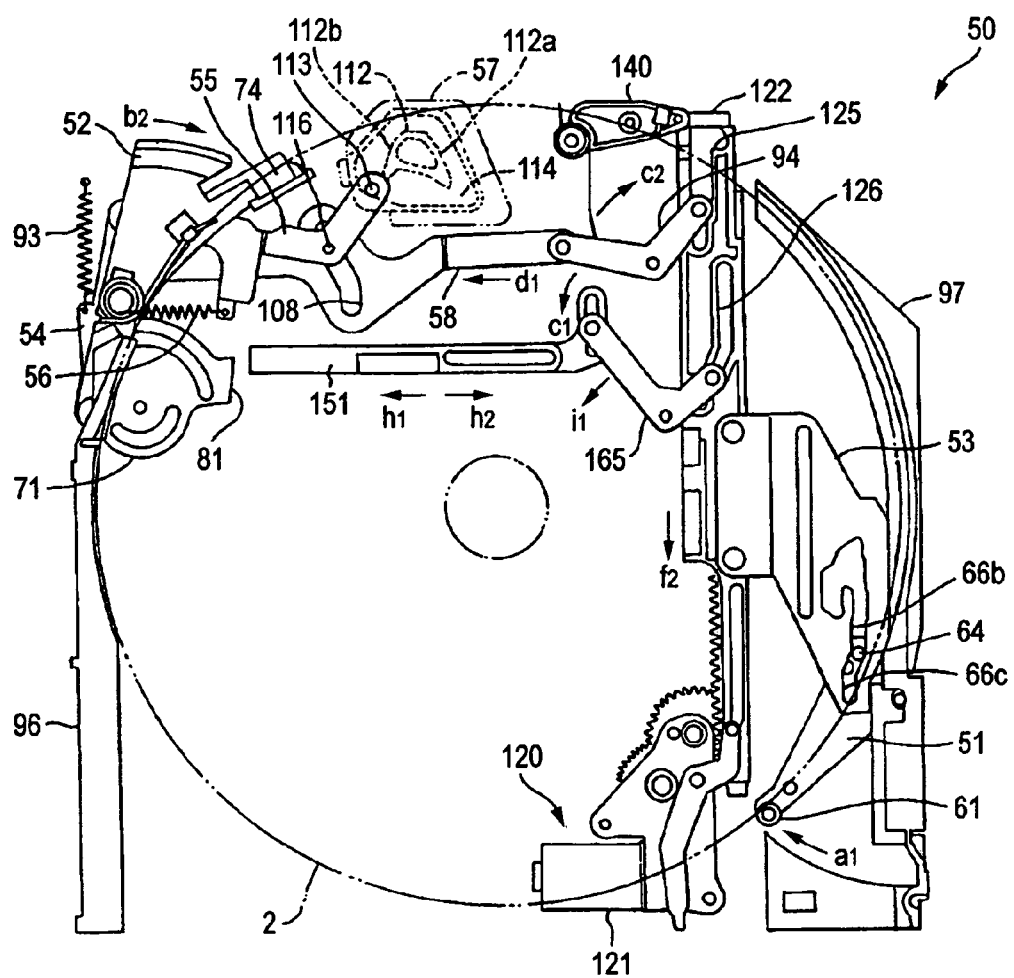
FIG. 17 is a plan view showing a process for ejecting the optical disk and showing a state in which the optical disk is brought into contact with the respective arms.

When the recording and reproduction operation ends and ejection operation for the optical disk 2 is performed by the user, first, the driving motor 121 of the driving mechanism 120 is rotated reversely and the slider 122 is slid in the arrow f2 direction in FIG. 17. Consequently, since the engaging projection 64 moves from the third guide section 66c to the second guide section 66b of the loading cam plate 53, the loading arm 51 is rotated in the arrow a1 direction in FIG. 17 and the contact section 61 is brought into contact with the side of the optical disk 2.

The sub-slider 151 is slid in the arrow h2 direction in the figure and pressing against the rotation support member 71 is released. Thus, the eject arm 52 is rotated in the arrow b2 direction in the figure by an urging force of the urging coil spring 93 and the contact member 74 is brought into contact with the side of the optical disk 2. Since the first link arm 54 engaged with the rotation support member 71 is moved in the d1 direction by the operation arm 58 and the urging coil spring 93 is contracted, the eject arm 52 is only rotated to be brought into contact with the optical disk 2 and a force for ejecting the optical disk 2 is not generated.

Figure 18:
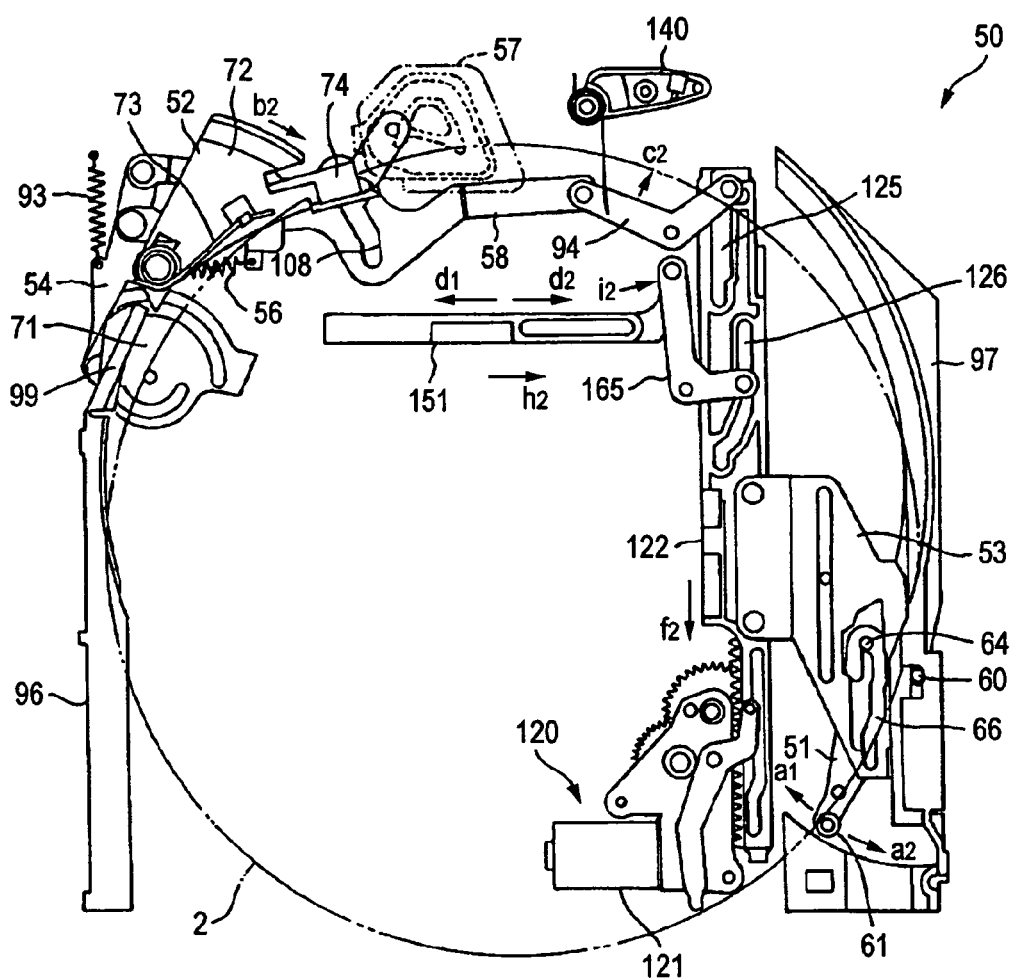
FIG. 18 is a plan view showing the process for ejecting the optical disk and showing a state in which the optical disk is conveyed by the respective arms.

When the slider 122 is further slid in the f2 direction, the sub-slider 151 is slid in the arrow h2 direction in FIG. 18 to lower the base unit 22. Consequently, the optical disk 2 is pushed up by the push-up pin 10 vertically provided from the bottom case 4 and chucking with the turntable 23a is released.

In this case, since it is detected that depression states of the first to the fourth switches SW1 to SW4 are L, H, L, and H in this order, it is seen that the base unit 22 is lowered to the chucking release position and it is seen that it is possible to safely eject the optical disk 2.

Figure 19:
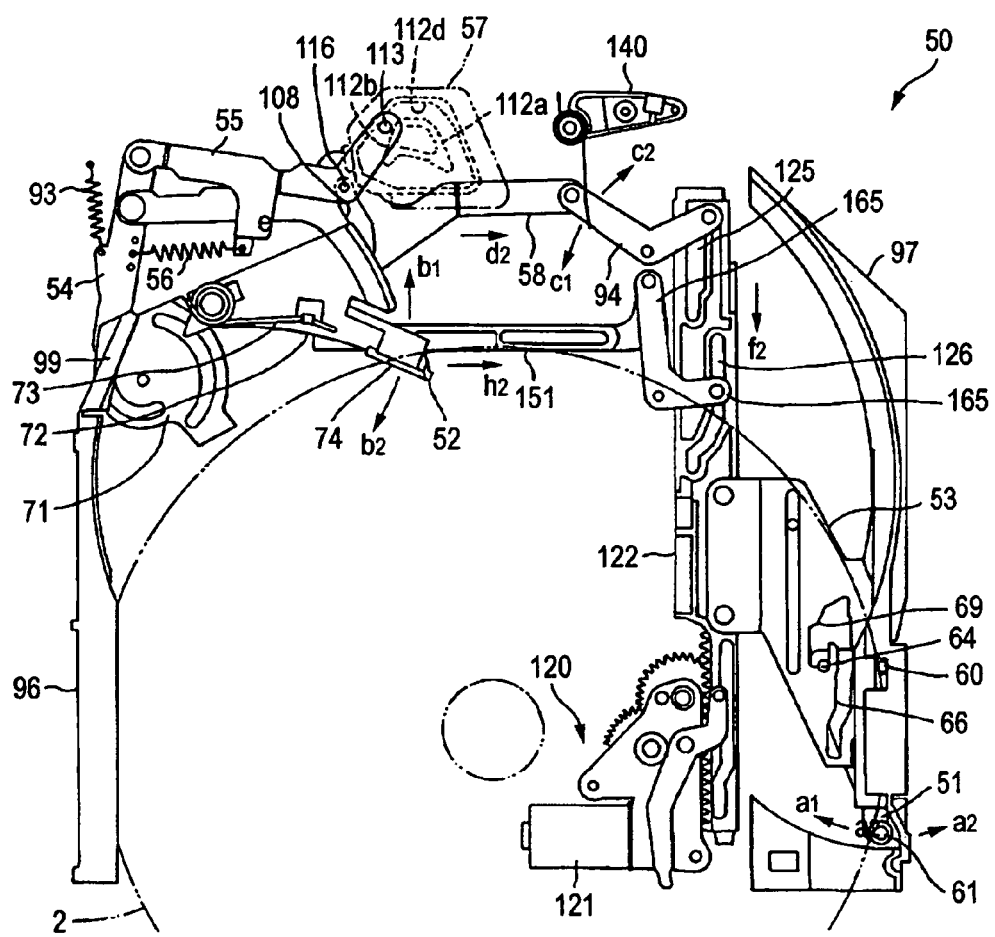
FIG. 19 is a plan view showing the processing for ejecting the optical disk and showing a state in which the optical disk is conveyed by the respective arms.

Thereafter, when the third link arm 94 engaged with the slider 122 is rotated in the arrow c2 direction in FIG. 18 by sliding the first guide groove 125 of the slider 122, the operation arm 58 is moved in the arrow d2 direction in the figure. As shown in FIGS. 18 and 19, when, following the movement in the d2 direction of the operation arm 58, the first link arm 54 is moved in the same direction, the eject arm 52 is rotated in the arrow b2 direction in FIG. 18 according to an amount of movement of the operation arm 58 to eject the optical disk 2.

In this case, the loading arm 51 urged in the arrow a1 direction in FIG. 18, in which the optical disk 2 is urged in the inserting direction by the coil spring 62, is in contact with the disk conveying mechanism 50. Since the engaging projection 64 is engaged with the first cam groove 66 of the loading cam plate 53, the loading arm 51 is allowed to rotate according to sliding of the loading cam plate 53 and free rotation thereof is regulated. When the loading cam plate 53 is slid in the arrow f2 direction in FIG. 19 together with the slider 122, the loading arm 51 is rotated in the arrow a2 direction in the figure according to the sliding while resisting an urging force of the coil spring 62. Thus, an urging force preventing ejection of the optical disk 2 is not applied. Since the optical disk 2 is ejected while being nipped by the loading arm 51 and the eject arm 52, it is possible to prevent sudden ejection of the optical disk 2.

Since the first link arm 54 is moved in the d2 direction by the operation arm 58, in the second link arm 55, the guide projection 113 slides on the eject guide wall 112b of the loop cam 57. In this case, since both the first link arm 54 and the second link arm 55 are moved in the same direction by the operation arm 58, the helical tension spring 56 is not extended. In other words, at the time of insertion of the optical disk 2, a moving direction of the first link arm 54 moved when the eject arm 52 is moved in the b1 direction and a moving direction of the second link arm 55 moved when the guide projection 113 is guided by the loading guide wall 112a of the loop cam 57 are opposite. The first link arm 54 and the second link arm 55 separate from each other. Thus, the helical tension spring 56 is extended and an urging force in the ejecting direction is applied to the eject arm 52. However, at the time of ejection of the optical disk 2, the guide projection 113 of the second link arm 55 is guided in the same direction as the moving direction of the first link arm 54 by the eject guide wall 112b. Thus, the first link arm 54 and the second link arm 55 are moved without separating from each other. Therefore, the helical tension spring 56 is not extended and the eject arm 52 is rotated in the ejecting direction by the driving force of the driving mechanism 120 without being urged in the ejecting direction.

In this case, in the disk conveying mechanism 50, since the optical disk 2 is brought into sliding contact with the panel curtain provided in the disk inserting and ejecting opening 19 of the front panel 18, an urging force relatively in the b1 direction acts on the eject arm 52 and the first link arm 54. In this case, as described above, the second engaging projection 116 is brought into contact with the sidewall of the cam groove 108 of the operation arm 58 to regulate the rotation in the d2 direction of the first link arm 54. Thus, following the operation arm 58 moved in the d2 direction by an amount corresponding to a slide amount in the f2 direction of the slider 122, the first link arm 54 and the eject arm 52 are rotated. Therefore, the disk conveying mechanism 50 can rotate the eject arm 52 by an amount corresponding to a slide operation of the slider 122 against the urging force in the b1 direction and stably eject the optical disk 2 to the predetermined ejection position.

Figure 20:
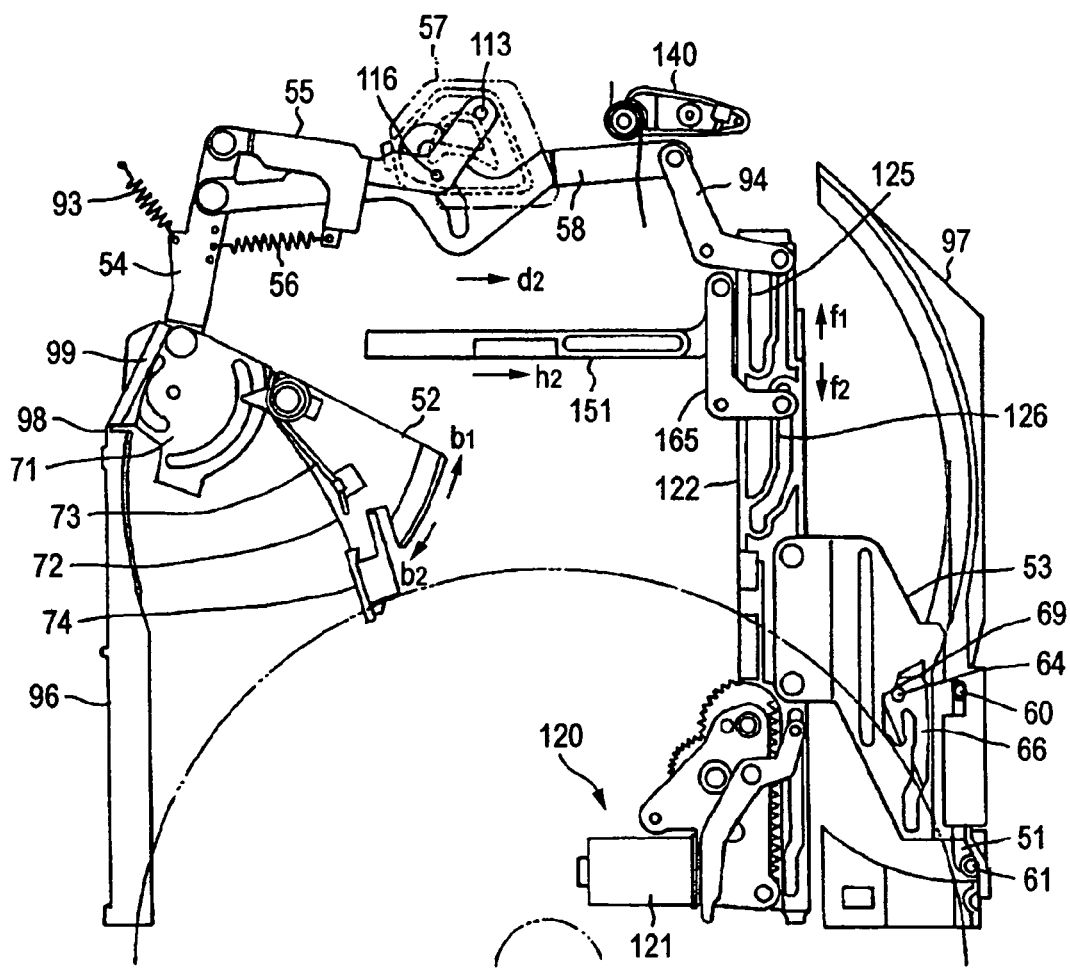
FIG. 20 is a plan view showing the process for ejecting the optical disk and showing a state in which the optical disk is ejected to and stopped at a predetermined position.

As shown in FIG. 20, when the slider 122 is moved to an initial position, the slide operation is stopped according to depression of the detection switch. According to the stop of the slide operation, the eject arm 52 is rotated to an initial position by the operation arm 58 and the first link arm 54 to stop the optical disk 2 in a position where the center hole 2a is ejected from the disk inserting and ejecting opening 19. In the loading arm 51, the engaging projection 64 is locked to the projection 69 formed in the first cam groove 66 of the loading cam plate 53 and the contact section 61 is retracted from the conveyance area of the optical disk 2.

In this case, since depression state of the first to the fourth switches SW1 to SW4 are H, H, H, and H in this order, it is seen that the optical disk 2 is ejected to the predetermined ejecting position by the eject arm 52 and the driving of the driving motor 121 is stopped.

In a state in which the optical disk 2 is inserted by a predetermined amount and the driving of the driving motor 121 is started, when the user notices that the optical disk 2 inserted is wrong and quickly grips the optical disk 2, the disk conveying mechanism 50 stops the driving motor 121 and, then, drives the driving motor 121 reversely to eject the optical disk 2.

Figure 26:
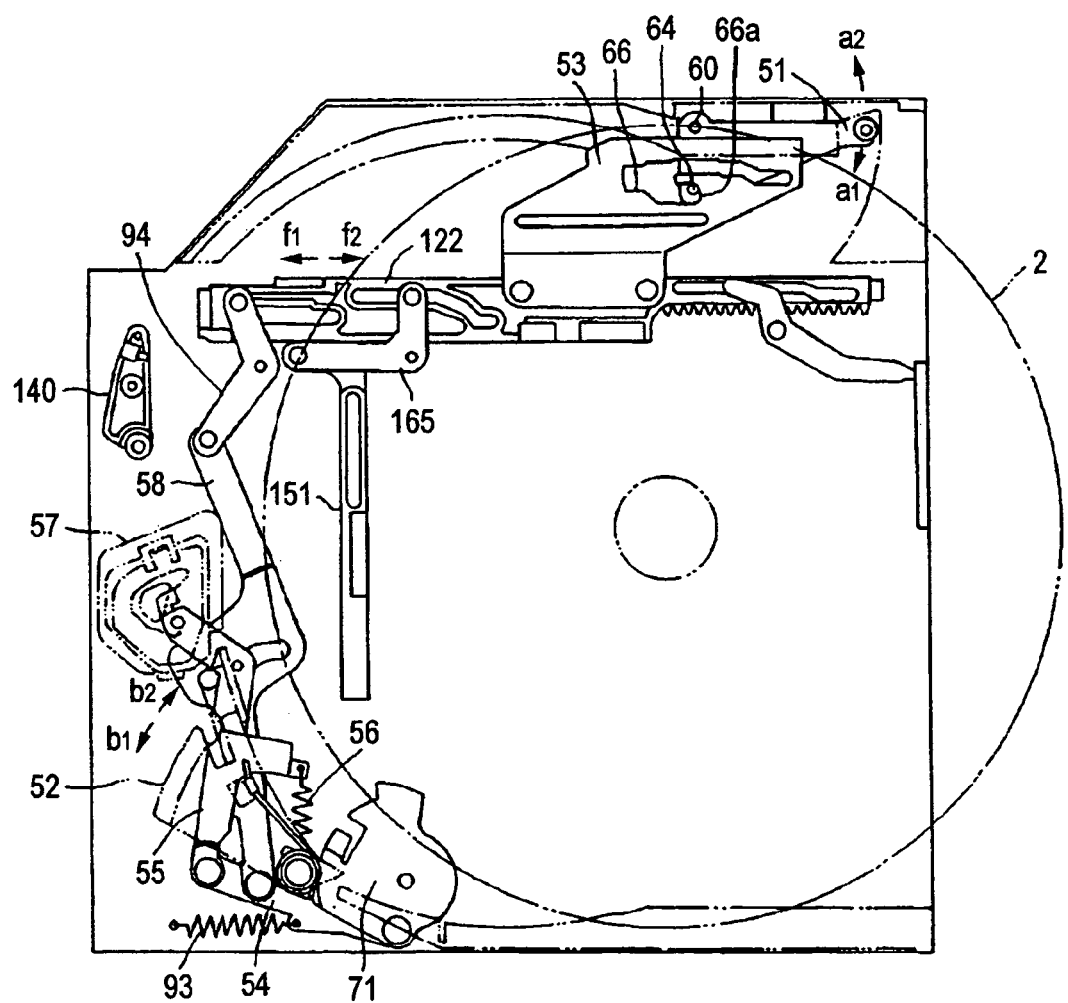
FIG. 26 is a plan view showing a state in which the optical disk is gripped in the process for inserting the optical disk.

Specifically, as shown in FIG. 26, when the optical disk 2 is inserted from the disk inserting and ejecting opening 19 by the predetermined amount and the driving motor 121 is driven, following the movement in the f1 direction of the slider 122 and the loading cam plate 53, the loading arm 51 is rotated in the arrow a1 direction in the figure. When the optical disk 2 is gripped by the user, the rotation of the loading arm 51 is regulated and, on the other hand, the loading cam plate 53 is slid in the f1 direction together with the slider 122. Thus, the engaging projection 64 protrudingly provided in the loading arm 51 is locked to the tip of the first guide section 66a of the loading cam plate 53. Consequently, the slide in the f1 direction of the slider 122 is regulated and the driving of the driving motor 121 is stopped. When a predetermined time elapses in this state, the driving motor 121 is driven to rotate reversely and the optical disk 2 is ejected in a process opposite to the process for inserting the optical disk 2 described above.

In this case, since the eject arm 52 is rotated by a predetermined amount when the optical disk 2 is inserted by the predetermined amount, the first and the second link arms 54 and 55 are moved in directions in which the link arms separate from each other. The helical tension spring 56 suspended between the first and the second link arms 54 and 55 is extended. Therefore, the driving motor 121 is driven to rotate reversely. When the sliding in the f2 direction of the slider 122 ends, the first link arm 54 subjected to the urging force of the helical tension spring 56 is rotated, and the eject arm 52 is rotated in the arrow b2 direction in FIG. 26. Therefore, in the disk drive device 1, the eject arm 52 is urged to rotate in the arrow b1 direction in FIG. 26 in which the optical disk 2 is ejected to the outside of the disk inserting and ejecting opening 19 by the helical tension spring 56 and ejects the optical disk 2 with the urging force of the helical tension spring 56. Therefore, it is possible to prevent a situation in which the driving of the driving motor 121 is stopped since the optical disk 2 is gripped at the time of loading of the optical disk 2 and the optical disk 2 is left in a state in which the optical disk 2 is incompletely exposed from the disk inserting and ejecting opening 19.

Figure 24:
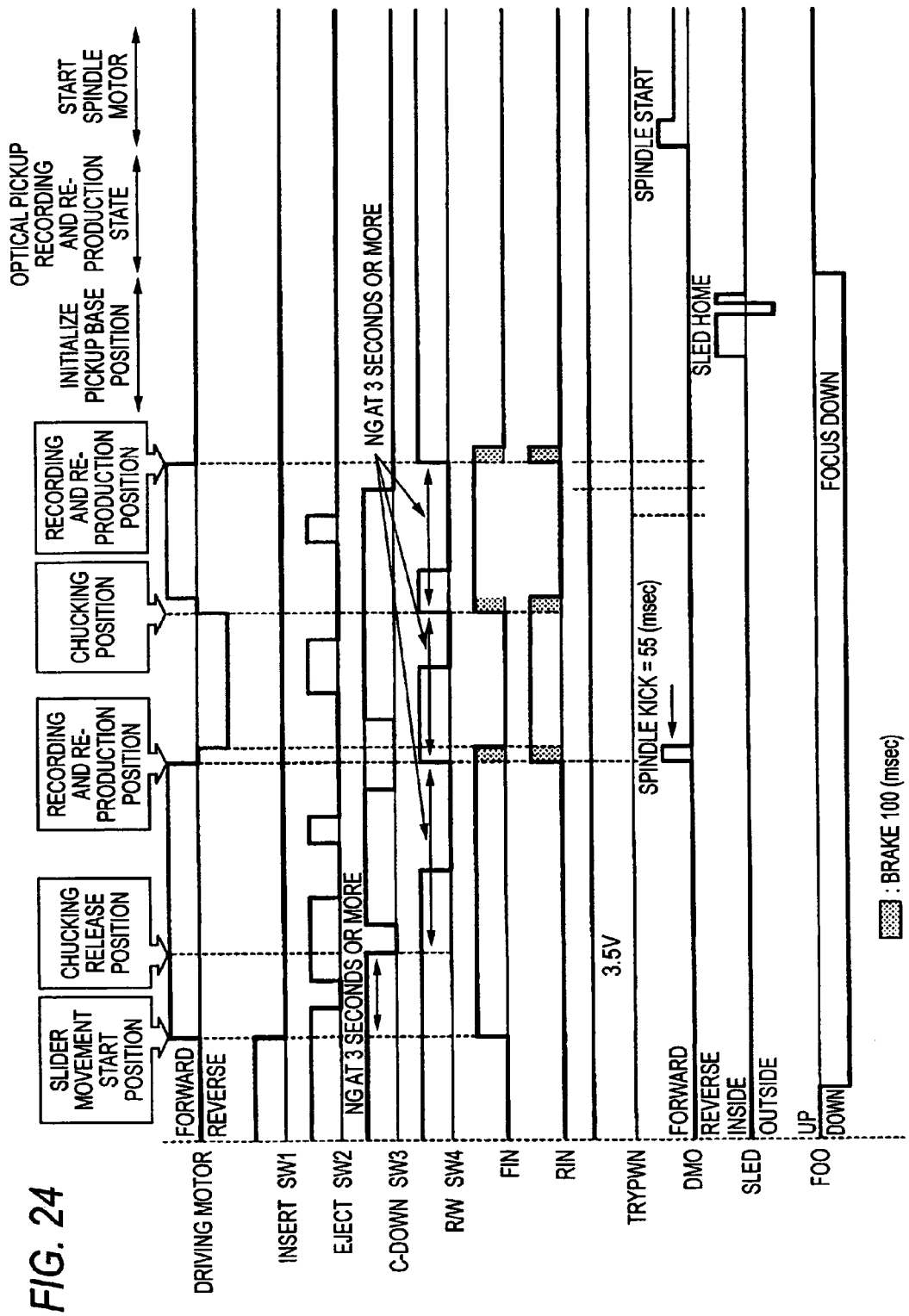
FIG. 24 is a timing chart at the time of loading of the optical disk.

It is possible to detect such abnormal conveyance of the optical disk 2 by monitoring depression states of the first to the fourth switches SW1 to SW4 mounted on the circuit board 59 using a microcomputer. As shown in FIG. 24, when time during which the slider 122 moves from a state in which the first switch SW1 is depressed by the eject arm 52 until it is detected that the base unit 22 is lowered to the chucking release position (LHHH to LHLH) is equal to or longer than a predetermined time, for example, 3 seconds or when time until the base unit 22 is moves from the chucking release position to the recording and reproduction position through the chucking position (LHLH to LLLH) is equal to or longer than the predetermined time, it is detected that abnormal conveyance is performed. The driving motor 121 is stopped or rotated reversely to eject the optical disk 2.

At the time of ejection of the optical disk 2, when an obstacle such as a book is placed in front of the disk inserting and ejecting opening 19, the optical disk 2 comes into contact with the obstacle and it is difficult to eject the optical disk 2. Excessive loads are applied to the driving motor 121 of the driving mechanism 120. When the optical disk 2 is nipped by the eject arm 52, which is subjected to the driving force of the driving motor 121 and rotated, and the obstacle, excessive loads are applied to the optical disk 2 as well.

In the disk drive device 1, the rotation support member 71 and the push-out arm 72 of the eject arm 52 are engaged to rotate freely in the b1 direction with the engaging section 77 as a fulcrum and urged in the b2 direction with a predetermined force by the coil spring 73. Therefore, at the time of ejection of the optical disk 2, even when an obstacle preventing ejection of the optical disk 2 is placed and a force in a direction opposite to the ejecting direction of the optical disk 2 is applied to the eject arm 52, since the push-out arm 72 subjected to the force in the opposite direction rotates in the b1 direction, it is possible to prevent excessive loads from being applied to the driving motor 121 and the optical disk 2.

Figure 27:
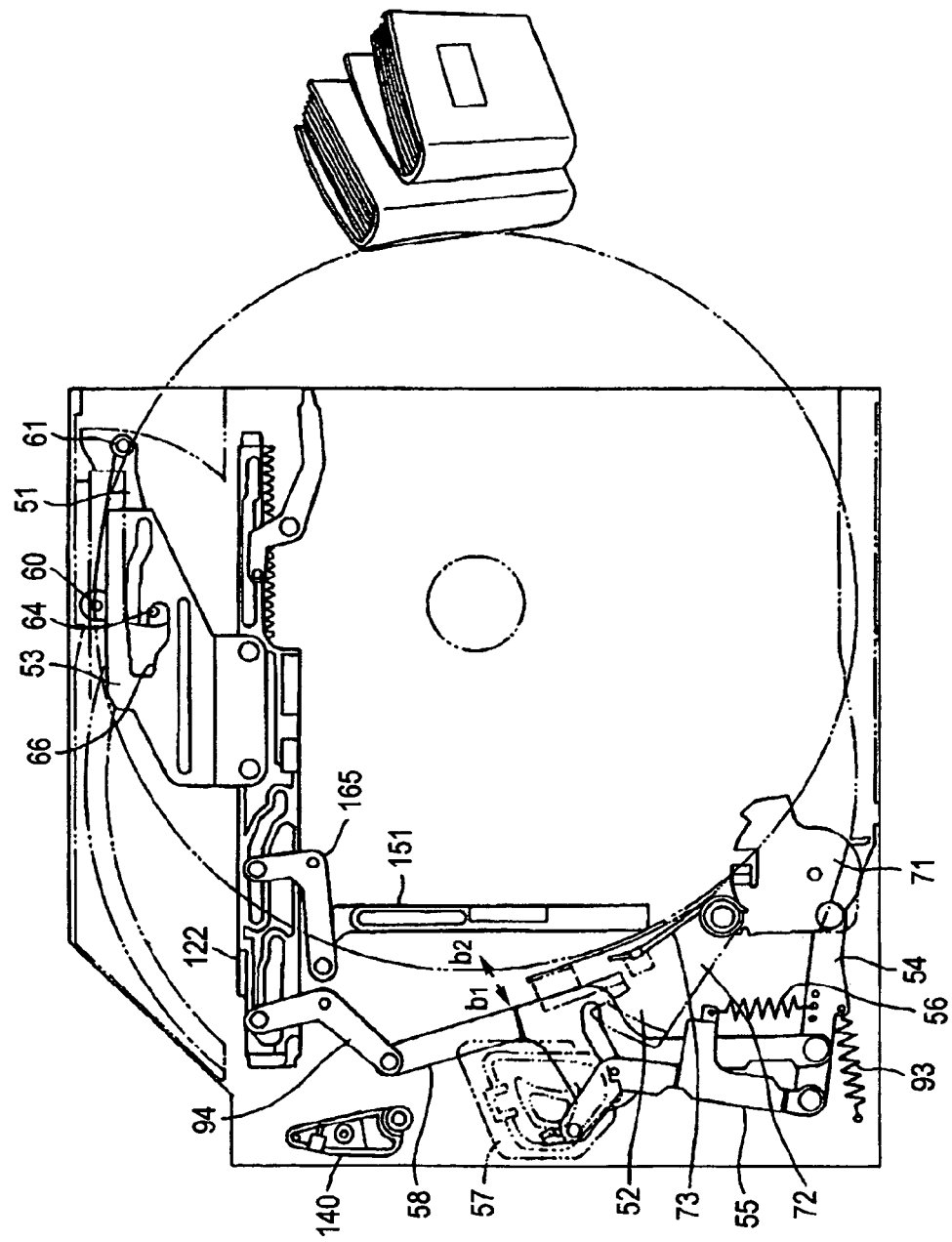
FIG. 27 is a perspective view showing a state in which conveyance is hindered by an obstacle on a conveyance area of the optical disk in the process for ejecting the optical disk.

When the push-out arm 72 of the eject arm 52 is rotated in the b1 direction, the disk drive device 1 stops the driving of the driving motor 121. When a predetermined time elapses in a state in which an obstacle is placed in front of the disk inserting and ejecting opening 19 and ejection of the optical disk 2 is hindered, the disk drive device 1 pulls the optical disk 2 into a loading position again. As shown in FIG. 27, when the optical disk 2 is ejected to the outside from the disk inserting and ejecting opening 19 and one side of the optical disk 2 comes into contact with the obstacle to stop the ejection of the optical disk 2 for the predetermined time, the driving motor 121 is rotated reversely. Therefore, the first and the second link arms 54 and 55 and the operation arm 58 are moved reversely to the above to perform a loading operation for the optical disk 2. In this case, as in the above case, the first and the second link arms 54 and 55 are moved without being separated from each other. Thus, the helical tension spring 56 is not extended and the urging force in the ejecting direction is not applied to the eject arm 52.

Consequently, the disk drive device 1 can prevent the optical disk 2 from being left in a state in which the optical disk 2 is nipped between the eject lever 52, which is rotated in the ejecting direction, and the obstacle and can prevent excessive loads from being applied to the driving motor 121 and the optical disk 2.

Figure 25:
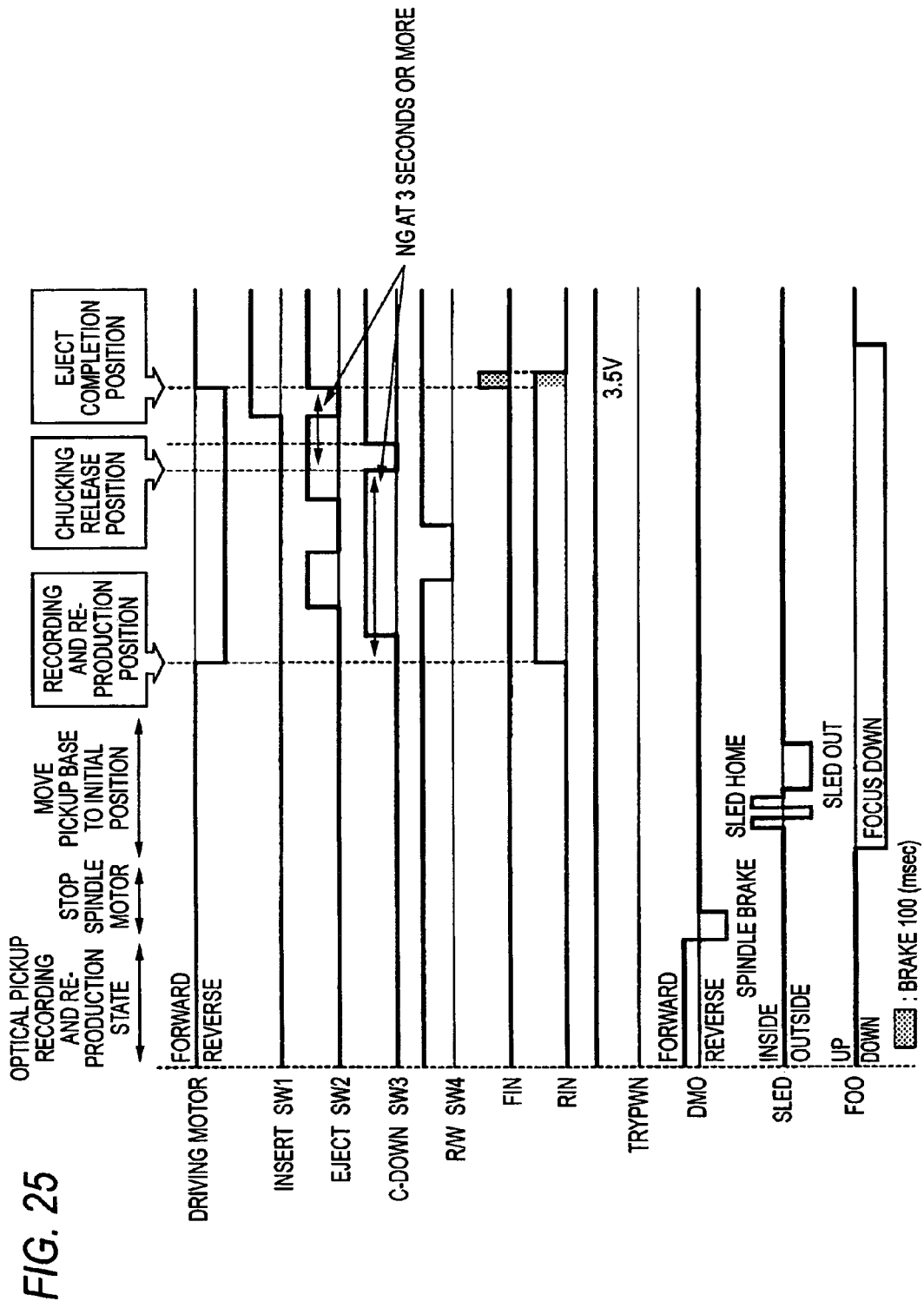
FIG. 25 is a timing chart at the time of ejection of the optical disk.

It is possible to detect such abnormal conveyance of the optical disk 2 by monitoring depression states of the first to the fourth switches SW1 to SW4 mounted on the circuit board 59 using a microcomputer. As shown in FIG. 25, when time during which the slider 122 moves, after the driving motor 121 is reversed, until the base unit 22 is lowered from the recording and reproduction position to the chucking release position through the chucking position (LLLH to LHLH) is equal to or longer than a predetermined time, for example, 3 seconds or when time until the base unit 22 is moves, after the base unit 22 is lowered to the chucking release position, until a state in which all the first to the fourth switches SW1 to SW4 are not depressed (LHLH to HHHH) is equal to or longer than the predetermined time, it is detected that abnormal conveyance is performed. The driving motor 121 is stopped or rotated normally to load the optical disk 2.

As described above, according to the disk conveying mechanism 50 of the disk drive device 1 to which the invention is applied, at the time of insertion of the optical disk 2, in a process in which the optical disk 2 is inserted to a predetermined position by the user, by guiding the first link arm 54 and the second link arm 55 in a direction in which the link arms are separated from each other using the loop cam 57, it is possible to apply the urging force in the ejecting direction generated by the helical tension spring 56, which is suspended between the link arms, to the eject arm 52. Thus, it is possible to prevent the optical disk 2 from being left in a state in which the optical disk 2 is incompletely inserted into the housing 3 because the insertion of the optical disk 2 is suspended by the user.

At the time of ejection of the optical disk 2, by moving the first link arm 54 and the second link arm 55 while bringing the link arms into close contact with each other using the loop cam 57, the urging force in the ejecting direction generated by the helical tension spring 56 applied to the eject arm 52 is eliminated. The eject arm 52 is rotated according to the operation of the slider 122 and the operation arm 58 subjected to the driving force of the driving mechanism 120. Therefore, the disk conveying mechanism 50 can stably eject, with the driving force of the driving mechanism 120 and without relying on an elastic force, the optical disk 2 to the predetermined stop position where the center hole 2a of the optical disk 2 is ejected to the outside of the hosing 3.

Moreover, the disk conveying mechanism 50 does not adopt a mechanism for rotating the eject lever 52 with the urging force of the helical tension spring 56 at the time of ejection of the optical disk 2. Thus, the eject lever 52 subjected to such an urging force does not emit contact sound that is usually emitted when an eject lever comes into contact with an optical disk. Therefore, with the disk drive device 1, noise is not generated at the time of ejection of the optical disk 2 and usability is improved.

In the disk drive device 1 to which the invention is applied, the stopper 100 that prevents miss-insertion of the small-diameter optical disk 101 may be formed in the contact member 74 of the eject arm 52. Although the disk drive device 1 is formed exclusively for the optical disk 2 having a large diameter (e.g., diameter of 12 cm), it is anticipated that the user inserts the optical disk 101 having a small diameter (e.g., diameter of 8 cm) by mistake. In this case, when the eject arm 52 is pushed in the b1 direction since the small-diameter disk 101 comes into contact with the contact member 74, the eject arm 52 is not rotated to a position where the driving mechanism 120 is driven. It is possible to eject the small-diameter disk 101 with the urging force in the b2 direction. On the other hand, when the small-diameter disk 101 is inserted while being biased to the loading arm 51 side that is not brought into contact with the contact member 74 of the eject arm 52, it is likely that the small-diameter disk 101 is inserted into the inner part of the housing 3 and remains in a position deviating from the rotation area of the eject arm 52.

Figure 28:
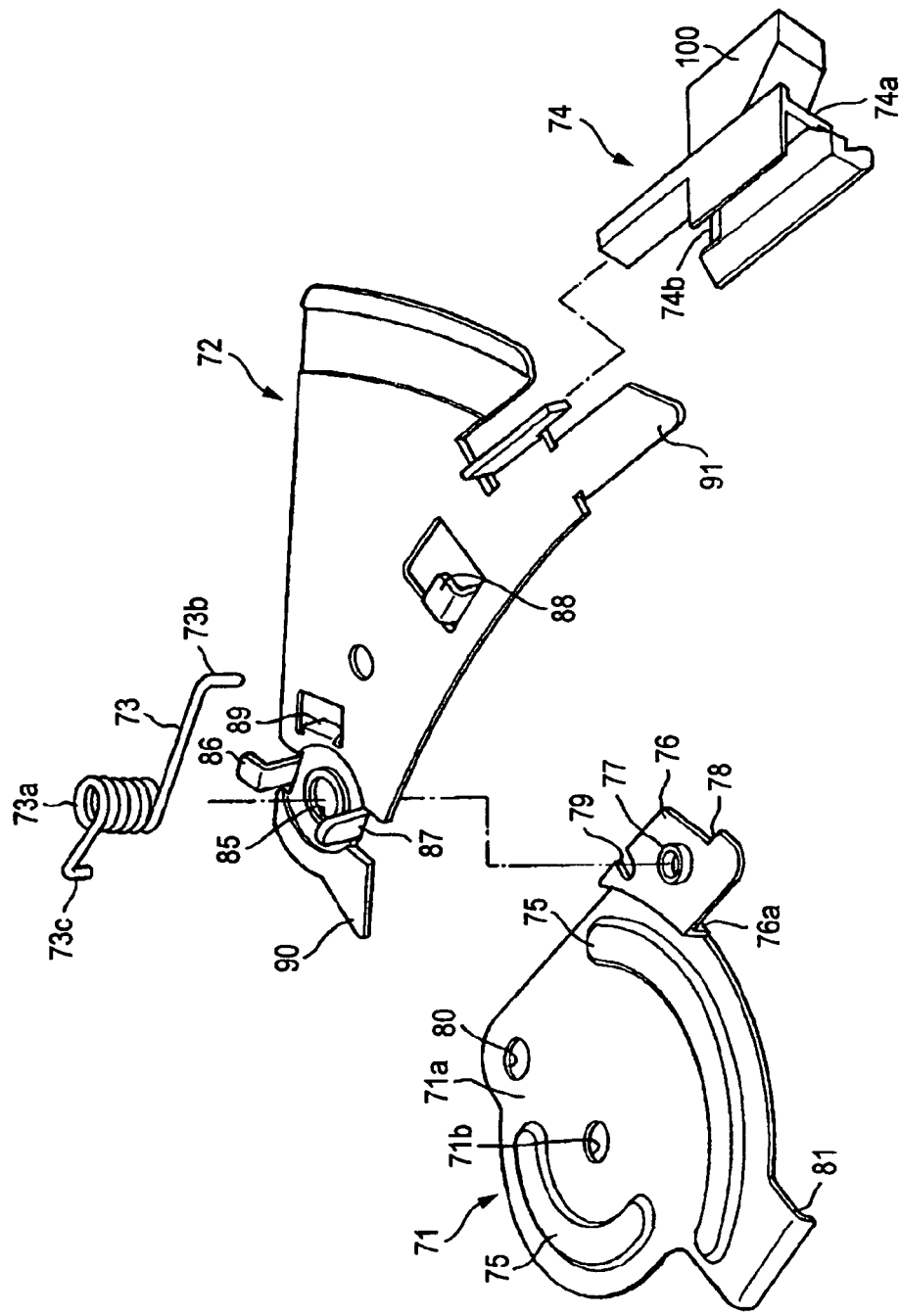
FIG. 28 is a perspective view showing an eject arm provided with a stopper.

Thus, as shown in FIG. 28, in the eject arm 52, the stopper 100 for preventing miss-insertion of the small-diameter disk 101 is formed in the contact member 74 in order to prevent the small-diameter disk 101 from being inserted into the inner side of the housing 3 even when the small-diameter disk 101 is inserted while being biased to the loading arm 51 side.

The stopper 100 is formed to extend further to the loading arm 51 side than the contact member 74. Even when the small-diameter disk 101 is inserted while being biased to the loading arm 51 side, since a part of the small-diameter disk 101 comes into contact with the stopper 100, it is possible to prohibit further insertion of the small-diameter disk 101.

Figure 29:
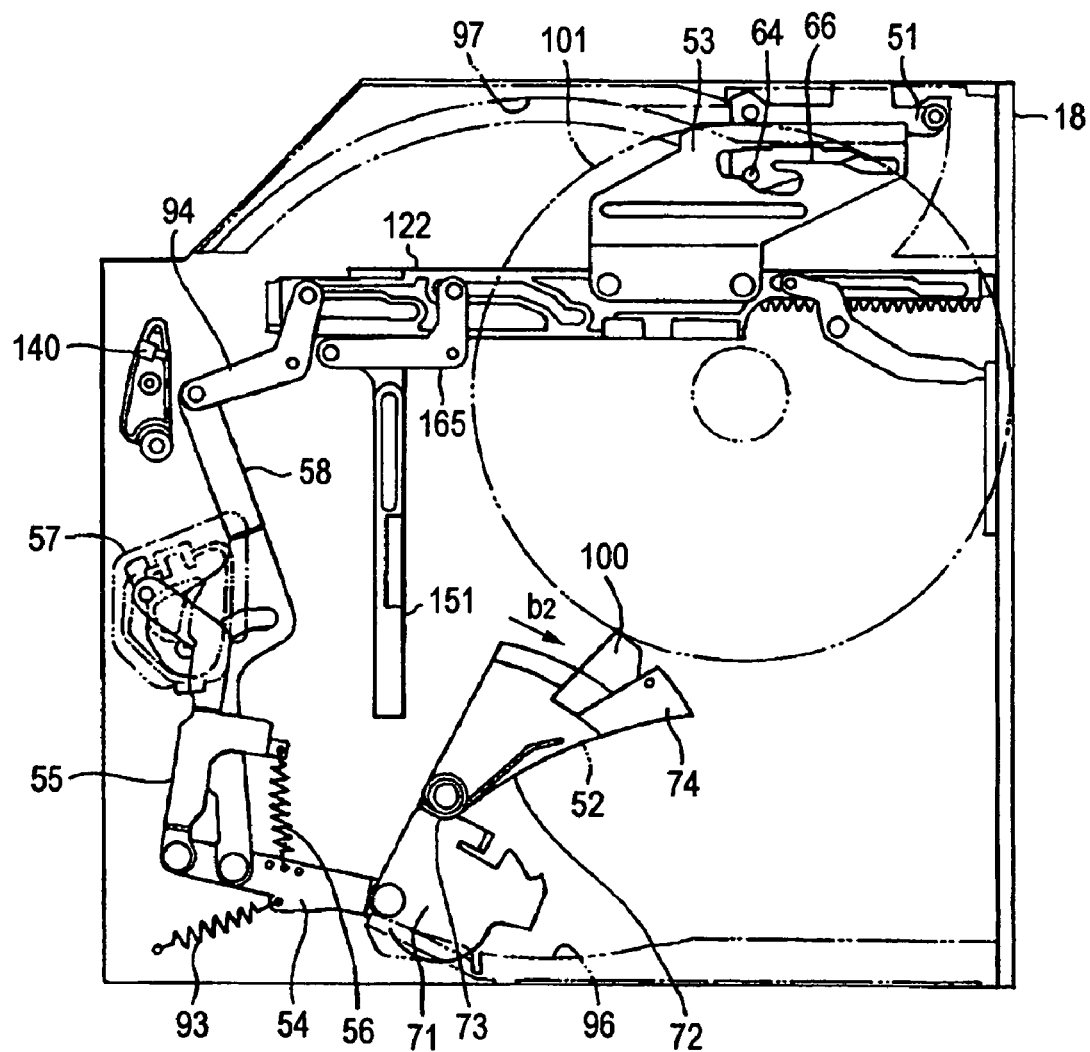
FIG. 29 is a plan view showing a state in which miss-insertion of a small-diameter optical disk is prevented.

A clearance between the stopper 100 and the end on the loading arm 51 side of the disk inserting and ejecting opening 19 in an insertion waiting state of the optical disk 2 in which the eject arm 52 is rotated in the arrow b2 direction in FIG. 29 is formed smaller than the diameter of the small-diameter disk 101. Therefore, even when the small-diameter disk 101 is inserted while being biased to the loading arm 51 side, the stopper 100 can surely prevent miss-insertion.

Moreover, in the insertion waiting state of the optical disk 2, the eject arm 52 is rotated to a position where the stopper 100 is in contact with the insertion end face of the small-diameter disk 101 when substantially the entire small-diameter disk 101 is inserted from the disk inserting and ejecting opening 19. In other words, the stopper 100 is brought into contact with the small-diameter disk 101 when substantially the entire small-diameter disk 101 is inserted. Therefore, the small-diameter disk 101 comes into contact with the stopper 100 in a state in which almost no portion of the small-diameter disk 101 that can be pushed in from the outside of the disk inserting and ejecting opening 19 is left. Further insertion of the small-diameter disk 101 is regulated. Thus, it is difficult for the user to further insert the small-diameter disk 101 into the inside of the housing 3.

The stopper 100 is rotated in the b1 direction and the b2 direction on the disk conveyance area together with the eject arm 52. In this case, if the eject arm 52 is formed in length that prevents the stopper 100 from rotating on the disk mounting section 23 of the base unit 22 exposed on the disk conveyance area, it is possible to prevent a situation in which the stopper 100 swings during the rotation of the eject arm 52 and collides with the turntable 23a and the engaging projection 33a of the disk mounting section 23.

Figure 30:
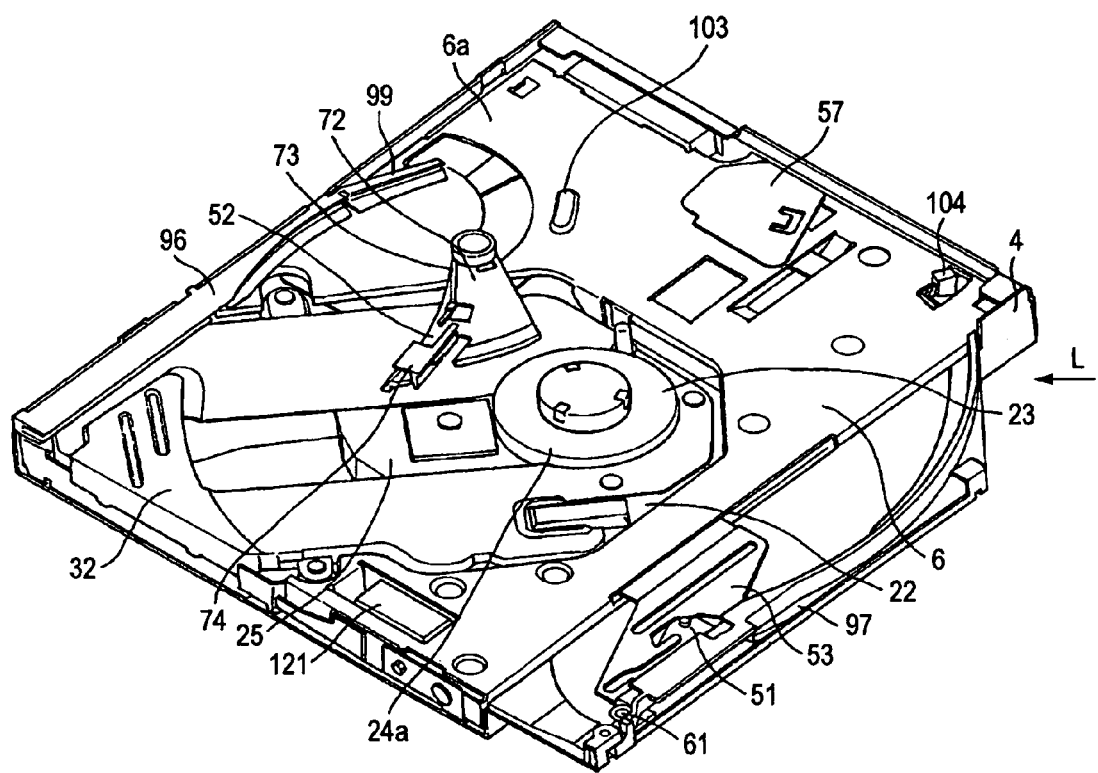
FIG. 30 is a perspective view showing a disk drive device in which a guide projection that guides rotation of the eject arm is provided on an upper surface of the main chassis.

In the disk drive device 1 to which the invention is applied, as shown in FIG. 30, a projection 103 that is rotated to prevent collision with the eject arm 52 and the disk mounting section 23 may be provided on the upper surface 6a of the main chassis 6. The projection 103 is formed in a position on an area in which the push-out arm 72 of the eject arm 52 rotates on the upper surface 6a of the main chassis 6 and onto which the push-out arm 72 moves when the contact member 74 of the eject arm 52 passes over the disk mounting section 23 or the vicinity thereof.

Figure 31A:
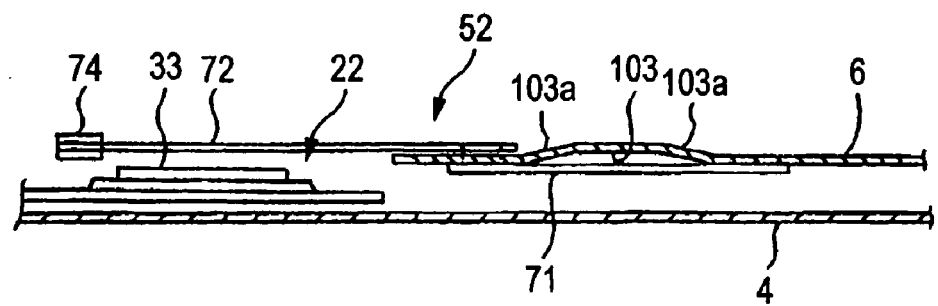
FIG. 31A is a schematic diagram showing a rotation locus of the eject arm guided by the guide projection and showing a state before the eject arm rises to the projection.
Figure 31B:
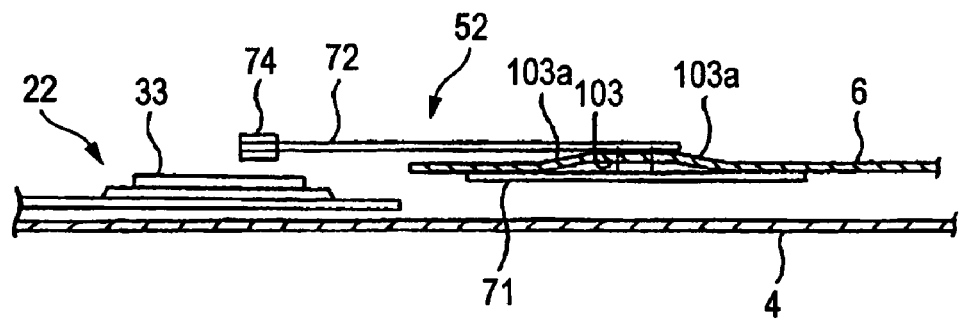
FIG. 31B is a schematic diagram showing the rotation locus of the eject arm guided by the guide projection and showing a state in which the eject arm has moved onto the projection.
Figure 31C:
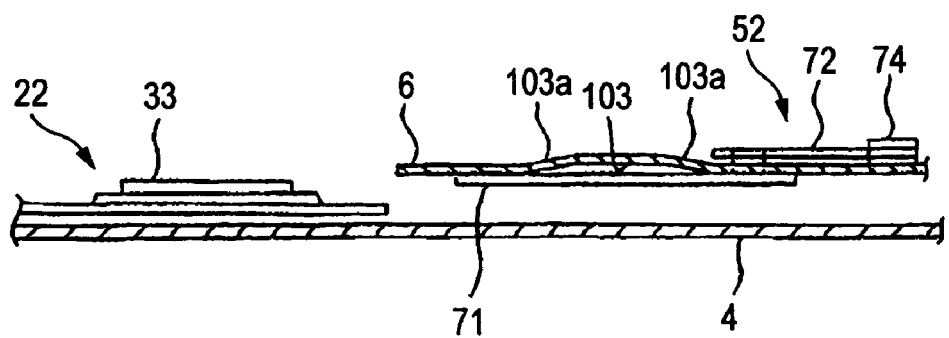
FIG. 31C is a schematic diagram showing the rotation locus of the eject arm guided by the guide projection and showing a state in which the eject arm has lowered from the projection.

Therefore, when the optical disk 2 is inserted and the eject arm 52 is rotated in the b1 direction, the contact member 74 is lifted since the push-out arm 72 moves onto the projection 103. Therefore, as shown in FIG. 31B, the contact member 74 and a rotation locus of the optical disk 2 supported by the contact member 74 rise. It is possible to prevent collision with the turntable 23a and the engaging projection 33a of the disk mounting section 23. FIGS. 31A to 31C are schematic diagrams showing rotation locus of the eject arm 52 shown from an arrow L direction in FIG. 30.

The projection 103 is formed only in a position onto which the push-out arm 72 moves when the contact member 74 of the eject arm 52 passes over the disk mounting section 23 or the vicinity thereof. Therefore, a rotation locus of the eject arm 52 does not rise in places other than the place where the projection 103 is formed. Therefore, compared with the case in which a projection is provided on the eject arm 52 side, it is unnecessary to secure rotation height of the eject arm 52 over the entire rotation area. When a projection projecting downward is formed in the eject arm 52, the projection typically moves onto the upper surface 6a of the main chassis 6. Thus, a track of the eject arm 52 is typically high. In areas other than the main chassis 6, it is necessary to set the track of the eject arm 52 high in order to prevent collision of the projection projecting downward and the other components. Thus, thickness of the housing 3 increases and it is difficult to realize a reduction in size and thickness of a disk drive device. Moreover, when the eject arm 52 swings because of disturbance or the like during rotation, it is also likely that the projection comes into sliding contact with or collides with the other components located below the projection, for example, the optical pickup 25.

In this regard, in the disk drive device 1 to which the invention is applied, since the projection 103 is formed on the upper surface 6a of the main chassis 6, a track of the eject arm 52 is high only in a part onto which the projection 103 moves. In the other areas, the eject arm 52 is rotated low. As shown in FIGS. 31A and 31C, since the disk drive device 1 does not have the projection projecting downward, it is unlikely that collision or the like with the other components located below the rotation area of the eject arm 52 occurs. Therefore, it is possible to realize a reduction in size and thickness of the housing 3.

In such a projection 103, inclined planes 103a that guide rise and fall of the push-out arm 72 of the eject arm 52 are formed. The inclined planes 103a are formed at both ends in a direction in which the push-out arm 72 of the projection 103 rotates. In the eject arm 52, the push-out arm 72 rises to the projection 103 and falls to the upper surface 6a of the main chassis 6 while being guided by the inclined planes 103a.

Specifically, in a state in which the eject arm 52 is rotated to the disk inserting and ejecting opening 19 side and waits for insertion of the optical disk 2, as shown in FIG. 31A, the push-out arm 72 is located further on the disk inserting and ejecting opening 19 side than the projection 103 on the main chassis 6. When the optical disk 2 is inserted, before the eject arm 52 is rotated into the housing 3 and rotates on the disk mounting section 23 since the contact member 74 is pressed by the optical disk 2, the push-out arm 72 moves onto the projection 103. In this case, as shown in FIG. 31B, since the push-out arm 72 rises while being guided by the inclined planes 103a, it is possible to maintain smooth rotation of the eject arm 52 without imposing loads to the insertion of the optical disk 2. When the eject arm 52 is further rotated into the housing 3, as shown in FIG. 31C, the push-out arm 72 falls onto the main chassis 6 while being guided by the inclined planes 103a of the projection 103.

When the optical disk 2 is ejected, the eject arm 52 is rotated according to a process opposite to the process described above. In this case, as in the above case, when the contact member 74 is rotated on the disk mounting section 23, the push-out arm 72 rises onto the projection 103 while being guided by the inclined planes 103a. Thus, it is possible to maintain smooth rotation of the eject arm 52.

The driving mechanism 120 that supplies a driving force to the disk conveying mechanism 50 includes the driving motor 121, the slider 122 that is subjected to the driving force of the driving motor 121 and slides in the bottom case 4, and a gear string 123 that transmits the driving force of the driving motor 121 to the slider 122. The driving motor 121, the slider 122, and the gear string 123 are disposed in the bottom case 4. The driving mechanism 120 drives the disk conveying mechanism 50 and the base elevating mechanism 150 by sliding the slider 122 using the driving motor 121.

When the optical disk 2 is inserted to the predetermined position, the first switch SW1 is depressed by the rotation support member 71 of the eject arm 52 and the driving motor 121 is driven in a normal direction for moving the slider 122 in the f1 direction. When eject operation is performed, the driving motor 121 is driven in a reverse rotation direction for moving the slider 122 in the f2 direction. The slider 122 is moved in the arrow f1 direction or the arrow f2 direction in FIG. 12 according to loading and eject of the optical disk 2 to drive the respective arms of the disk conveying mechanism 50 and the base elevating mechanism 150. The gear string 123 transmits the driving force of the driving motor 121 to the slider 122 via a rack section 131.

The slider 122 is made of a resin member formed in a substantial rectangular parallelepiped shape as a whole. As shown in FIG. 32A, on an upper surface 122a of the slider 122, the first guide groove 125 with which the engaging projection 109 formed in the third link arm 94 is engaged, a second guide groove 126 with which the engaging arm 165 that drives the sub-slider 151 of the base elevating mechanism 150 described later is engaged, the pair of engaging recesses 127 that engages with the pair of engaging protrusions 68 formed in the loading cam plate 53, and a third guide groove 128 with which one end of an opening and closing arm 191 of a disk insertion regulating mechanism 190 described later is engaged are formed.

In the slider 122, on a side 122b on the base unit 22 side, the first cam slit 130 through which the first supporting shaft 47 protrudingly provided in the sub-chassis 29 of the base unit 22 is inserted and the rack section 131 that engages with the gear string 123 are formed. A first guide plate 152 that prevents backlash of the first supporting shaft 47 of the sub-chassis 29 and stably operates the disk rotation driving mechanism 24 is assembled to the first cam slit 130. In the slider 122, a slide guide groove 129, a slide direction of which is guided to the pair of guide protrusions 124 protrudingly provided from the bottom case 4, is formed on a bottom surface 122c along the longitudinal direction (see FIG. 10).

Such a slider 122 is arranged, on the bottom surface of the bottom case 4, between one side of the bottom case 4 and the base unit 22. The slider 122 is located below the optical disk 2 inserted into the inside of the housing 3 from the disk inserting and ejecting opening 19. An upper surface of the slider 122 has height slightly smaller than that of the deck section 4a. The slider 122 is covered with the main chassis 6 and driven to slide in the front and the rear directions via the driving motor 121 and the gear string 123 provided on the bottom surface of the bottom case 4.

In the driving mechanism 120, in association with the slide operation of the slider 122, the third link arm 94 and the operation arm 58 engaged with the third link arm 94 are moved to regulate the rotation of the eject arm 52. In addition, the loading cam plate 53 is moved back and forth to rotate the loading arm 51. Consequently, the driving mechanism 120 performs, according to the slide of the slider 122, a loading operation for pulling the optical disk 2 into the housing 3 from the disk inserting and ejecting opening 19 and an eject operation for ejecting the optical disk 2 to the outside of the disk inserting and ejecting opening 19 from the disk mounting section 23.

The stop lever 140 that performs the centering operation for positioning the loaded optical disk 2 on the disk mounting section 23 will be explained. In the stop lever 140, as shown in FIG. 6, a lever body 141 rotatably supported by the main chassis 6, a stop protrusion 142 that is protrudingly provided from one end of the lever body 141 and stops the optical disk 2 in the centering position, a support protrusion 143 through which an annular portion of a coil spring 144 is inserted on the other end side of the lever body 141 and that rotatably supports the lever body 141 on the main chassis 6, and a regulating projection 145 that is inserted through a guide hole 146 drilled in the main chassis 6 and regulates the rotation of the lever body 141 such that the stop protrusion 142 stops in the centering position of the optical disk 2 are formed.

The level body 141 is made of a resin member. In the lever body 141, one end 141a in which the stop protrusion 142 is protrudingly provided is formed in a substantial arcuate shape. The support protrusion 143 is supported by the main chassis 6, whereby the one end 141a is disposed to extend to the slide area of the slider 122. Consequently, the tip of the slider 122 and the lever body 141 come into contact with each other according to the slide operation of the slider 122 to make the stop lever 140 rotatable around the support protrusion 143.

The stop protrusion 142 is protrudingly provided from one end of the lever body 141 to be projected on the upper surface 6a of the main chassis 6 from a rotation hole 147 formed in the main chassis 6 and to be capable of coming into contact with the outer peripheral surface of the optical disk 2. Since the side of the insertion end side of the optical disk 2 pulled by the loading arm 51 is brought into contact with the stop protrusion 142, the stop protrusion 142 performs the centering operation for stopping the optical disk 2 on the disk mounting section 23. The rotation hole 147 that projects the stop protrusion 142 on the main chassis 6 is formed in a substantial arcuate shape to be capable of retracting from a stop position where the stop protrusion 142 centers the optical disk 2.

The support protrusion 143 is a member of a substantial columnar shape including a hollow portion in which a screw groove is cut. The support protrusion 143 is protrudingly provided at the other end of the lever body 141. The hollow portion is screwed continuously from the screw hole drilled in the main chassis 6, whereby the support protrusion 143 is supported on the main chassis 6 to freely rotate in an arrow g1 direction and an arrow g2 direction in FIG. 12. The annular portion of the coil spring 144 is inserted through the support protrusion 143. One end of the coil spring 144 is locked to the lever body 141 and the other end thereof is locked to the circuit board 59 disposed in the bottom case 4. Consequently, the coil spring 144 urges the stop lever 140 to rotate in the arrow g1 direction in FIG. 12 around the support protrusion 143.

The regulating projection 145 regulates a rotation area of the lever body 141 urged to rotate by the coil spring 144. As shown in FIG. 3, the regulating projection 145 is protrudingly provided above the lever body 141 and exposed on the upper surface 6a of the main chassis 6 from the guide hole 146 formed in the main chassis 6. The guide hole 146 regulates a rotation area of the regulating projection 145 to stop the lever body 141, which is urged to rotate in the g1 direction by the coil sprint 144, in a predetermined position for performing centering of the optical disk 2. The guide hole 146 is formed in an arcuate shape to make it possible to retract the lever body 141 from the stop position where centering of the optical disk 2 is performed.

Since the lever body 141 is urged by the coil spring 144 and the regulating projection 145 is locked to one end on the arrow g1 side of the guide hole 146, the stop lever 140 is rotated to the stop position where the stop protrusion 142 stops the optical disk 2 in the centering position. When the optical disk 2 is loaded, the side on the insertion end side of the optical disk 2 is brought into contact with the stop protrusion 142. Consequently, the stop lever 140 positions the optical disk 2 on the disk mounting section 23. After the centering ends, one end 141a of the lever body 141 is pressed against the tip of the slider 122 conveyed in the f1 direction and the stop lever 140 is rotated in the arrow g2 direction. Consequently, the stop protrusion 142 is separated from the outer periphery of the optical disk 2 to make the optical disk 2 rotatable. When the optical disk 2 is ejected, since the slider 122 is slid in the f2 direction, the stop lever 140 is urged by the coil spring 144 to rotate to the stop position where the stop protrusion 142 stops the optical disk 2 in the centering position and prepare for loading of the optical disk 2.

The base elevating mechanism 150 that operates to raise and lower the base unit 22 in association with a slide operation of the slider 122 will be explained. The base elevating mechanism 150 operates to raise and lower the base unit 22 among the chucking position where the base unit 22 is raised to mount the optical disk 2, which is positioned in the disk mounting position, on the turntable 23a of the disk mounting section 23, the chucking release position where the base unit 22 is lowered to dismount the optical disk 2 from the turntable 23a of the disk mounting section 23, and the recording and reproduction position where the base unit 22 is positioned between the chucking position and the chucking release position to record a signal in or reproduce a signal from the optical disk 2.

Specifically, the base elevating mechanism 150 raises and lowers the base unit 22 by raising and lowering the first supporting shaft 47 and the second supporting shaft 48 formed in the base unit 22 using the slider 122 and the sub-slider 151 that is slid according to the slide operation of the slider 122. As shown in FIG. 32A, the first cam slit 130 that operates to raise and lower the base unit 22 over the chucking release position and the recording and reproduction position is formed over the longitudinal direction on the side opposed to the base unit 22 of the slider 122. In the first cam slit 130, a lower side horizontal plane section 130a corresponding to the chucking release position, an upper side horizontal plane section 130b corresponding to the recording and reproduction position, and an inclined plane section 130c that connect the lower side horizontal plane section 130a and the upper side horizontal plane section 130b are formed. The first supporting shaft 47 protrudingly provided in the sub-chassis 29 of the base unit 22 is slidably inserted through the first cam slit 130.

In the first cam slit 130, as shown in FIG. 32A, a first guide plate 152 that guides the movement of the first supporting shaft 47 and prevent backlash of the first supporting shaft 47 in the recording and reproduction position to stably operate the disk rotation driving mechanism 24 is disposed. The first guide plate 152 is made of a leaf spring member. One end of the first guide plate 152 is locked to a locking piece 153 formed in an upper part of the first cam slit 130 and the other end thereof is locked to an engaging recess 154 formed on a lower side of the first cam slit 130. In the first guide plate 152, above a contact of the upper side horizontal plane section 130b and the inclined plane section 130c, a projecting section 155 to which the first supporting shaft 47 moves when the base unit 22 is raised to the chucking position and that projects to the upper surface 122a side of the slider 122 when the first supporting shaft 47 is moved to the upper side horizontal plane section 130b is formed in a bent state.

The lower side horizontal plane section 130a of the first cam slit 130 has height slightly larger than a diameter of the first supporting shaft 47 and is slidably formed. On the other hand, height of the upper side horizontal plane section 130b from the first guide plate 152 is set to be identical with or slightly lower than the diameter of the first supporting shaft 47. Therefore, when the first supporting shaft 47 is moved to the upper side horizontal plane section 130b, the first supporting shaft 47 is pressed in and nipped between the first guide plate 152 and the upper side horizontal plane section 130b.

Therefore, the first guide plate 152 can control vibration by the spindle motor 24a of the disk rotation driving mechanism 24 provided in the base unit 22 and stably rotate the optical disk 2.

Since the first supporting shaft 47 is nipped between the first guide plate 152 and the upper side horizontal plane section 130b, the projecting section 155 projects above the upper surface 122a of the slider 122 to be pressed against the upper surface 6a of the main chassis 6. Therefore, the slider 122 is pressed to the bottom case 4 side by the first guide plate 152. It is possible to control influences of vibration by the driving of the base unit 22 and disturbance.

The sub-slider 151 supports the second supporting shaft 48 protrudingly provided from the sub-chassis 29 of the base unit 22 and is engaged with the slider 122. The sub-slider 151 is disposed to be slidable in the arrow h1 direction or the arrow h2 direction in FIG. 12 orthogonal to the loading direction of the optical disk 2 according to the slide operation of the slider 122.

As shown in FIG. 32B, the sub-slider 151 is made of a long flat member made of synthetic resin. An upper guide groove 158 with which a guide projection 157 projected from the main chassis 6 is engaged is formed over the longitudinal direction on an upper surface 151a of the sub-slider 151. In the sub-slider 151, a lower guide groove 160 with which a guide projection 159 projected from the bottom case 4 is engaged is formed over the longitudinal direction in a position deviating from the upper guide groove 158 on a lower surface 151b (see FIG. 10). Since the guide projection 157 projected from the main chassis 6 is engaged with the upper guide groove 158, the guide projection 157 slides in the upper guide groove 158. Since the guide projection 159 projected from the bottom chassis 4 is engaged with the lower guide groove 160, the guide projection 159 slides in the lower guide groove 158. Consequently, the sub-slider 151 is slid in the arrow h1 direction or the arrow h2 direction in association with the slide operation of the slider 122.

In the sub-slider 151, an engaging groove 166 with which the engaging arm 165 coupled to the slider 122 is engaged is formed at one end in the longitudinal direction located on the slider 122 side. The engaging groove 166 is provided in an engaging piece 167 extended in a direction orthogonal to the longitudinal direction of the sub-slider 151. In the sub-slider 151, the other end on the opposite side of one end at which the engaging piece 167 is formed is set as a contact projection 168 that is brought into contact with the rotation supporting member 71 of the eject arm 52 at the time of loading of the optical disk 2. The contact projection 168 is brought into contact with the bent piece 81 of the rotation supporting member 71 when the optical disk 2 is loaded. Thus, the contact projection 168 moves, via the first link arm 54 coupled to the rotation supporting member 71, the guide projection 113 of the second link arm 55 coupled to the first link arm 54 to clime over the protrusion 112c of the loop cam 57. In addition, the contact projection 168 rotates the eject arm 54 until the contact member 74 is released from the side of the optical disk 2.

In the sub-slider 151, on the side 151b on the disk inserting and ejecting opening 19 side, the second cam slit 170 that operates to raise and lower the base unit 22 over the chucking position, the chucking release position, and the recording and reproduction position is formed over the longitudinal direction together with the first cam slit 130. In the second cam slit 170, a lower side horizontal plane section 170a corresponding to the chucking release position, an upper side horizontal plane section 170b corresponding to the recording and reproduction position, and an inclined plane section 170c that connects the lower side horizontal plane section 170a and the upper side horizontal plane section 170b and corresponds to the chucking position are formed. The second supporting shaft 48 protrudingly provided in the sub-chassis 29 of the base unit 22 is slidably inserted through the second cam slit 170.

The inclined plane section 170c of the second cam slit 170 is provided up to a position higher than a position of the upper side horizontal plane section 170b and slightly falls to guide the base unit 22 to the upper side horizontal plane section 170b. Consequently, since the sub-slider 151 slides in the h1 direction, the second supporting shaft 48 rises on the inclined plane section 170c from the lower side horizontal plane section 170a and the base unit 22 guided by the second cam slit 170 is moved from the chucking release position to the chucking position. In this case, in the base unit 22, the periphery of the center hole 2a of the optical disk 2 conveyed to the disk mounting section 23 is nipped by the turntable 23a and the contact projection 8 provided in the top plate section 5a of the top cover 5 to perform chucking of the optical disk 2. When the sub-slider 151 is further slid in the h1 direction, since the second supporting shaft 48 falls from the inclined plane section 170c to the upper side horizontal plane section 170b, the base unit 22 is moved from the chucking position to the recording and reproduction position.

In the second cam slit 170, as in the first cam slit 130, as shown in FIG. 32B, a second guide plate 171 that guides the movement of the second supporting shaft 48 and prevents backlash of the second supporting shaft 48 in the recording and reproduction position to stably operate the disk rotation driving mechanism 24 is disposed. The second guide plate 171 is made of a leaf spring member. One end of the second guide plate 171 is locked to a locking piece 173 formed in an upper part of the second cam slit 170 and the other end thereof is locked to an engaging recess 174 formed on a lower side of the second cam slit 170. In the second guide plate 171, above a contact of the upper side horizontal plane section 170b and the inclined plane section 170c, a projecting section 175 to which the second supporting shaft 48 moves when the base unit 22 is raised to the chucking position and that projects to the upper surface 151a side of the sub-slider 151 when the second supporting shaft 48 is moved to the upper side horizontal plane section 170b is formed in a bent state.

The lower side horizontal plane section 170a of the second cam slit 170 has height slightly larger than a diameter of the second supporting shaft 48 and is slidably formed. On the other hand, height of the upper side horizontal plane section 170b from the second guide plate 171 is set to be identical with or slightly lower than the diameter of the second supporting shaft 48. Therefore, when the second supporting shaft 48 is moved to the upper side horizontal plane section 170b, the second supporting shaft 48 is pressed in and nipped between the second guide plate 171 and the upper side horizontal plane section 170b. Therefore, the second guide plate 171 can control, in conjunction with the first guide plate 152, vibration by the spindle motor 24a of the disk rotation driving mechanism 24 provided in the base unit 22 and stably rotate the optical disk 2.

Since the second supporting shaft 48 is nipped between the second guide plate 171 and the upper side horizontal plane section 170b, the projecting section 175 projects above the upper surface 151a of the sub-slider 151 to be pressed against the upper surface 6a of the main chassis 6. Therefore, the sub-slider 151 is pressed to the bottom case 4 side by the second guide plate 171. It is possible to control influences of vibration by the driving of the base unit 22 and disturbance.

The engaging arm 165 that is engaged with the engaging groove 166 of such a sub-slider 151 and couples the slider 122 and the sub-slider 151 is formed in a substantial L shape. The bent section 165a is rotatably attached to the main chassis 6. An engaging projection 177 formed at one end 165b on a short side extended from the bent section 165a is movably engaged with the second guide groove 126 of the slider 122. An engaging projection 178 formed at the other end 165c on a long side is movably engaged with the engaging groove 166 of the sub-slider 151.

When the slider 122 is moved in the f1 direction, since the engaging projection 177 moves the second guide groove 126 of the slider 122, the engaging arm 165 is rotated in an i1 direction with the bent section 165a as a fulcrum. The engaging projection 178 slides the sub-slider 151 in the h1 direction while moving in the engaging groove 166. When the slider 122 is moved in the f2 direction, since the engaging projection 177 moves the second guide groove 126, the engaging arm 165 is rotated in an i2 direction with the bent section 165a as a fulcrum. The engaging projection 178 slides the sub-slider 151 in the h2 direction while moving in the engaging groove 166.

Figure 33:
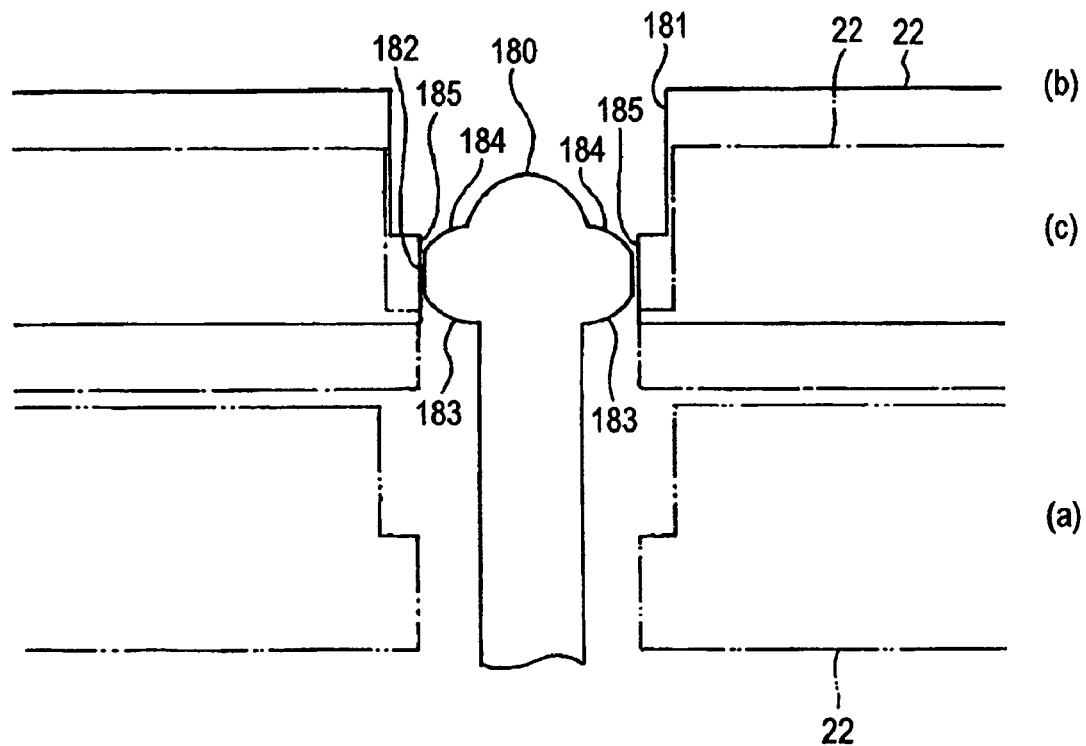
FIG. 33 is a sectional view showing positional relations between a guide pin and a guide hole in a chucking release position, a disk insertion position, and a recording and reproducing position.

In the disk drive device 1, as shown in FIGS. 3, 6, and 33, a guide pin 180 that guides the base unit 22 such that, when the base unit 22 is raised to the chucking position, the center hole 2a of the optical disk 2 conveyed to the centering position by the disk conveying mechanism 50 and the turntable 23a of the disk mounting section 23 provided in the base chassis 27 are positioned is provided.

The guide pin 180 is vertically provided from the bottom surface of the bottom case 4. As shown in FIG. 33, in an upper part of the guide pin 180, a flange section 182 through which a guide hole 181 formed in the base chassis 27 is inserted is formed. The flange section 182 has a diameter slightly larger than a diameter of the guide hole 181 of the base chassis 27. In the flange section 182, a first guide section 183 made of an inclined plane expanded in diameter toward the upper end and a second guide section 184 made of an inclined plane reduced in diameter toward the upper end are formed. When the base chassis 27 is raised and lowered, since the first and the guide sections 183 and 184 are inserted through a guide wall 185 formed in the guide hole 181 while being brought into sliding contact with the guide wall 185, the flange section 182 guides the base unit 22 to the chucking position or the chucking release position.

The guide hole 181 of the base chassis 27 through which the guide pin 180 is inserted is drilled near the turntable 23a spaced apart from the third supporting shaft 49 serving as a rotation fulcrum of the base unit 22. In the guide hole 181, as shown in FIG. 33, the guide wall 185 is formed to swell below the base chassis 27. The guide wall 185 forms a clearance slightly larger than a diameter of the flange section 182 of the guide pin 180. Since the flange section 182 is inserted through the clearance, the base unit 22 is guided such that the center hole 2a of the optical disk 2 and the turntable 23a of the disk mounting section 23 are positioned.

Figure 34:
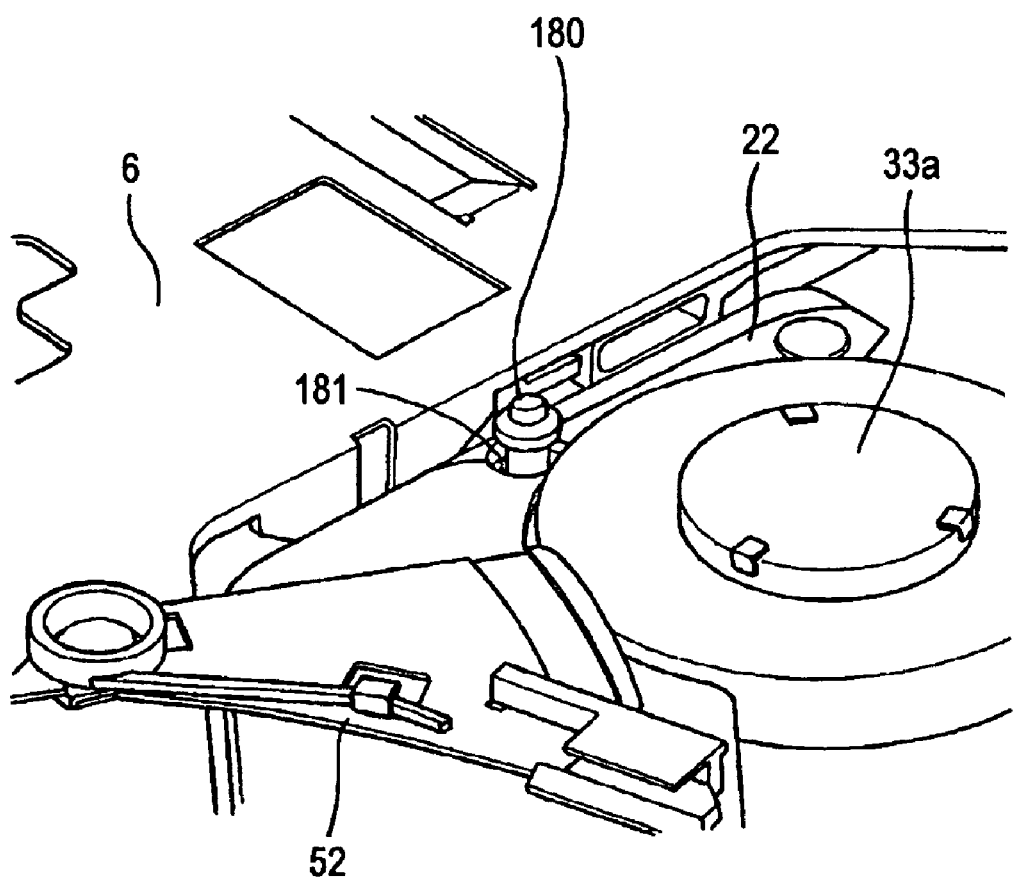
FIG. 34 is a perspective view showing the guide pin and the guide hole in a state in which the base unit is lowered to the chucking release position.
Figure 35:
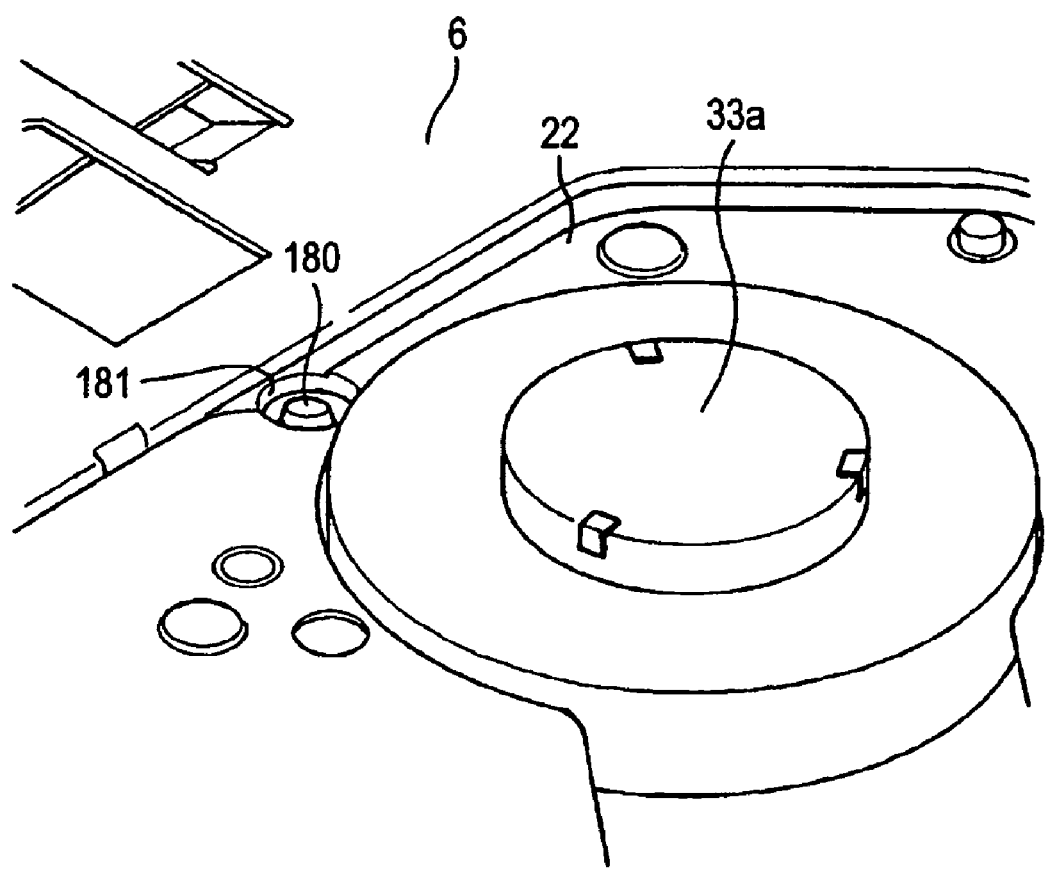
FIG. 35 is a perspective view showing the guide pin and the guide hole in a state in which the base unit is lifted to a chucking position.

Specifically, as indicated by alternate long and two short dashes lines in FIG. 34 and (a) in FIG. 33, when the base unit 22 is lowered to the chucking release position, in the guide pin 180, the flange section 182 is located above the guide hole 181. When the optical disk 2 is conveyed to the centering position, the base chassis 27 is raised and the flange section 182 is inserted through the guide hole 181. When the base chassis 27 is raised to the chucking position of the optical disk 2, as indicated by solid lines in FIG. 35 and (b) in FIG. 33, the guide wall 185 formed to swell in the guide hole 181 slides in the first guide section 183 of the guide pin 180 and the flange section 182 is inserted through the clearance of the guide wall 185. In this way, since the base chassis 27 is raised while being guided by the guide pin 180, the turntable 23*a* of the disk mounting section 23 is positioned with the center hole 2*a* of the optical disk 2 conveyed to the centering position. Thus, it is possible to smoothly perform chucking without imposing excessive loads to the optical disk 2 and the turntable 23*a*.

The guide pin 180 and the guide hole 181 are formed on the other end side on the opposite side of one end in the longitudinal direction at which the third supporting shaft 49 that supports the rotation of the base unit 22 is provided and formed near the disk mounting section 23. Thus, it is possible to most efficiently correct deviation between the optical disk 2 conveyed to the centering position and the turntable 23*a*. It is possible to surely position the center hole 2*a* of the optical disk 2 and the engaging projection 33*a* of the turntable 23*a*.

Figure 36:
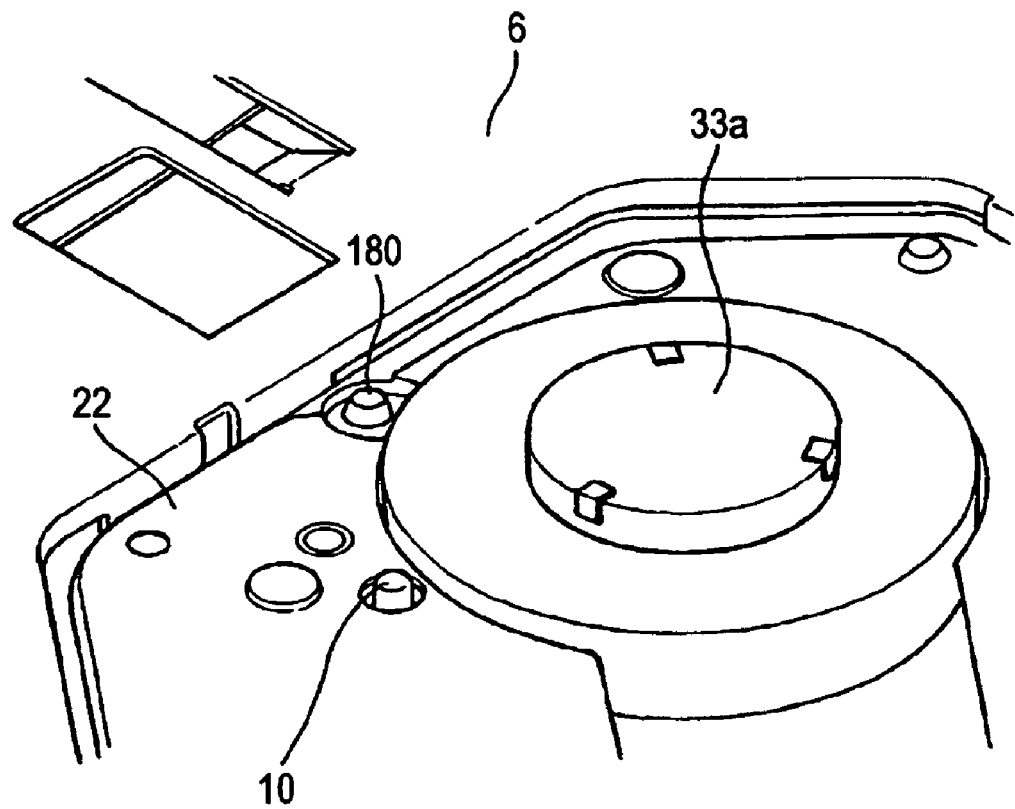
FIG. 36 is a perspective view showing the guide pin and the guide hole in a state in which the base unit is lifted to the recording and reproducing position.

As indicated by alternate long and short dash lines in FIG. 36 and (c) in FIG. 33, when the base unit 22 is lowered to the recording and reproduction position, the guide wall 185 of the guide hole 181 of the base chassis 27 slides on the second guide section 184 of the flange section 182 and the flange section 182 is insertably guided to the guide hole 181. Then, the guide wall 185 is lowered to a position where the guide wall 185 separates from the flange section 182. In this way, in a state in which the base unit 22 is lowered to the recording and reproduction position, the guide pin 180 and the guide hole 181 are not in contact with each other. Thus, disturbance such as vibration is prevented from being transmitted from the bottom case 4 to the base chassis 27 side via the guide pin 180. Therefore, it is possible to prevent disturbance from being transmitted to the disk rotation driving mechanism 24 and the optical pickup 25 through the guide pin 180 and adversely affecting recording and reproduction characteristics.

The guide pin 180 is formed at height for preventing the guide pin 180 from coming into contact with the lower surface of the optical disk 2 driven to rotate by the disk rotation driving mechanism 24. Thus, it is unlikely that the guide pin 180 scratches the information recording surface of the optical disk 2.

When the recording and reproduction operation ends and the disk drive device 1 shifts to a process for ejecting the optical disk 2, the base unit 22 is lowered to the chucking release position and the optical disk 2 is pushed up from the turntable 23 by the push-up pin 10 to release chucking. In this case, in the base chassis 27, the guide hole 181 is located below the guide pin 180.

In the disk drive device 1 to which the invention is applied, it is also possible to use the guide pin 180 as the push-up pin 10 that releases chucking of the optical disk 2. In other words, the upper end of the guide pin 180 may be formed in a semispherical shape and the guide pin 180 and the guide hole 181 of the base chassis 27 may be formed in association with a non-recording area formed near the center hole 2*a* of the optical disk 2 mounted on the turntable 23*a*. Consequently, when the base unit 22 is lowered to the chucking release position of the optical disk 2, the optical disk 2 is pushed up by the upper end of the guide pin 180 and chucking with the turntable 23*a* is released. According to such a structure, since it is unnecessary to use the push-up pin 10 in addition to the guide pin 180, it is possible to realize a reduction in the number of components and a reduction in weight of the disk drive device 1.

In the disk drive device according to an embodiment of the invention, when the conveyance arm is rotated, the conveyance arm rises by moving onto the projection when the conveyance arm rotates on the disk mounting section. Therefore, a rotation locus of the conveyance arm rises to make it possible to prevent collision against the disk mounting section.

In the disk conveyance mechanism and the disk drive device according to another embodiment of the invention, at the time of ejection of a disk-like recording medium, even when an obstacle preventing ejection of the disk-like recording medium is placed and a force in a direction opposite to an ejection direction of the disk-like recording medium is applied to an eject arm, since the push-out unit subjected to the force in the opposite direction rotates in a loading direction, it is possible to prevent excessive loads from being applied the driving motor and the disk-like recording medium.

It should be understood by those skilled in the art that various modifications, combinations, sub-combinations, and alterations may occur depending on design requirements and the other factors insofar as they are within the scope of the appended claims or the equivalents thereof.

What is claimed is:

1. A recording medium driving device which records information in or reproduces information from the recording medium, the device comprising:
    a device body in which a recording medium is inserted and from which the recording medium is removed;
    a conveying mechanism that conveys the recording medium in a loading direction and an eject direction;
    a mounting section on which the recording medium is mounted;
    a conveyance arm that moves according to movement of the recording medium in the loading direction and the eject direction and conveys the recording medium; and
    a driving mechanism that has a driving source for imparting a driving force for moving the conveyance arm, wherein
    the conveyance arm comprises:
        a support section supported by the device body;
        an arm section rotatably supported by the support section in the loading direction of the recording medium, the arm section having a tip;
        a contact section that is attached to the tip of the arm section and is brought into contact with the recording medium; and
        an urging member placed between the arm section and the support section that always rotatably urges the arm section in the eject direction of the recording medium, and wherein the arm section rotates with respect to the support section only when the conveyance arm moves the recording medium in the eject direction and the movement of the recording medium in the eject direction is stopped due to an external force applied to the recording medium in the loading direction.

2. The recording medium driving device according to claim 1, further comprising a loading arm that is urged to rotate in the loading direction of the recording medium, wherein
    the loading arm is rotated, at the time of ejection of the recording medium, in the eject direction of the recording medium by the driving mechanism while supporting a side on an ejection end side of the recording medium in the loading direction.

3. The recording medium driving device according to claim 1, wherein
    a main chassis is disposed and an upper surface side of the main chassis is set as a conveyance area of the recording medium,
    the mounting section is exposed on the conveyance area from an opening of the main chassis,
    the conveyance arm is provided on the main chassis and the mounting section, and in the main chassis, a projection that regulates a position in a height direction of the conveyance arm when the conveyance arm rotates near the mounting section is formed.

4. The recording medium driving device according to claim 3, wherein, in the projection, inclined planes that continue from the main chassis and guide a rise and a fall of the conveyance arm are formed at both ends in a rotating direction of the conveyance arm.

5. The recording medium driving device according to claim 3, wherein the contact section moves on the mounting section, and
the arm section moves onto the projection.

6. An electronic device comprising an instructing unit that issues instructions for inserting and ejecting operations for a recording medium to a recording medium driving device which records information in or reproduces information from the recording medium, wherein the recording medium driving device comprises:
a device body in which a recording medium is inserted and from which the recording medium is removed;
a conveying mechanism that conveys the recording medium in a loading direction and an eject direction;
a mounting section on which the recording medium is mounted,
a conveyance arm that moves according to movement of the recording medium in the loading direction and the eject direction and conveys the recording medium; and
a driving mechanism that has a driving source for imparting a driving force for moving the conveyance arm, wherein the conveyance arm comprises:
a support section supported by the device body;
an arm section rotatably supported by the support section in the loading direction of the recording medium, the arm section having a tip;
a contact section that is attached to the tip of the arm section and is brought into contact with the recording medium; and
an urging member placed between the arm section and the support section that always rotatably urges the arm section in the eject direction of the recording medium, and wherein the arm section rotates with respect to the support section only when the conveyance arm moves the recording medium in the eject direction and the movement of the recording medium in the eject direction is stopped due to an external force applied to the recording medium in the loading direction.

* * * * *